United States Patent
Ready-Campbell et al.

(10) Patent No.: US 11,236,492 B1
(45) Date of Patent: Feb. 1, 2022

(54) GRAPHICAL USER INTERFACE FOR REAL-TIME MANAGEMENT OF AN EARTH SHAPING VEHICLE

(71) Applicant: Built Robotics Inc., San Francisco, CA (US)

(72) Inventors: Noah Austen Ready-Campbell, San Francisco, CA (US); Andrew Xiao Liang, San Francisco, CA (US); Edward Jiachang Cai, San Francisco, CA (US); Elizabeth Maitland Murdoch, San Francisco, CA (US); Thomas Joel Pech, San Francisco, CA (US); Lucas Allen Bruder, San Francisco, CA (US); Gaurav Jitendra Kikani, San Francisco, CA (US); Joonhyun Kim, San Francisco, CA (US)

(73) Assignee: Built Robotics Inc., San Francisco, CA (US)

( * ) Notice: Subject to any disclaimer, the term of this patent is extended or adjusted under 35 U.S.C. 154(b) by 0 days.

(21) Appl. No.: 17/002,658

(22) Filed: Aug. 25, 2020

(51) Int. Cl.
*E02F 9/26* (2006.01)
*G06F 3/0481* (2013.01)
*E02F 9/20* (2006.01)

(52) U.S. Cl.
CPC .............. *E02F 9/262* (2013.01); *E02F 9/205* (2013.01); *E02F 9/267* (2013.01); *G06F 3/04815* (2013.01)

(58) Field of Classification Search
CPC ........... E02F 9/262; E02F 9/205; E02F 9/267; G06F 3/04815; G05D 1/0088; G05D 2201/0201; G05D 2201/0202
USPC ........................................................ 701/50
See application file for complete search history.

(56) References Cited

U.S. PATENT DOCUMENTS

| 5,471,391 A | * | 11/1995 | Gudat | ....................... | E02F 9/26 |
| | | | | | 701/50 |
| 5,631,658 A | * | 5/1997 | Gudat | .................. | A01B 79/005 |
| | | | | | 342/457 |
| 7,113,105 B2 | * | 9/2006 | Sahm | ....................... | E02F 9/26 |
| | | | | | 172/4.5 |

(Continued)

OTHER PUBLICATIONS

International Search Report and Written Opinion, Patent Cooperation Application No. PCT/US2021/044826, dated Sep. 9, 2021, 18 pages.

*Primary Examiner* — Angelina Shudy
(74) *Attorney, Agent, or Firm* — Fenwick & West LLP

(57) ABSTRACT

A computing device generates a graphical user interface displaying a three-dimensional representation of the site comprising a position of a vehicle capable of moving material within the site and a target location within the site for the vehicle to move material. The computing device transmits a set of instructions for the vehicle to move a volume of material from the target location. The computing device receives sensor data describing a depth of the target location, a current volume of material moved from the target location, and a position of the vehicle. The graphical user interface displayed on the computing device is modified to display the current depth of the target location, and the position of the vehicle relative to the target location. The computing device modifies the set of instructions based on the received sensor data and provides the modified set of instructions to the vehicle.

22 Claims, 34 Drawing Sheets

(56) References Cited

U.S. PATENT DOCUMENTS

| | | | | |
|---|---|---|---|---|
| 8,386,110 B2* | 2/2013 | Maekawa | G05D 1/0217 | |
| | | | 701/23 | |
| 9,824,490 B1* | 11/2017 | Cote | E02F 9/261 | |
| 10,474,155 B2* | 11/2019 | Wei | G05D 1/0221 | |
| 10,719,076 B1* | 7/2020 | Gavrilets | G01S 19/51 | |
| 10,761,537 B1* | 9/2020 | Ready-Campbell | | |
| | | | G05D 1/0246 | |
| 2004/0158355 A1* | 8/2004 | Holmqvist | G05D 1/0274 | |
| | | | 700/245 | |
| 2009/0202109 A1* | 8/2009 | Clar | G09B 29/003 | |
| | | | 382/104 | |
| 2010/0217474 A1* | 8/2010 | Baumgarten | A01D 41/127 | |
| | | | 701/31.4 | |
| 2012/0330550 A1* | 12/2012 | Jensen | G09B 25/06 | |
| | | | 702/5 | |
| 2013/0166156 A1* | 6/2013 | Stanek | E02F 3/435 | |
| | | | 701/50 | |
| 2016/0069040 A1* | 3/2016 | Kami | E02F 3/32 | |
| | | | 701/50 | |
| 2016/0069044 A1* | 3/2016 | Takaura | E02F 9/2004 | |
| | | | 701/50 | |
| 2016/0076225 A1* | 3/2016 | Atkinson | G01S 17/00 | |
| | | | 701/50 | |
| 2016/0145827 A1* | 5/2016 | Kami | G05B 19/416 | |
| | | | 701/50 | |
| 2016/0163088 A1* | 6/2016 | Clar | E02F 9/2054 | |
| | | | 701/23 | |
| 2016/0258135 A1* | 9/2016 | Shimano | E02F 9/262 | |
| 2016/0265186 A1* | 9/2016 | Kami | E02F 3/435 | |
| 2018/0038082 A1* | 2/2018 | Hashimoto | E02F 3/844 | |
| 2018/0044888 A1* | 2/2018 | Chi | G06F 3/0484 | |
| 2018/0163376 A1* | 6/2018 | Redenbo | G05D 1/0212 | |
| 2018/0319392 A1* | 11/2018 | Posselius | E02F 9/24 | |
| 2019/0033877 A1* | 1/2019 | Wei | G05D 1/0221 | |
| 2019/0078291 A1* | 3/2019 | Shimano | E02F 3/437 | |
| 2019/0168609 A1* | 6/2019 | Mianzo | G06K 9/00771 | |
| 2020/0032490 A1* | 1/2020 | Ready-Campbell | | |
| | | | G05D 1/0088 | |
| 2020/0089222 A1* | 3/2020 | Puerto | E02F 5/145 | |
| 2020/0097021 A1* | 3/2020 | Carpenter | B60D 1/06 | |
| 2020/0102721 A1* | 4/2020 | Wei | E02F 3/845 | |
| 2020/0117201 A1* | 4/2020 | Oetken | G06K 9/0063 | |
| 2020/0240111 A1* | 7/2020 | Saiki | E02F 9/2045 | |
| 2020/0240118 A1* | 7/2020 | Cheng | E02F 9/2041 | |
| 2020/0293059 A1* | 9/2020 | Wang | G06T 15/00 | |
| 2020/0356088 A1* | 11/2020 | Schlacks, IV | G05D 1/0278 | |
| 2020/0392703 A1* | 12/2020 | Sherlock | E02F 9/267 | |
| 2021/0002850 A1* | 1/2021 | Wu | E02F 3/43 | |
| 2021/0034058 A1* | 2/2021 | Subramanian | H04L 67/125 | |
| 2021/0043085 A1* | 2/2021 | Kreiling | E02F 9/265 | |
| 2021/0047804 A1* | 2/2021 | Canepari | E02F 9/265 | |
| 2021/0262195 A1* | 8/2021 | Nishi | G06F 3/14 | |

* cited by examiner

June 28, 2020

| 1.2 m³ | 8.35 hrs | 4.12 hrs | 72.5 m³ |
| Bucket Dirt Size | Bucket Dirt Size | Digging Time | Total Dirt Moved |

ROBOT
| Name | Pathfinder |
| Geofenco | J-4 |
| Total Dirt Moved | 72.5 m³ |
| Average Dirt Moved per Cycle | 16.5 m³ |
| Average Cycle Time | 1,275.3 sec |
| Total Uptime | 7,433.95 sec |
| Total Action Time | 7,210.21 sec |

OPERATOR
| Name | Jake Blenheim |
| Description of Work | Started robot. Tested e-stop and checked fuel/DEF levels. The rain earlier in the day paused work for a bit. |
| Project | Cheyenne Ridge |
| Shift Duration | 3.29 hr |
| Start Time | 10:00 am MDT |
| End Time | 1:27 pm MDT |
| Work Completed | 72.5 m³ |

1275

Operate
Map
Measure
Analytics
02:34:57
Help
JB

FIG. 12D

GRAPHICAL USER INTERFACE FOR REAL-TIME MANAGEMENT OF AN EARTH SHAPING VEHICLE

BACKGROUND

Field of Art

The disclosure relates generally to methods and systems for managing the operation of an autonomous or semi-autonomous vehicle, and more specifically to a graphical user interface for managing an autonomous or semi-autonomous vehicle performing an earth shaping routine in a site.

Description of the Related Art

Vehicles such as backhoes, loaders, and excavators, generally categorized as earth shaping vehicles, are used to move earth from locations in a site. Currently, operation of these earth shaping vehicles is very expensive as each vehicle requires a manual operator be available and present during operation. Further complicating the industry, there is an insufficient labor force skilled enough to meet the demand for operating these vehicles. Because these vehicles must be operated manually, earth moving can only be performed during the day, extending the duration of earth moving tasks and further increasing overall costs. The dependence of current earth shaping vehicles on manual operators increases the risk of human error during earth moving processes and reduce the quality of work done at the site.

Additionally, for operators to effectively track and monitor the progress of a routine performed by an autonomous of a semi-autonomous vehicle, the operator should be positioned within the site overseeing the progress of the vehicle. However, such situations expose the operator to unnecessary risks, for example injuries caused by crossing paths with the vehicle, interrupting operation of the vehicle, or stepping through loose earth moved by the vehicle. Accordingly, there exists a need for systems and techniques that allow operators to manage an autonomous or semi-autonomous vehicle from a remote location outside of the site.

SUMMARY

Described is an autonomous or semi-autonomous earth shaping system that unifies an earth shaping vehicle with a sensor system for moving earth within a site. The earth shaping system controls and navigates an earth shaping vehicle through an earth shaping routine of a site. The earth shaping system uses a combination of sensors integrated into the earth shaping vehicle to record the positions and orientations of the various components of the earth shaping vehicle and/or the conditions of the surrounding earth. Data recorded by the sensors may be aggregated or processed in various ways, for example, to determine and control the actuation of the vehicle's controls, to generate representations of the current state of the site, to perform measurements and generate analyses based on those measurements, and perform other tasks described herein.

According to a first embodiment, a computing device used by an operator, generates a graphical user interface that displays a three-dimensional representation of the site. The three-dimensional representation of the site comprises a position of an earth shaping vehicle within the site and a target location within the site where the earth shaping vehicle is deployed to move or shape earth. The computing device transmits a target tool path to the earth shaping vehicle that includes operations for the vehicle to perform to shape or move a volume of earth from the target location. The target tool path may alternatively include operations for the earth shaping vehicle to perform an alternate earth-shaping task. As the earth shaping vehicle moves earth from the target location based on the target tool path, the computing device receives data recorded by one or more sensors mounted to the earth shaping vehicle. The received sensor data describes a current depth of the target location, a current volume of earth excavated from the target location, a position of the earth shaping vehicle relative to the target location, a location of a dump pile where the earth shaping vehicle deposits excavated earth, and a height of the dump pile. Based on the received sensor data, the graphical user interface displayed on the computing device is modified to display the current depth of the target location, the position of the vehicle relative to the target location, the location of the dump pile, and the height of the dump pile. Additionally, the target tool path is modified based on the received sensor data and the modified target tool path is transmitted to the computing device.

According to a second embodiment, a computing device used by an operator generates an initial geofence around a target location in response to a first user input to a graphical user interface displayed on the computing device. The computing device transmits operations for an earth shaping vehicle to perform while navigating within the initial geofence. The computing device receives an indication of an obstacle within the initial geofence detected by the earth shaping vehicle. The indication of the obstacle may be displayed on the graphical user interface. In response to a second user input via the graphical user interface, the computing device generates an updated geofence that includes the target location but excludes the obstacle. The computing device transmits the updated geofence to the earth shaping vehicle, and the earth shaping vehicle performs the operations while navigating within the updated geofence.

The described graphical user interfaces enable operators to remotely monitor and manage semi-autonomous and autonomous vehicles operating in a site, which improves the overall efficiency with which the vehicles can operate and reduces risks to both the vehicles and the operators managing the vehicles.

BRIEF DESCRIPTION OF DRAWINGS

FIGS. 12A-12D are illustrations of a graphical user interface presented to an operator to analyze metrics of an earth-shaping routine and an earth shaping vehicle, according to an embodiment.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

I. Excavation System

Figure 1:
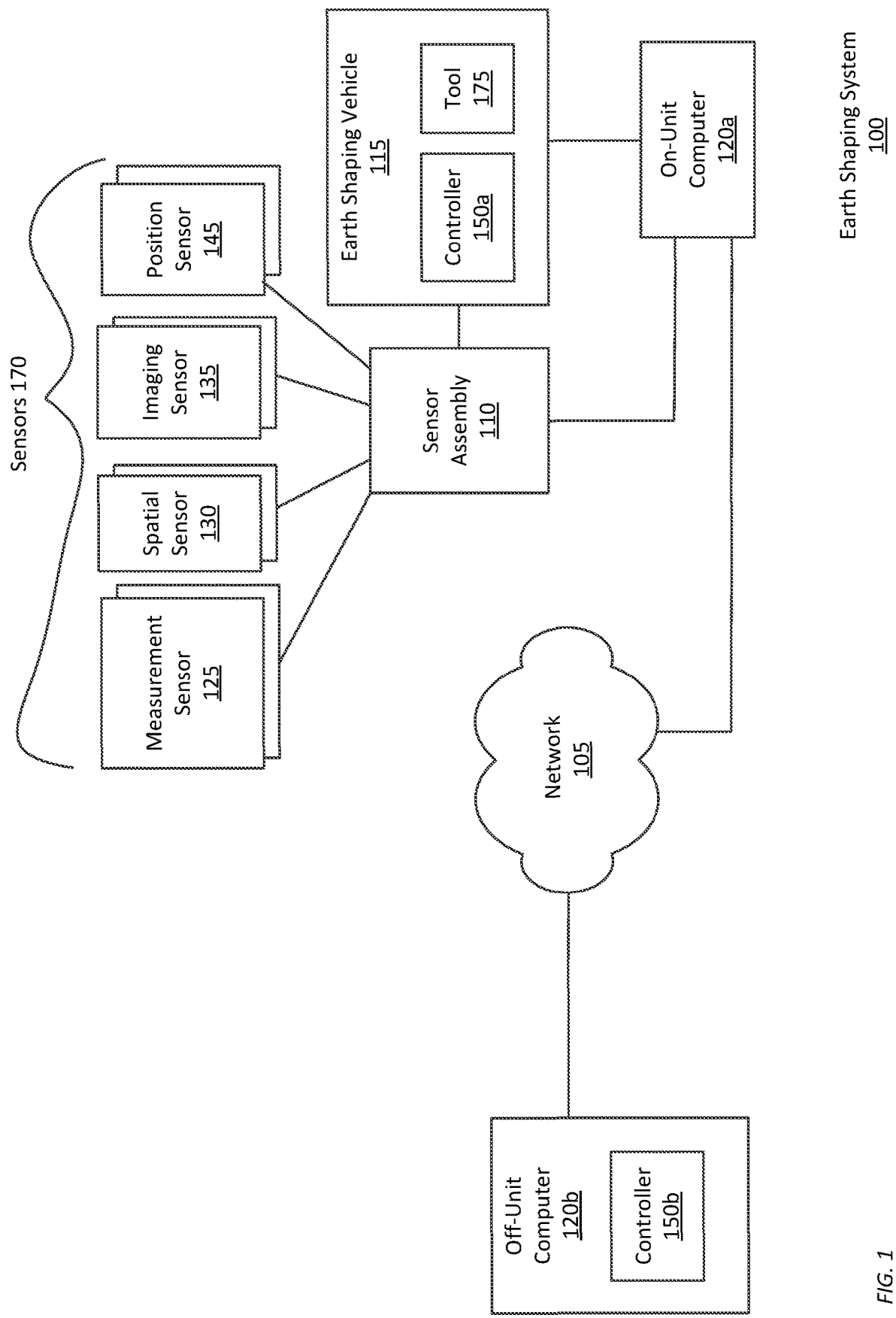
FIG. 1 shows an earth shaping system for moving earth, according to an embodiment.
Figure 2A:
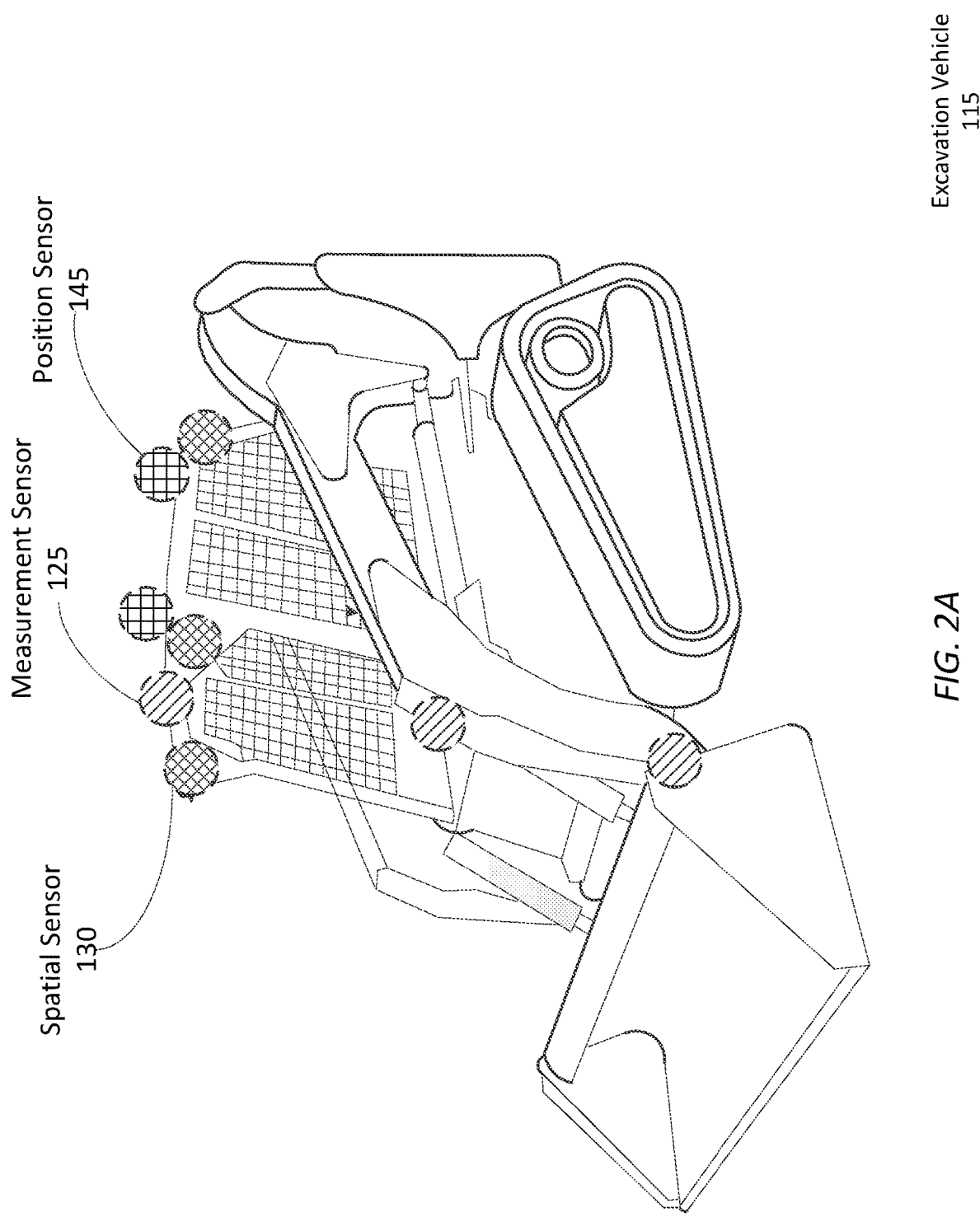
FIG. 2A illustrates an example placement of sensors on a track trencher configured to excavate earth from a target location, according to an embodiment.
Figure 2B:
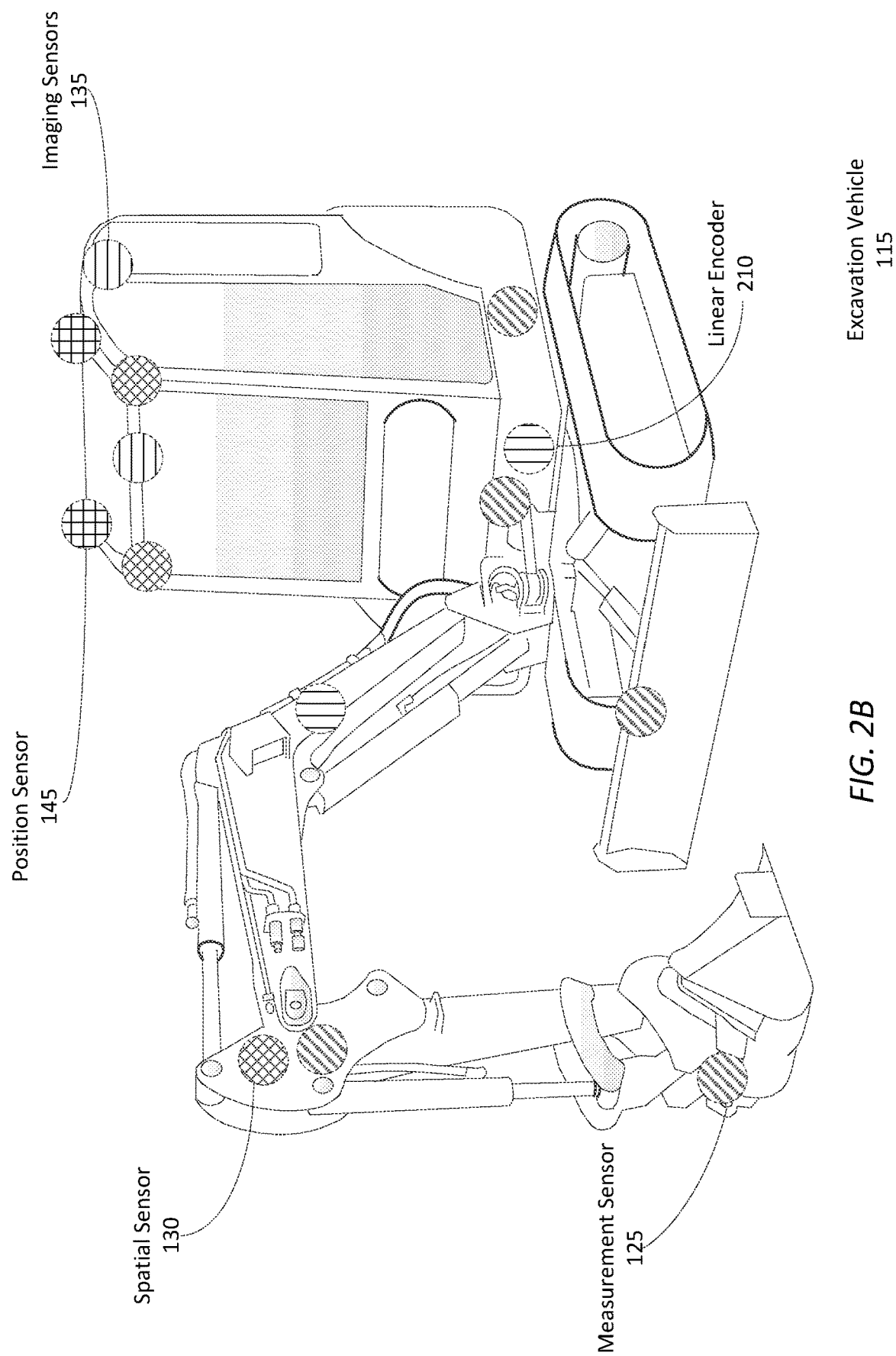
FIG. 2B illustrates an example placement of sensors for a skid-steer loader configured to excavate earth from a target location, according to an embodiment.

FIG. 1 shows an earth shaping system 100 for moving earth autonomously or semi-autonomously from a dig site using a suite of one or more sensors 170 mounted on an earth shaping vehicle 115 to record data describing the state of the earth shaping vehicle 115 and the site as earth is moved within the site. As examples, FIGS. 2A and 2B illustrate the example placement of sensors for a track trencher and a skid steer loader, respectively, according to example embodiments. FIGS. 1-2B are discussed together in the following section for clarity.

The earth shaping system 100 includes a set of components physically coupled to the earth shaping vehicle 115. These include a sensor assembly 110, the earth shaping 115 itself, a digital or analog electrical controller 150, and an on-unit computer 120a. The sensor assembly 110 includes one or more of any of the following types of sensors: measurement sensors 125, spatial sensors 130, imaging sensors 135, and position sensors 145.

Each of these components will be discussed further below in the remaining sub-sections of FIG. 1. Although FIG. 1 illustrates only a single instance of most of the components of the earth shaping system 100, in practice more than one of each component may be present, and additional or fewer components may be used different than those described herein.

I.A. Earth Shaping Vehicle

The earth shaping 115 may be an excavation vehicle. Excavation vehicles are items of heavy equipment designed to move earth from beneath the ground surface within a dig site. As described herein, a dig site may also be referred to, more generally, as a site. Excavation vehicles are outfitted with a tool 175 that is large and capable of excavating large volumes of earth at a single time, particularly relative to what an individual human can move by hand. Generally, excavation vehicles excavate earth by scraping or digging earth from beneath the ground surface. Examples of excavation vehicles within the scope of this description include, but are not limited to loaders such as backhoe loaders, track loaders, wheel loaders, skid steer loaders, scrapers, graders, bulldozers, compactors, excavators, mini-excavators, trenchers, skip loaders In implementations involving excavation vehicles, the tool 175 is an excavation tool including not only an instrument collecting earth, such as a bucket or shovel, but also any articulated elements for positioning the instrument for the collection, measurement, and dumping of dirt. For example, in an excavator or loader the excavation tool refers not only to the bucket but also the multi-element arm that adjusts the position and orientation of the tool.

In addition to excavation vehicles, earth shaping vehicles may additionally refer to hauling vehicles, compacting vehicles, or any other vehicles deployed within a dig site to assist and optimize the performance of various earth shaping tasks. For example, an excavation vehicle may excavate earth from below the surface of a dig site and deposit the excavated earth into a hauling vehicle. The hauling vehicle transports to earth from a first location in the dig site to a second location, for example a fill location. At the fill location, the hauling vehicle empties contents of a hauling tool to fill earth into a hole and a compacting vehicle compacts the filled earth. Alternatively, in place of the hauling vehicle filling earth at a fill location, another excavation vehicle may transfer earth from the hauling vehicle 115b to the fill location. In implementations for which multiple vehicles perform tasks, instructions are communicated to each vehicle in the dig site via the network 105. As described herein, excavation vehicles, hauling vehicles, and compacting vehicles may be broadly referred to as "earth shaping vehicles."

Whereas excavation vehicles are configured with an excavation tool for moving earth from beneath the ground surface, hauling vehicles are large and capable of moving large volumes of earth above the surface from a first location to a second location some distance away. Typically, hauling vehicles are configured with hauling tools capable of transporting a larger volume of earth than an excavation tool configured to an excavation vehicle over larger distances. Examples of hauling vehicles include on-road or off-road trucks, for example dump trucks, articulated dump trucks or belly dumps, self-loading trucks, for example scrapers, scraper-tractors, high-speed dozers, or other wheeled or tracked equipment configured to tow a scraper attachment.

In implementations involving hauling vehicles 115, the tool 175 is a hauling tool that is an instrument for securely transporting earth over a distance. The hauling tool may additionally refer to actuation elements, which when actuated by a hydraulic system, adjust the orientation and position of the hauling tool to fill earth into a location on the dig site.

Compacting vehicles are designed with a compacting tool for compacting earth that has been filled into a fill location, earth that has been loosed by the navigation of other vehicles through the dig site, earth that was excavated and deposited at a previous time, or a combination thereof. Examples of compacting vehicles include, but are not limited to, smooth drum rollers, wheeled rollers, sheepsfoot rollers, pneumatic rollers, tandem vibratory compactors, rammers, vibratory plate compactors, wheeled dozers, and landfill compactors.

Additionally, in implementations involving compacting vehicles, the tool 175 is a compaction tool that is an instrument for improving the compactness of loose earth in the dig site. As described herein, compaction tool may refer not only to the tool in contact with loose earth, but also the element that adjusts the position and orientation of the tool.

Among other components, earth shaping vehicles 115 generally include a chassis (not shown), a drive system (not shown), an earth shaping tool 175, an engine (not shown), an on-board sensor assembly 110, and a controller 150. The chassis is the frame upon on which all other components are physically mounted. The drive system gives the earth shaping vehicle 115 mobility through the site.

The engine powers both the drive system and the earth shaping tool 175. The engine may be an internal combustion engine, or an alternative power source, such as an electric motor or battery. In many earth shaping vehicles 115, the engine powers the drive system and the earth shaping tool commonly through a single hydraulic system, however other means of actuation may also be used. A common property of hydraulic systems used within earth shaping vehicles 115 is that the hydraulic capacity of the vehicle 115 is shared between the drive system and the tool. In some embodiments, the instructions and control logic for the earth shaping vehicle 115 to operate autonomously and semi-autonomously includes instructions relating to determinations about how and under what circumstances to allocate the hydraulic capacity of the hydraulic system.

Although particular embodiments throughout the description are described with reference to an earth shaping vehicle, a person having ordinary skill in the art would recognize that the described techniques, systems, and embodiments may also be applied to earth shaping routines involving hauling vehicles, compacting vehicles, or other earth shaping vehicles deployed autonomously or semi-autonomously to perform an earth shaping routine.

I.B. Sensor Assembly

As introduced above, the sensor assembly 110 includes a combination of one or more of: measurement sensors 125, spatial sensors 130, imaging sensors 135, and position sensors 145. The sensor assembly 110 is configured to collect data related to the earth shaping vehicle 115 and environmental data surrounding the earth shaping vehicle 115. The controller 150 is configured to receive the data from the assembly 110 and carry out the instructions and operations to perform an earth shaping routine provided by the computers 120 based on the recorded data. This includes operations to control the drive system to move the position of the tool based on the environmental data, a location of the earth shaping vehicle 115, and the earth shaping routine.

Sensors 170 are either removably mounted to the earth shaping vehicle 115 without impeding the operation of the earth shaping vehicle 115, or the sensor is an integrated component that is a native part of the earth shaping vehicle 115 as made available by its manufacturer. Each sensor transmits the data in real-time or as soon as a network connection is achieved, automatically without input from the earth shaping vehicle 115 or a human operator. Data recorded by the sensors 170 is used by the controller 150 and/or on-unit computer 120a for analysis of, generation of and carrying out of earth shaping routines, among other tasks.

Position sensors 145 provide a position of the earth shaping vehicle 115. This may be a localized position within a dig site, or a global position with respect to latitude/longitude, or some other external reference system. In one embodiment, a position sensor is a global positioning system interfacing with a static local ground-based GPS node mounted to the earth shaping vehicle 115 to output a position of the earth shaping vehicle 115. In one embodiment, position sensors 145 comprise at least one transmitter/receiver pair, one of which is mounted to the earth shaping vehicle and the other is positioned away from the vehicle 115, for example a GPS satellite. In implementations in which a computer 120 determines a position of features or obstacles within a dig site relative to the position of the earth shaping vehicle 115, the positions sensors 145 comprise a single transmitter/receiver pair mounted to the earth shaping vehicle 115. Based on recorded data, the position sensors 115 produce a signal representative of the position and orientation of the earth shaping vehicle relative to the site. The produced signal is processed by the controller 150.

Spatial sensors 130 output a three-dimensional map in the form of a three-dimensional point cloud representing distances, for example between one meter and fifty meters between the spatial sensors 130 and the ground surface or any objects within the field of view of the spatial sensor 130, in some cases per rotation of the spatial sensor 130. In one embodiment, spatial sensors 130 include a set of light emitters (e.g., Infrared (IR)) configured to project structured light into a field near the earth shaping vehicle 115, a set of detectors (e.g., IR cameras), and a processor configured to transform data received by the infrared detectors into a point cloud representation of the three-dimensional volume captured by the detectors as measured by structured light reflected by the environment. In one embodiment, the spatial sensor 130 is a LIDAR sensor having a scan cycle that sweeps through an angular range capturing some or all of the volume of space surrounding the earth shaping vehicle 115. Other types of spatial sensors 130 may be used, including time-of-flight sensors, ultrasonic sensors, and radar sensors.

Imaging sensors 135 capture still or moving-video representations of the ground surface, objects, and environment surrounding the earth shaping vehicle 115 In one embodiment, each camera can output a video feed containing a sequence of digital photographic images at a rate of 20 Hz. In one embodiment, multiple imaging sensors 135 are mounted such that each imaging sensor captures some portion of the entire 360-degree angular range around the vehicle. For example, front, rear, left lateral, and right lateral imaging sensors may be mounted to capture the entire angular range around the earth shaping vehicle 115. In another embodiment, the imaging sensors 135 comprise a plurality of sensors configured to record a field of view in all directions that the machine is capable of moving. Examples imaging sensors 135 include, but are not limited to, stereo RGB cameras, structure from motion cameras, monocular RGB cameras, LIDAR sensors, radar sensors, cameras, an alternative imaging sensor, or a combination thereof. The sensor assembly 110 may include a second set of imaging sensors 135 configured to record the interaction of the earth shaping vehicle 115 with features within the environment, for example excavating earth from a hole, depositing earth at a dump pile, or navigating over a target tool path to excavate earth from a hole. Based on the recorded data, the imaging sensors 135 produce at least one signal describing one or more features of the site based on the position of the earth shaping vehicle 115 within the site. The produced signal is processed by the controller 150.

Measurement sensors 125 generally measure properties of the ambient environment, or properties of the earth shaping vehicle 115 itself. These properties may include tool position/orientation, relative articulation of the various joints of the arm supporting the tool, vehicle 115 speed, ambient temperature, hydraulic pressure (either relative to capacity or absolute) including how much hydraulic capacity is being used by the drive system and the earth shaping tool separately. A variety of possible measurement sensors 125 may be used, including end-effect sensors, hydraulic pressure sensors, linear encoders, radial encoders, inertial measurement unit sensors, incline sensors, accelerometers, strain gauges, gyroscopes, and string encoders. For example, an end-effector sensor is coupled at each joint at which the earth shaping tool experiences a change in angle relative to the ground surface, a change in height relative to the ground surface, or both. Based on recorded data, the measurement sensors 125 produce a signal representative of a position and orientation of the corresponding joint relative to an site. The produced signal is processed by a controller, for example the controller 150, to determine the orientation and/or position of the earth shaping tool and the earth shaping vehicle 115. Data gathered by measurement sensors 125 may also be used to determine derivatives of position information.

Using the track trencher of FIG. 2A as an example, the representations with diagonal crosshatching represent the example placements of a set of measurement sensors 125, the representation with diamond crosshatching represent example placements of a set of spatial sensors 130, and the representations with grid crosshatching represent example placements of a set of position sensors 145. Using the skid-steer loader of FIG. 2B as another example, diagonal crosshatchings represent measurement sensors 125, diamond crosshatchings represent spatial sensors 130, and grid crosshatchings represent position sensors 145. Additionally, vertical crosshatchings near the drive system represent example placements for a linear encoder 210 and horizontal crosshatchings near the roof represent imaging sensors 135, for example RGB cameras.

Generally, individual sensors as well as the sensor assembly 110 itself range in complexity from simplistic measurement devices that output analog or electrical systems electrically coupled to a network bus or other communicative network, to more complicated devices which include their own onboard computer processors, memory, and the communications adapters (similar to on-unit computer 120a). Regardless of construction, the sensors and/or sensor assembly together function to record, store, and report information to the computers 120. Any given sensor may record or the sensor assembly may append to recorded data a time stamps for when data was recorded.

The sensor assembly 110 may include its own network adapter (not shown) that communicates with the computers 120 either through either a wired or wireless connection. For wireless connections, the network adapter may be a Bluetooth Low Energy (BTLE) wireless transmitter, infrared, or 802.11 based connection. For wired connection, a wide variety of communications standards and related architecture may be used, including Ethernet, a Controller Area Network (CAN) Bus, or similar.

In the case of a BTLE connection, After the sensor assembly 110 and on-unit computer 120a have been paired with each other using a BLTE passkey, the sensor assembly 110 automatically synchronizes and communicates information relating to the shaping or moving of earth in a site to the on-site computer 120a. If the sensor assembly 110 has not been paired with the on-unit computer 120 prior to the deployment of the vehicle, the information is stored locally until such a pairing occurs. Upon pairing, the sensor assembly 110 communicates any stored data to the on-site computer 120a.

The sensor assembly 110 may be configured to communicate received data to any one of the controller 150 of the earth shaping vehicle 115, the on-unit computer 120a, as well as the off-unit computer 120b. For example, if the network adapter of the sensor assembly 110 is configured to communicate via a wireless standard such as 802.11 or LTE, the adapter may exchange data with a wireless access point such as a wireless router, which may in turn communicate with the off-unit computer 120b and also on-unit computer 120a. This type of transmission may be redundant, but it can help ensure that recorded data arrives at the off-unit computer 120b for consumption and decision making by a manual operator, while also providing the data to the on-unit computer 120a for autonomous or semi-autonomous decision making in the carrying out of the earth shaping routine.

I.C. On-Unit Computer

Data collected by the sensors 170 is communicated to the on-unit computer 120a to assist in the design or carrying out of an earth shaping routine. Generally, earth shaping routines are sets of computer program instructions that, when executed, control the various controllable inputs of the earth shaping vehicle 115 to carry out an earth shaping routine. The controllable input of the earth shaping vehicle 115 may include the joystick controlling the drive system and earth shaping tool and any directly-controllable articulable elements, or some controller 150 associated input to those controllable elements, such as an analog or electrical circuit that responds to joystick inputs.

Generally, earth shaping routines are broadly defined to include any task that can be feasibly carried out by an earth shaping vehicle 115. Examples include, but are not limited to: dig site preparation routines, excavation routines, fill estimate routines, volume check routines, dump routines, wall cutback routines, backfill/compaction routines. Examples of these routines are described further below. In addition to instructions, earth shaping routines include data characterizing the site and the amount and locations of earth to be excavated. Examples of such data include, but are not limited to, a digital file, sensor data, a digital terrain model, and one or more target tool paths. Examples of such data are further described below.

The earth shaping vehicle 115 is designed to perform operations outlined in a set of instructions for an earth shaping routine either entirely autonomously or semi-autonomously. Here, semi-autonomous refers to an earth shaping vehicle 115 that not only responds to the instructions but also to a manual operator. Manual operators of the earth shaping vehicle 115 may be monitor the earth shaping routine from inside of the earth shaping vehicle 115 using the on-unit computer 120a or remotely using an off-unit computer 120b from outside of the earth shaping vehicle, on-site, or off-site. Manual operation may take the form of manual input to the joystick, for example. Sensor data is received by the on-unit computer 120a and assists in the carrying out of those instructions, for example by modifying exactly what inputs are provided to the controller 150 in order to achieve the instructions to be accomplished as part of the earth shaping routine.

The on-unit computer 120a may also exchange information with the off-unit computer 120b and/or other earth shaping vehicles (not shown) connected through network 105. For example, an earth shaping vehicle 115 may communicate data recorded by one earth shaping vehicle 115 to a fleet of additional earth shaping vehicle 115's that may be used at the same site. Similarly, through the network 105, the computers 120 may deliver data regarding a specific site to a central location, for example a computing device controlled by a remote operator. This may involve the earth shaping vehicle 115 exchanging data with the off-unit computer, which in turn can initiate a process to generate the set of instructions defining operations for an earth shaping vehicle 115 to perform to excavate the earth. The generated set of instructions may be delivered to one or more earth shaping vehicles 115. Similarly, the earth shaping vehicle 115 may also receive data sent by other sensor assemblies 110 of other earth shaping vehicles 115 as communicated between computers 120 over network 105.

The on-unit computer 120a may also process the data received from the sensor assembly 110. Processing generally takes sensor data that in a "raw" format may not be directly usable, and converts into a form that useful for another type of processing. For example, the on-unit computer 120a may fuse data from the various sensors into a real-time scan of the ground surface of the site around the earth shaping vehicle 115. This may comprise fusing the point clouds of various spatial sensors 130, the stitching of images from multiple imaging sensors 135, and the registration of images and point clouds relative to each other or relative to data regarding an external reference frame as provided by position sensors 145 or other data. Processing may also include up sampling, down sampling, interpolation, filtering, smoothing, or other related techniques.

In implementations involving cooperation between multiple earth shaping vehicles in a dig site, the on-unit computer 120a coupled to a primary vehicle tasked with performing an earth shaping routine may communicate instructions including a request to on-unit computers 120a for one or more secondary vehicles such that each secondary vehicle assists the primary vehicle with the performance of the earth shaping routine. For example, in the embodiment of FIG. 1, the earth shaping vehicle 115 may be the primary vehicle and the on-unit computer 120a generates instructions for the earth shaping vehicle 115 to perform an earth shaping routine that requires earth be hauled over a distance and compacted. Accordingly, the on-unit computer 120a communicates a request via the network 105 to an on-unit computer coupled to each of a hauling vehicle and a compacting vehicle. Upon receipt of the request, each on-unit computer generates instructions for the hauling vehicle and the compacting vehicle to assist the earth shaping vehicle with performing the earth shaping routine.

I.D. Off-Unit Computer

The off-unit computer 120b includes a software architecture for supporting access and use of the earth shaping system 100 by many different earth shaping vehicles 115 through network 105, and thus at a high level can be generally characterized as a cloud-based system. Any operations or processing performed by the on-unit computer 120a may also be performed similarly by the off-unit computer 120b.

In some instances, the operation of the earth shaping vehicle 115 is monitored by a human operator. Human operators, when necessary, may halt or override the automated earth shaping process and manually operate the earth shaping vehicle 115 in response to observations made regarding the features or the properties of the site. Monitoring by a human operator may include remote oversight of the whole earth shaping routine or a portion of it. Such monitoring by a remote human operator will be further discussed with reference to FIGS. 9A-13B. Human operation of the earth shaping vehicle 115 may also include manual or remote control of the joysticks of the earth shaping vehicle 115 for portions of the earth shaping routine (i.e., preparation routine, excavation routine, etc.). Additionally, when appropriate, human operators may override all or a part of the set of instructions and/or earth shaping routine carried out by the on-unit computer 120a.

In implementations involving cooperation between multiple earth shaping vehicles in a dig site, the off-unit computer 120b may operate as a central control system, generating instructions for a combination of earth shaping vehicles to cooperatively perform an earth shaping routine. During the generation of those instructions, the off-unit computer 120b may generate a separate set of instructions for each earth shaping vehicle involved in the performance of the routine and communicate a specific set of instructions to each vehicle via the network 105. For example, in the embodiment illustrated in FIG. 1, the off-unit computer 120b may generate a set of instructions for each of the earth shaping vehicle 115, a compacting vehicle, and a hauling vehicle. In another embodiment, the off-unit computer 120b may generate a single set of complete instructions and communicate vehicle-specific subsets of the instructions to each of the vehicles. As described herein, such an off-unit computer 120b may also be referred to as a "central computer 120."

I.E. General Computer Structure

The on-unit 120a and off-unit 120b computers may be generic or special purpose computers. A simplified example of the components of an example computer according to one embodiment is illustrated in FIG. 3.

Figure 3:
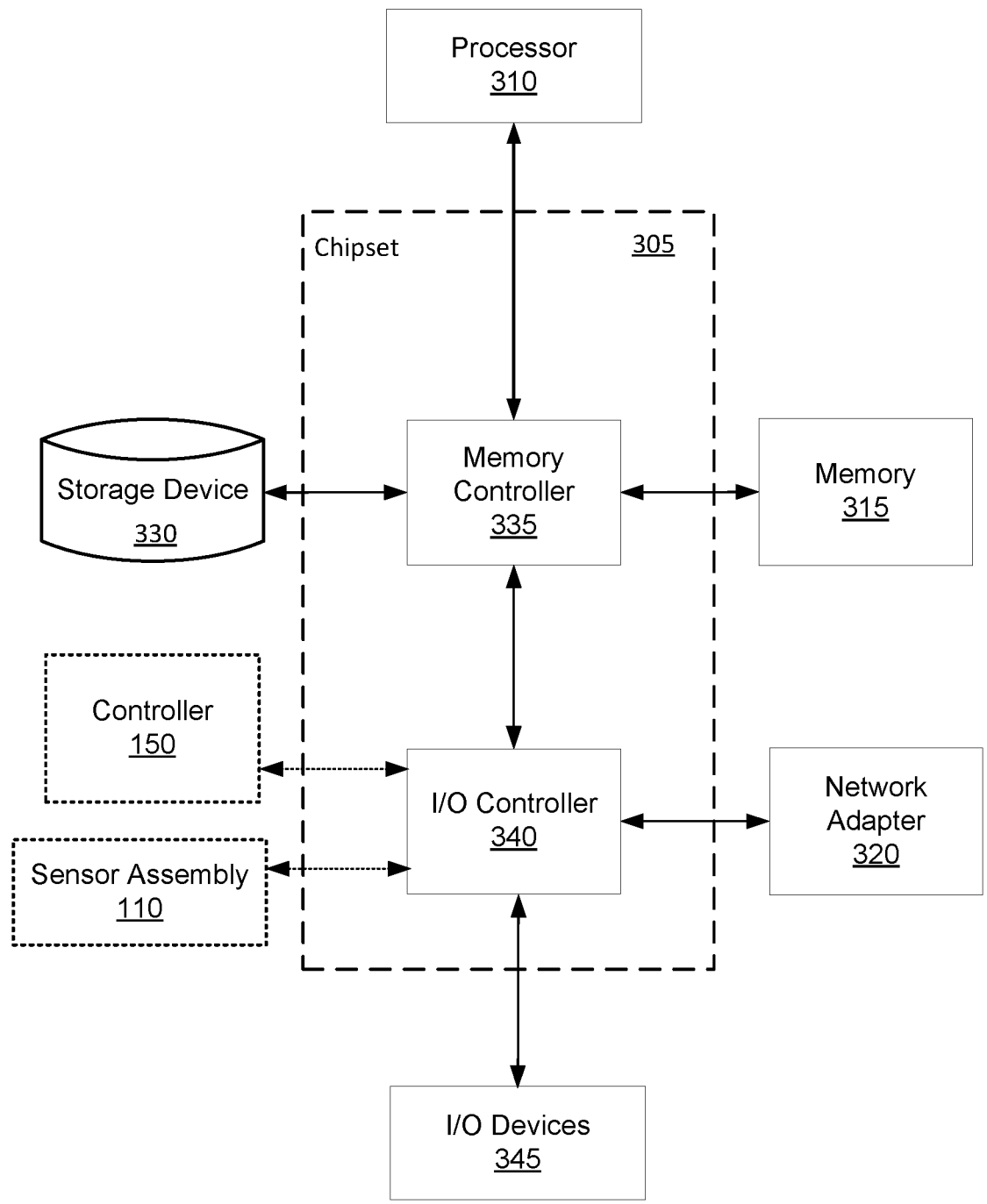
FIG. 3 is a high-level block diagram illustrating an example of a computing device used in an on-unit computer, off-unit computer, and/or database server, according to an embodiment.

FIG. 3 is a high-level block diagram illustrating physical components of an example off-unit computer 120b from FIG. 1, according to one embodiment. Illustrated is a chipset 305 coupled to at least one processor 310. Coupled to the chipset 305 is volatile memory 315, a network adapter 320, an input/output (I/O) device(s) 325, and a storage device 330 representing a non-volatile memory. In one implementation, the functionality of the chipset 305 is provided by a memory controller 335 and an I/O controller 340. In another embodiment, the memory 315 is coupled directly to the processor 310 instead of the chipset 305. In some embodiments, memory 315 includes high-speed random access memory (RAM), such as DRAM, SRAM, DDR RAM or other random access solid state memory devices.

The storage device 330 is any non-transitory computer-readable storage medium, such as a hard drive, compact disk read-only memory (CD-ROM), DVD, or a solid-state memory device. The memory 315 holds instructions and data used by the processor 310. The I/O controller 340 is coupled to receive input from the machine controller 150 and the sensor assembly 110, as described in FIG. 1, and displays data using the I/O devices 345. The I/O device 345 may be a touch input surface (capacitive or otherwise), a mouse, track ball, or other type of pointing device, a keyboard, or another form of input device. The network adapter 320 couples the off-unit computer 120b to the network 105.

As is known in the art, a computer 120 can have different and/or other components than those shown in FIG. 2. In addition, the computer 120 can lack certain illustrated components. In one embodiment, a computer 120 acting as server may lack a dedicated I/O device 345. Moreover, the storage device 330 can be local and/or remote from the computer 120 (such as embodied within a storage area network (SAN)), and, in one embodiment, the storage device 330 is not a CD-ROM device or a DVD device.

Generally, the exact physical components used in the on-unit 120a and off-unit 120b computers will vary. For example, the on-unit computer 120a will be communicatively coupled to the controller 150 and sensor assembly 110 differently than the off-unit computer 120b.

Typically, the off-unit computer 120b will be a server class system that uses powerful processors, large memory, and faster network components compared to the on-unit computer 120a, however this is not necessarily the case. Such a server computer typically has large secondary storage, for example, using a RAID (redundant array of independent disks) array and/or by establishing a relationship with an independent content delivery network (CDN) contracted to store, exchange and transmit data such as the asthma notifications contemplated above. Additionally, the computing system includes an operating system, for example, a UNIX operating system, LINUX operating system, or a WINDOWS operating system. The operating system manages the hardware and software resources of the off-unit computer 120b and also provides various services, for example, process management, input/output of data, management of peripheral devices, and so on. The operating system provides various functions for managing files stored on a device, for example, creating a new file, moving or copying files, transferring files to a remote system, and so on.

As is known in the art, the computer 120 is adapted to execute computer program engines for providing functionality described herein. A engine can be implemented in hardware, firmware, and/or software. In one embodiment, program engines are stored on the storage device 330, loaded into the memory 315, and executed by the processor 310.

I.F. Network

The network 105 represents the various wired and wireless communication pathways between the computers 120, the sensor assembly 110, and the earth shaping vehicle 115. Network 105 uses standard Internet communications technologies and/or protocols. Thus, the network 105 can include links using technologies such as Ethernet, IEEE 802.11, integrated services digital network (ISDN), asynchronous transfer mode (ATM), etc. Similarly, the networking protocols used on the network 150 can include the transmission control protocol/Internet protocol (TCP/IP), the hypertext transport protocol (HTTP), the simple mail transfer protocol (SMTP), the file transfer protocol (FTP), etc. The data exchanged over the network 105F can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

II. Earth Shaping Vehicle Operation Overview

Figure 4:
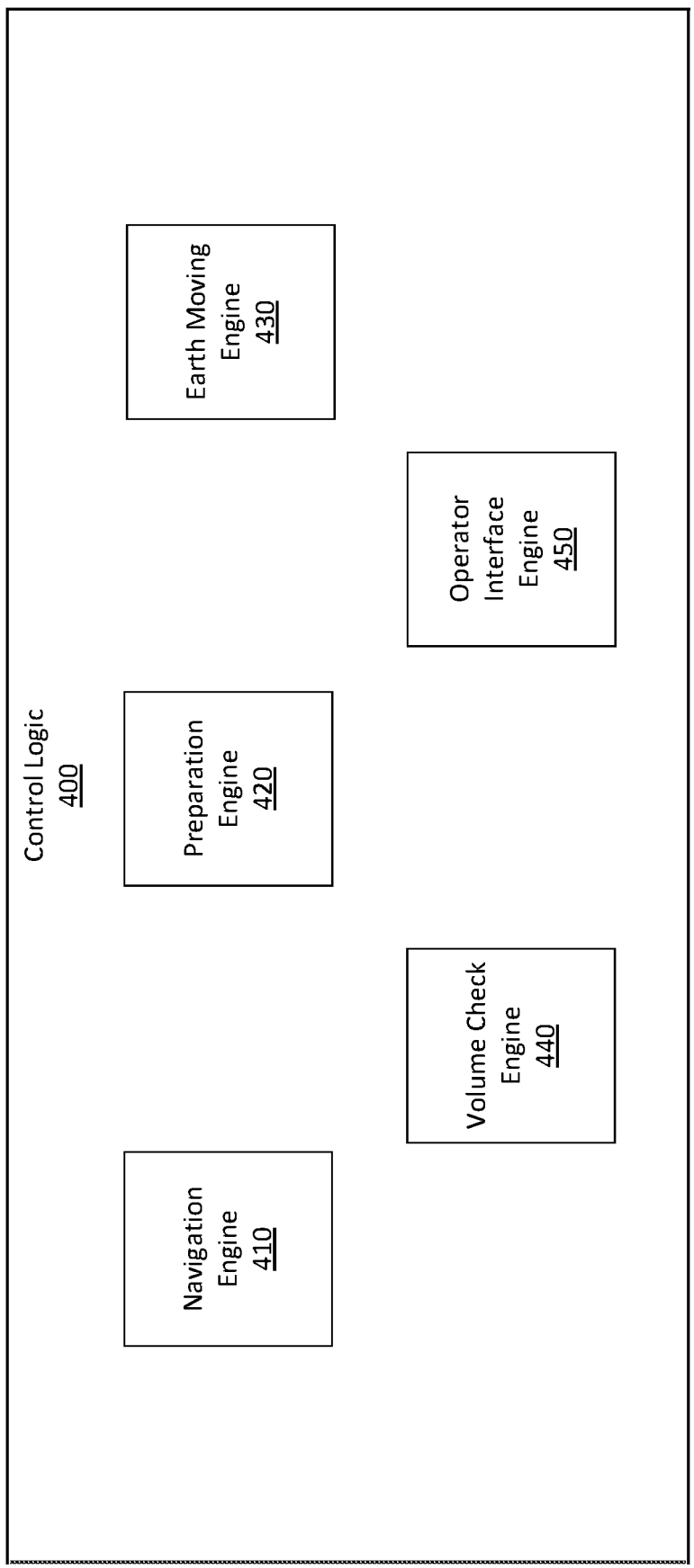
FIG. 4 is a system architecture diagram for controlling an earth shaping vehicle, according to an embodiment.

FIG. 4 is a diagram of the system architecture for the control logic 400 of an earth shaping vehicle 115, according to an embodiment. The control logic 400, an embodiment of the controller 150, is implemented by s software within a central computer, for example an on-unit computer 120a or the off-unit computer 120b, and is executed by providing inputs to the controller 150 to control the control inputs of the vehicle 115 such as the joystick. The system architecture of the control logic 400 comprises a navigation engine 410, a preparation engine 420, an earth moving engine 430, a volume check engine 440. In other embodiments, the control logic 400 may include more or fewer components. Functionality indicated as being performed by a particular engine may be performed by other engines instead.

The navigation engine 410 provides mapping and orientation instructions to the drivetrain 210 of the earth shaping vehicle 115 to navigate the vehicle through the coordinate space of the site and along target tool paths to perform earth shaping routines. The preparation engine 420 creates and/or converts a digital file describing a target state of the site into a set of target tool paths. In combination, the set of target tool paths describes an earth shaping routine and an organizational layout of the site along with any other instructions needed to carry out the earth shaping routine (e.g., a location of earth to be moved, a location at which earth is to be filled, and a location of other vehicles relative to a primary vehicle). The preparation engine is further described with reference to FIGS. 5A and 5B.

The earth moving engine 430 executes instructions (e.g., instructions encoded as a set of target tool paths) to actuate a tool 175 and the drive train to perform an earth shaping routine, for example an excavation routine to excavate earth from a location in a dig site, a filling routine to fill earth at a location in the dig site, or a hauling routine to move earth from one location to another in the dig site. The earth moving engine 430 will be further discussed with reference to FIGS. 6A-6C. The volume check engine 440 measures the amount of earth in an earth shaping tool 175, for example an excavation tool coupled to an excavation vehicle or a hauling tool coupled to a hauling vehicle, and makes a determination regarding whether or not the earth shaping vehicle should release the contents of the tool or continue performing an earth shaping routine. The volume check engine 440 will be further discussed with reference to FIGS. 7A and 7B.

The operator interface engine 450 generates a graphical user interface for presentation to a remote operator on a computing device. The operator interface engine 450 generates various graphical user interfaces or graphic elements that provide the remote operator with insight into the progress of an earth shaping routine, the condition of the earth shaping vehicle 115 performing the routine, and the surrounding area and ground surface of the site. The operator interface engine 450 may additionally enable the remote operator to manually initialize a target tool path and communicate the initialized target tool path to an earth shaping vehicle. Based on feedback from vehicle 115 performing operations outlined by a target tool path, the operator interface engine 450 may generate graphical user interfaces for the operator to modify the tool path in real-time. In any of the implementations described above, the operator interface engine 450 receives interactive input from the remote operator, for example touch input directly on a screen of the computing device or keystrokes via a keyboard of the computing device. Inputs from the operator cause the operator interface engine 450 to perform processing functions including, but not limited to, generating a new graphical user interface, updating an existing graphical user interface, and displaying the graphical user interface on the computing device. In alternate embodiments, the operator interface engine 450 may be a component of the computing device controlled by the operator. In such embodiments, the operator interface engine 450 may be communicatively coupled with the 150 on-board the vehicle 115. The operator interface engine is further described with reference to FIGS. 9A-13B.

For the sake of simplicity, functionality of the control logic 400 is described within the context of an excavation vehicle, however such functionality may be applied to any earth shaping vehicle 115, for example a compacting vehicle or a hauling vehicle.

III. Preparing Instructions for an Earth-Shaping Routine

Figure 5A:
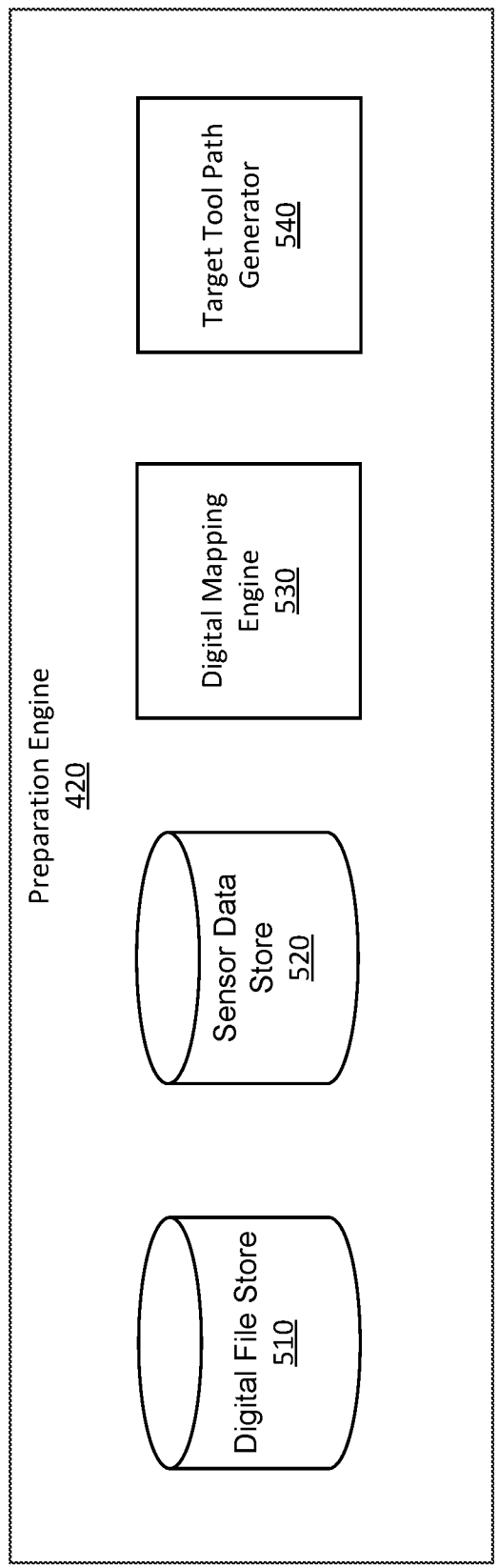
FIG. 5A is a system architecture diagram for a preparation engine, according to an embodiment.

Prior to an earth shaping vehicle 115 performing operations to navigate through the site and excavate earth from a dig location, the controller 150 generates the operations to be performed by the vehicle 115, also referred to as a target tool path, based on a known target state of the site and contextual data describing the initial state of the site. FIG. 5A is a diagram of the system architecture for the preparation engine 420 of a central computer 120, according to an embodiment. The preparation engine 420 generates a digital terrain model including one or more target tool paths which can be followed by the earth shaping vehicle 115. The system architecture of the preparation engine 420 comprises a digital file store 510, a sensor data store 520, a digital mapping engine 530, and a target tool path generator 540. In other embodiments, the preparation engine 420 may include more or fewer components. Functionality indicated as being performed by a particular engine may be performed by other engines instead. Some of the engines of the preparation engine 410 may be stored in the control logic 400.

As described herein, a target tool path represents operations for an earth shaping vehicle 115 to perform to move or shape a volume of earth in the dig site. Examples of such operations include, but are not limited to, routines for excavating earth from a location in the dig site, hauling earth from one location to another in the dig site, filling or depositing earth excavated from one location at another, and compacting or grading earth in the dig site. The operations may also include instructions for actuating an earth shaping tool 175 to move earth in the dig site. For example, a target tool path for an excavation operation, includes instructions to actuate an excavation tool beneath a ground surface and to maintain the position of the tool beneath the ground surface until the tool is filled with earth. That same target tool path may additionally include instructions to raise the position of the tool above the ground surface to measure the volume of earth. Additionally, a target tool path may include instructions to adjust a position and an orientation of an earth shaping tool 175 before, after, or during the performance of an earth shaping operation. For example, a target tool path for an excavation operation, includes instructions to adjust an orientation of an excavation tool to effectively penetrate the ground surface, to maximize the volume of earth collected in the tool, to achieve a breakout angle, or a combination thereof. The target tool path may additionally include navigation instructions, for example a set of coordinates in a coordinate space representing the dig site, for the earth shaping vehicle 115 to navigate along a route between a start point and an end point in the dig site.

The digital file store 510 maintains one or more digital files, which may be accessed from a remote database. In some instances, the controller 150 may access these digital files from the central computer 120b and subsequently store them in the digital file store 510. Digital files may be image files describing the geographic layout of the site as a function of location within a coordinate space of the site, with different images representing a dig location, fill location, an entry ramp, etc. Geographic locations in the coordinate space may be represented as one or more two-dimensional points or three-dimensional points. The digital file may also include data describing how the earth shaping vehicle 115 ought to interact with each location discussed in the digital file. The digital files stored in the digital file store 510 may also include a digital file representing a target state of the site once all earth shaping routines have been completed. Digital files may be constructed using known computer programs and file types, such as a Computer Aided Design (CAD) file or a Building Information Modeling (BIM) file.

For example, a dig location may be characterized by a set of target volume dimensions which should be achieved upon the conclusion of an earth shaping routine. At a boundary of the dig location, the digital file may also include a ramp. Geometrically, the width of the ramp is generally greater than the maximum width of the combination of vehicle 115 and the tool 175 coupled to the vehicle. Additionally, the location of the fill location may be extracted from the digital file or received manually from a human operator. Alternatively, the location of the fill location within the site may be based on the estimated maximum size of the fill location and a specified relative distance between the fill location, the dig location, and other equipment in the site. The placement of the fill location may also be determined based on several considerations including, but not limited to: the risk of excavated earth caving in above the dig location or the fill location, the volume of excavated earth required to form the planned hole, the estimated compaction factor of the excavated earth, and the estimated swell factor of the excavated earth.

When appropriate, the digital file may also describe the location of fiducials representing technical pieces of equipment previously placed at the site such as stakes with active emitters and grade stakes. In alternate instances, the locations of the fiducials may be manually input to a central computer 120 based on the records of a human operator.

The preparation engine 420 generates a representation of the initial state of the site using sensor 170 data, stored within the sensor data store 520. As the navigation engine 410 maneuvers the earth shaping vehicle 115 through the site, sensors 170 gather contextual information on the site which is aggregated into a representation of the current state of the site. More specifically, spatial sensors 130 record spatial data in the form of point cloud representations, imaging sensors 135 gather imaging data, and depth sensors 145 gather data describing relative locations. More generally, the sensor data store 520 stores contextual information describing the current state of the site which refers to a physical landscape of the site and physical properties of soil, or earth, within the site. The navigation engine 410 navigates within the geospatial boundaries defined by the digital file to record contextual information describing the current state of the site.

When recording data via one or more spatial sensors, the spatial sensors 130 record one or more photographic images of various portions of the site. Based on the photographic images, the preparation engine 420 generates a representation of a current physical state of the site by stitching the recorded images into point clouds of data representing the portions of the site. Additionally, for each of the recorded images, the preparation engine 420 records and translates the position and orientation of features within the site into the point cloud representations with respect to the coordinate space of the digital file. In alternative implementations, the sensor assembly 110 uses an imaging sensor 135 to record the contextual information as photographic images of portions of the site and, for each of those images, stores the associated positions and orientations of the relevant features within the photographed portion of the site. Additionally, for each of the recorded images, the preparation engine 420 records and translates the position and orientation of features within the site into the point cloud representations with respect to the coordinate space of the digital file. In another alternate implementation, the sensor assembly 110 uses an imaging sensor 135 to record the contextual information as photographic images of portions of the site and, for each of those images, stores the associated positions and orientations of the relevant features within the portion of the site. Alternatively, the earth shaping vehicle 115 includes sensors and a software assembly that generates a digital terrain model of the site using simultaneous localization and mapping (SLAM).

Using the representation of a current physical state of the site generated based on the sensor data and the representation of the target state of the site, the digital mapping engine 530 generates a digital terrain model of the site. By aligning points in the target state of the site with the initial state of the site in the coordinate space, the digital mapping engine 530, or alternatively the central computer 120, identifies differences between the two representations. For example, the digital mapping engine 530 may determine a volume of earth to be excavated to form the planned hole from the digital file. In one embodiment, digital mapping engine 530 aligns (or registers) the two representations (the digital file and the contextual data) using the known locations of fiducials and other locations within the site common to both representations. Position data from a position sensor 145 such as a GPS or the boundaries of the sites provided by both representations may also be used by the digital mapping engine 530 to perform the alignment. The digital mapping engine 530 may additionally use algorithms, such as Iterative Closest Point (ICP) to align the two representations. In one embodiment, for every point pair in the actual/target representations, if the difference in elevation (e.g., Z-axis relative to the ground plane) is greater than a threshold, the digital mapping engine 530 multiplies the difference in elevation by the resolution of the representation to calculate a voxel volume, and is then summed together. The digital mapping engine may perform such a technique at multiple points to determine how the two representations should be adjusted relative to each other along an axis to align them.

In some implementations, the preparation module, or alternatively the central computers 120, use the digital terrain model to determine the difference in volume between the two representations which translates into the volume of earth to be excavated from the hole. Incorporating all the considerations made above, the physical layout of the site, the volume of earth to be excavated, and the creation of cutbacks and slope backs, the preparation engine 420 generates one or more target tool paths.

Using the digital terrain model, the target tool path generator 540 generates one or more target tool paths for the earth shaping vehicle 115 to move a tool 175, or a combination of earth shaping vehicles 115 to move multiple tools 175, to perform an earth shaping routine, for example excavating a volume of earth, filling a volume of earth, or navigating the earth shaping vehicle 115 within the site. Tool paths provide instructions for a semi-autonomous vehicle to perform an earth shaping routine in the form of geographical steps and corresponding coordinates for the earth shaping vehicle 115 and/or coupled tool to traverse within the site. In implementations where the site is represented in the digital terrain model as a coordinate space, for example the implementations described above, a target tool path includes a set of coordinates within the coordinate space. A target tool path may further represent a measure of volume relative to the volume of the planned hole. For example, if a hole is 4" wide, 3" long, and 2" deep, a single target tool path includes coordinates within the 12" area of the coordinate space and, at each coordinate, places the tool at a depth of 2" in order to excavate the hole using a single target tool path. Target tool paths may describe a variety of shapes representing a variety of earth shaping techniques, for example substantially rectangular pathways in two dimensions, substantially triangular pathways in two dimensions, hyperrectangular pathways in three dimensions, hyperrectangular pathways in three dimensions, elliptic pathways in two dimensions, hyperelliptic pathways in three dimensions, or curved lines along the plane of the ground surface.

For holes of greater volumes or requiring a graded excavation, the target tool path generator 540 may generate multiple target tool paths at different offsets from the finish tool path. For example, if three target tool paths are required to excavate a 6" deep hole, the first may be performed at a depth of 3", the second at a depth 2", and the third at a depth of 1". As a result, a target tool path may represent instructions for excavating only a fraction of the volume of excavated earth. For example, the last tool path used at the conclusion of the excavation of the hole may be referred to as a finish tool path, which digs minimal to no volume, but is primarily intended to even the surface of the bottom of the dug hole. While moving through the finish tool path, the tool excavates less earth from the hole than in previous tool paths by adjusting the depth of the leading edge or the angle of the tool beneath the ground surface. To conclude the excavation of the hole, the earth shaping vehicle 115 adjusts a non-leading edge of the tool and reduces the speed of the drive. In some implementations, instructions included in each target tool path may be executed by a different earth shaping vehicle 115, resulting in a fleet of earth shaping vehicles 115 operating cooperatively to complete a task.

For holes of greater volumes that may require a graded excavation, the target tool path generator 540 may generate multiple tool paths at different offsets from the finish tool path. For example, if three tool paths are required to excavate a 6" deep hole, the first may be performed at a depth of 3", the second at a depth 2", and the third at a depth of 1". As a result, a tool path may represent only a fraction of the volume of excavated earth. In one embodiment, the target tool path generator 540 calculates the number of tool paths by dividing the target depth of the hole by the maximum depth that each tool path is capable of. In some instances, the maximum depth that each tool path is capable of is also defined by the dimensions of the tool 175 attached to the earth shaping vehicle 115. In other embodiments, the tool paths may be manually generated using the off-unit computer 120b as the central controller 120.

In some implementations, tool paths may not describe the shape of the hole in three-dimensions, instead removing the depth measurement to only specify a two-dimensional pathway or two-dimensional plane in the three or two-dimensional coordinate system. In such instances, the depth instructions for how deep to dig with a tool path may be provided to the controller 150 in a separate set of instructions.

The target tool path generator 540 may define tool paths are defined based on several factors including, but not limited to, the composition of the soil, the properties of the tool being used to excavate the hole, the properties of the drive system moving the tool, and the properties of the earth shaping vehicle 115. Example properties of the earth shaping tool 175 and earth shaping vehicle 115 include the size of the tool, the weight of the earth shaping tool 175, and the force exerted on the earth shaping tool 175 in contact with the ground surface of the site.

When performed in reverse or in alternative sequences, the processes described above and below with respect to trenching and drilling as specific examples may also perform other earth shaping routines including, but not limited to, digging, grading, filling, trenching, compacting, aerating, ripping, stripping, spreading, and smoothing.

Figure 5B:
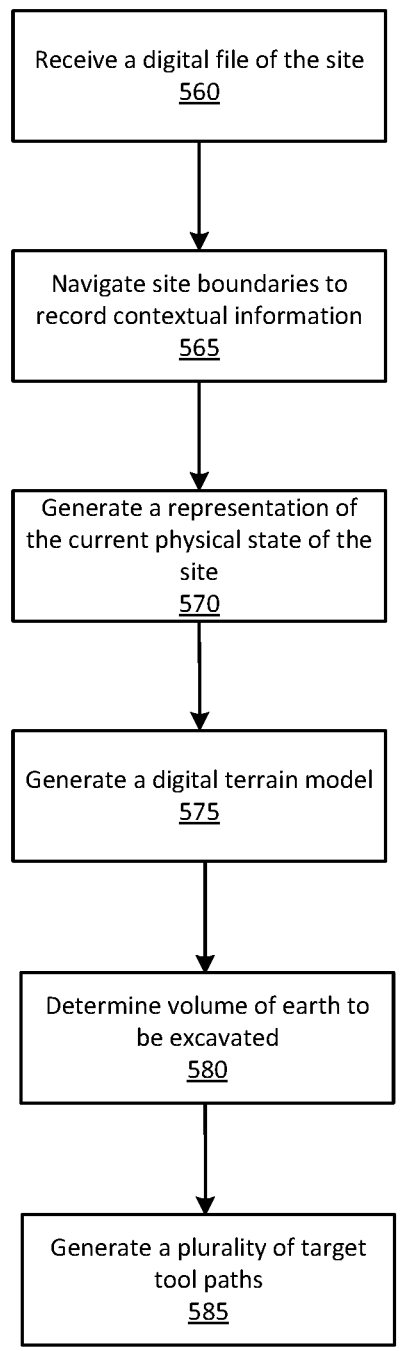
FIG. 5B is a flowchart describing a process for a controller to prepare a digital terrain model for a site, according to one embodiment.

To implement the system architecture of the preparation engine, FIG. 5B shows an example flowchart describing the process for a controller 120 to prepare a digital terrain model of the site, according to an embodiment. As described above, a digital file of the site detailing planned excavation of a hole and the area surrounding the hole is received 560 by the controller 150 and stored within the digital file store 510. In some instances, the controller 150 may access these digital files from an central computer 120 and subsequently store them in the digital file store 510.

The navigation engine 410 navigates 565 the earth shaping vehicle 115 within the geospatial boundaries defined by the digital file to record contextual information describing the current state of the site. Contextual information refers to the physical landscape of the site and the physical properties of the soil within the site. The contextual information, stored in the data store 520, is recorded using the system of sensors, such as spatial sensors and imaging sensors. When recording data via one or more spatial sensors, the spatial sensors 130 record one or more photographic images of various portions of the site. The preparation engine 420 stitches the recorded images into one or more point clouds of data representing the portions of the site to generate 570 a representation of a current physical state of the site. Additionally, for each of the recorded images, the position and orientation of features within the site are recorded and translated into the point cloud representations with respect to the coordinate space of the digital file. In other implementations, the sensor assembly 110 uses an imaging sensor 135 to record the contextual information as photographic images of portions of the site and, for each of those images, stores the associated positions and orientations of the relevant features within the portion of the site. In another implementation, the earth shaping vehicle 115 includes sensors and a software assembly that generates a digital terrain model of the site using simultaneous localization and mapping (SLAM).

Using the generated representation of a current physical state of the site and representation of the target state of site, the preparation engine 420 generates 575 a digital terrain model of the site. As described earlier, the digital mapping engine 530 aligns the digital terrain model by aligning the two representations using common features such as physical fiducials within the sites or the boundaries of the site.

Using the digital terrain model, the preparation engine 420 determines 580 the volume of earth to be excavated based on the differences between the representation of the current state of the site and the target state of the site. More specifically, using the digital terrain model, the central computer 120 determines the difference in volume between the two representations which translates into the volume of earth to be excavated from the hole. Incorporating all the considerations made above, the physical layout of the site, the volume of earth to be excavated, and the creation of cutbacks and slope backs, the preparation engine 420 generates 585 one or more target tool paths. Finally, the central computer 120 delivers a set of instructions, in the form of target tool paths, for controlling the tool 175 and vehicle 115 to perform an earth shaping routine or a part of an earth shaping routine.

More information regarding the preparation of an earth-shaping routine and the generation of target tool paths outlining operations for performing the earth shaping routine can be found in U.S. patent application Ser. No. 15/877,221 filed on Jan. 22, 2018, which is incorporated by reference herein in its entirety.

IV. Removing Earth from a Dig Location

IV.A Overview

Figure 6A:
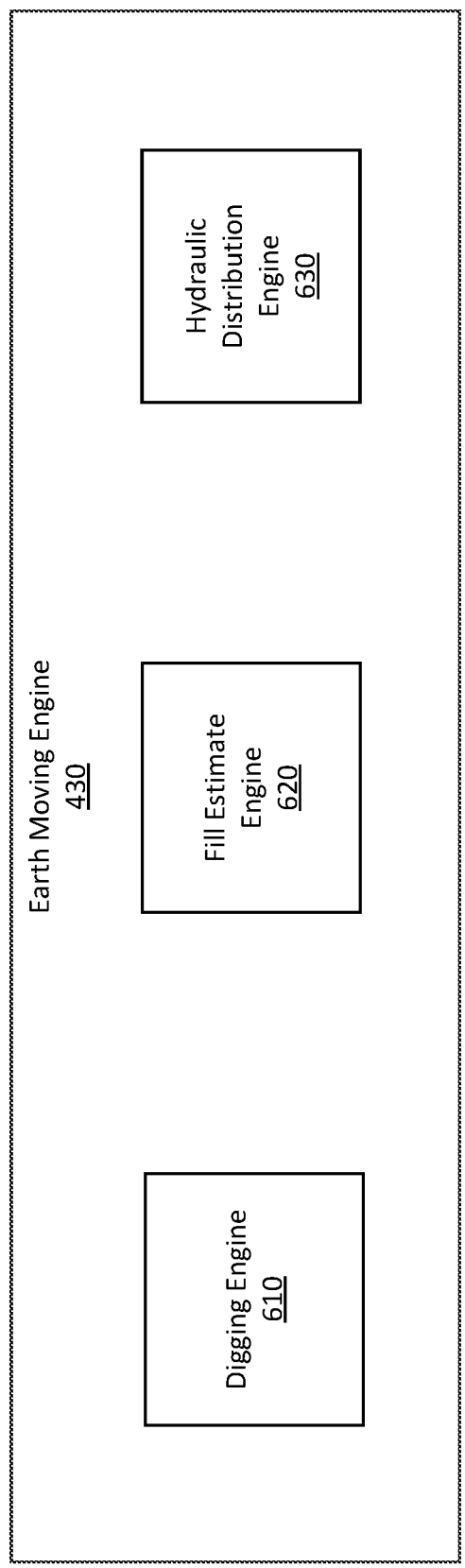
FIG. 6A is a system architecture diagram for an earth removal engine, according to an embodiment.

FIG. 6A is a diagram of the system architecture for the earth moving engine of an earth shaping vehicle 115, according to an embodiment. The earth moving engine 430 performs operations for guiding the tool through an earth shaping routine, for example an excavation routine to excavate earth from the hole. The operations enable to the controller 150 to lower the tool into contact with the ground surface and then advance (directly or indirectly by moving the entire vehicle 115 with the drive train 210) forward to excavate earth from the ground into the tool. The system architecture of the earth removal engine 530 comprises a digging engine 610, a fill estimate engine 620, and a hydraulic distribution engine 630. In other embodiments, the earth moving engine 430 may include more or fewer components. Functionality indicated as being performed by a particular engine may be performed by other engines instead. Some of the engines of the earth moving engine 430 may be stored in the control logic 400. For the sake of simplicity, functionality of the earth moving engine 430 is described within the context of an excavation vehicle, however such functionality may be applied to any earth shaping vehicle 115, for example a compacting vehicle or a hauling vehicle. Additionally, although earth shaping routines are described in the context of moving or shaping earth in a site, such routines may be further applied to the moving of any material found in a site. Examples of such alternate materials include, but are not limited to, concrete, wood, supplies, equipment, other any other materials or objects found in a site.

The digging engine 610 performs a digging routine to excavate a volume of earth from a planned hole at a dig location consistent with a set of operations outlined in the form of a target tool path. The digging engine 610 performs a digging routine by accessing the one or more target tool paths for an excavation routine, for example as generated by the preparation engine 420, and moves the tool 175 and/or vehicle 115 accordingly. The digging engine 610 may also continuously or periodically track the position of the tool within the coordinate space using information obtained from the position sensor 145. In response to instructions from another engine attempting to carry out an earth moving routine (e.g., the digging engine 610), the hydraulic distribution engine 630 monitors and adjusts the distribution of hydraulic pressure from the engine that is allocated between the drive system and tool 175. In practice, the digging engine 610 may specify some vehicle or tool parameters to be maintained, such as the tool 175 breakout angle, and the hydraulic distribution engine 630 sets the hydraulic distribution between the tool 175 and drive system to maintain those parameters.

The fill estimate engine 620 determines an estimate of the volume of earth in-situ as the tool is moved over a target tool path. The fill estimate engine 620 compares the estimate to a threshold volume of earth and when the estimated volume is greater than the threshold volume, the fill estimate engine 620 interrupts an earth shaping routine and raises the tool above the ground surface and performs a check routine to better estimate the amount of earth currently in the tool.

The hydraulic distribution engine 630 monitors and adjusts the distribution of hydraulic pressure from the engine that is allocated between the drive system and tool 175. The hydraulic distribution engine 630 does this in response to instructions from another engine (such as the digging engine 610) attempting to carry out the excavation routine, as control of the hydraulic pressure dictates the actuation of the tool 175 and movement of the vehicle 115. In practice, the digging engine 610 may specify some device parameter to be maintains, such as the tool 175 breakout angle, and the hydraulic distribution engine 610 sets the hydraulic distribution between the tool 175 and drive system to maintain that breakout angle. As described herein, a breakout angle refers to the threshold angle of the tool at which the tool is capable for breaking through the ground surface during a digging routine.

More information regarding the preparation of an earth-shaping routine and the generation of target tool paths outlining operations for performing the earth shaping routine can be found in U.S. patent application Ser. No. 15/877,217 filed on Jan. 22, 2018, which is incorporated by reference herein in its entirety.

IV.B Digging Routine

Figure 6B:
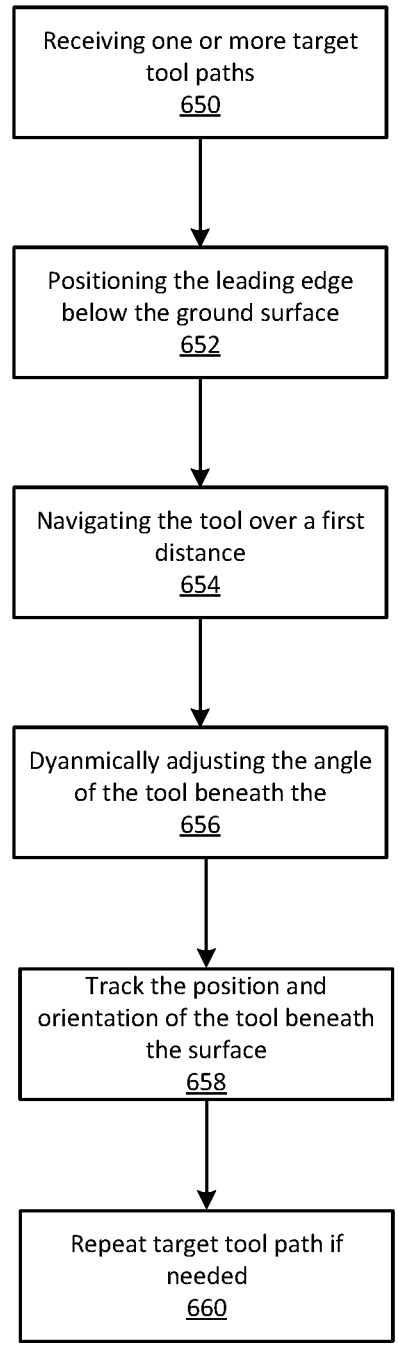
FIG. 6B is a flowchart describing a process for an earth shaping vehicle to perform an excavation routine, according to one embodiment.

In one implementation, the navigation engine 410 on an excavation vehicle 115 moves an excavation tool 175 forward through a dig location within the site to excavate earth from the dig location. FIG. 6B is a flowchart describing a process for an earth shaping vehicle to perform an excavation routine, according to one embodiment. The earth moving engine 430 receives 650 the one or more target tool paths generated by the preparation engine 420 and positions 652 the leading edge of the tool below the ground surface. The depth below the ground surface at which the tool is placed is guided by the operations outlined in a target tool path.

In addition to defining the height at which the leading edge is lowered beneath the ground surface, the target tool path may also include instructions describing how a first distance for the navigation engine 410 to move the excavation tool without raising the tool above the ground surface. Accordingly, the navigation engine 410 navigates 645 the tool over the first distance. To maintain the movement of the excavation tool beneath the ground surface, the digging engine 610 dynamically adjusts 656 mechanical conditions of the excavation vehicle 115 including, but not limited to, the angle of the tool beneath the ground surface, the torque output of the engine system, and the true speed of the tool. The angle of the tool beneath the ground surface can be adjusted to reduce the rate at which the tool collects excavated earth. For example, when the tool is angled perpendicular to the flat ground surface, the rate of excavation may be at its highest. Alternatively, when the tool is angled parallel to the flat ground surface, the rate of excavation may be at its lowest. Additionally, at lower speeds, the tool is generally often better able to maintain the angle optimal for excavating earth.

While moving through the excavation routine at the dig location, the earth moving engine 430 tracks 658 the position and orientation of the excavation tool within the coordinate system using the position sensors 145 physically mounted on the excavation vehicle 115 as described above in reference to FIGS. 2A-2D. The orientation of the tool, described with reference to the angle of the tool relative to a reference orientation, is recorded using one or more position sensors 145. Examples of reference orientations include the ground surface, a gravity vector, or a target tool path. As the tool is moved along the target tool path, the soil may push the leading edge to a neutral to the angle of the reference orientation, at which point the tool is raised above the ground surface.

As the digging engine 610 moves the excavation tool along a target tool path, soil friction and soil composition factors may result in tool deviating from the target tool path, creating an actual tool path that was travelled by the tool 175 or vehicle 115. Because of the deviation between the target tool path and the actual tool path, the actual tool path is associated with a different set of coordinates within the coordinate space than those associated with the target tool path. In one embodiment, the digging engine 610 repeats 660 the same target tool path until a deviation between the target tool path and the actual tool path is less than a threshold deviation, or until some other outcome is achieved, such as a threshold amount of earth is removed. Alternatively, if the deviation between the target tool path and the actual tool path is below a threshold deviation, the excavation tool performs the next portion of the excavation routine which may be a check routine, a dump routine, or second (e.g., deeper) target tool path. Periodically while moving through the actual tool path, the digging engine 610 updates the tool fill level and records the speed of both the tool and the drive system. Based on these recorded considerations, the digging engine 610 either continues to move the excavation tool through the earth or interrupts the digging routine to perform a check routine. In response the excavation vehicle 115, the controller 150 may update the tool fill level, before continuing with the excavation routine for the planned hole.

The digging engine 610 may also determine that the target tool path is obstructed by one or more obstacles, for example rocks, trees, roots, wooden beams, buried pipelines, cables, pieces of concrete, asphalt, and steel. Determinations regarding the presence of obstacles along the tool path are made based on occurrence of one or more of a set of conditions, including, but not limited to, an engine load greater than the target engine load, a ground speed lower than the minimum ground speed, and a tool angle lower than a target tool angle. These inputs may be received by the sensors 170 and passed to the central computer 120 for evaluation by the digging engine 610.

When an obstruction, for example an obstacle or another vehicle 115, is determined to be within the target tool path, the digging engine 610 may store the geospatial location of the obstacle, for example a current location of the vehicle 115 as provided by the position sensor 145, perform a dump routine to release earth from the tool, and return to the location of the obstacle within the site to perform a break routine to hopefully break up and/or remove the object. Break routines, in one embodiment, include instructions to the controller to repetitively drive the leading edge of the tool downward into the earth around the location of the obstacle, running the leading edge of the tool over the location of the detected obstacle to "scrape" or loosen this earth, and activating an alternate tool (not shown) to break down the obstacle. In another embodiment, after determining that an obstacle lies within the target tool path, the earth removal engine 530 may halt the digging routine until a human operator can manually operate this 115 or another excavation vehicle to remove the object.

In addition to finishing target tool paths and possibly separately from a digging routine, the digging engine 610 may perform a grading routine to perform grading tasks. A grading routine may, for example, include moving the tool forward through the hole to grade the ground surface of the hole, where the tool is set at a shallow or zero depth position relative to the aggregate or average ground plane. At such a shallow depth, the tool requires less forward force from the drive system to move the tool forward than when the tool is lowered to a greater, digging-oriented depth. This allows the earth shaping vehicle 115 to implement a tool suited to grading, such as a tool of greater volume relative to a digging routine oriented tool, which would be able to hold a greater amount of earth within the mechanical and hydraulic constraints of the earth shaping vehicle 115 and while also requiring fewer dump routines for dumping excess graded earth. Grading of the ground surface may result in an uneven ground surface when the tool moves in a first direction, so the digging engine 610 may further cause the tool to be moved in a reverse direction and possibly further cause the excavation tool to repeat movement over the previously graded earth.

IV.C. Fill Level Estimate Routine

Figure 6C:
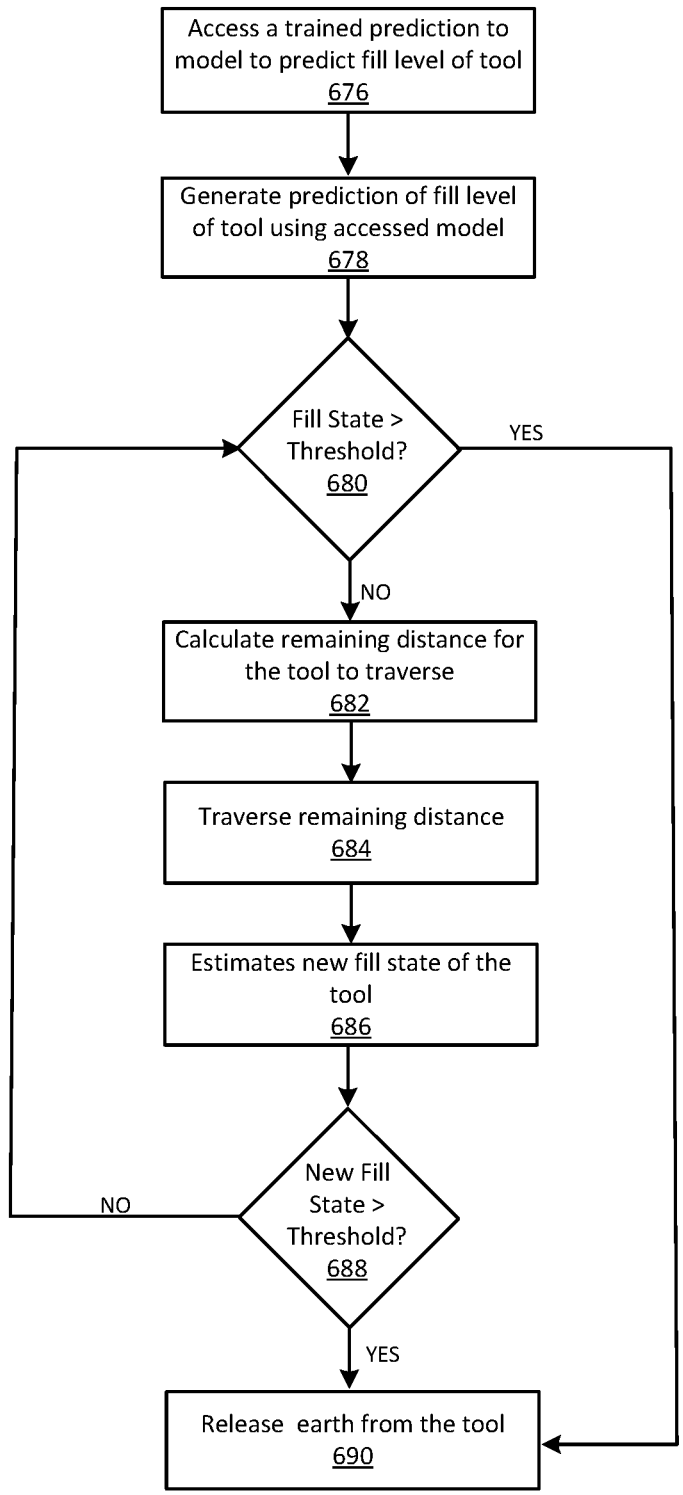
FIG. 6C is a flowchart describing a process for an earth shaping vehicle to perform a fill estimate routine, according to one embodiment.

Before interrupting the performance of a target too path to perform a check routine to raise the tool above the ground surface and to determine the volume of earth in the bucket, an excavation vehicle 115 may perform an earth shaping routine that includes instructions for a fill estimate routine. As described herein, a fill estimate routine causes the controller 120 to estimate the tool fill level of without interrupting the movement of the tool within the target tool path. FIG. 6C shows a flowchart describing the process for the fill estimate engine 620 to perform a fill estimate routine, according to an embodiment.

The fill estimate engine 620 estimates a fill level of an excavation tool coupled to an excavation vehicle 115 using any one or more of a number of techniques. The fill level of the tool describes the volume of earth in the tool. In one implementation, the fill estimate engine 620 of the excavation vehicle 115 estimates the volume by mathematically integrating the depth of the leading edge beneath the ground surface over the distance traveled by the tool over the target tool path. In another implementation, the fill estimate engine 620 uses the point cloud representation of the current state of the site gathered using one or more spatial sensors to determine a pre-excavation volume of earth in the hole and accesses, from the central computer 120 or a remote server, a swell factor of the earth relating the volume of earth in the tool to the pre-excavation volume of earth in the hole. Using the pre-excavation volume of earth in the hole and the swell factor characteristic of the earth, the fill estimate engine 620 may estimate the volume of earth in the tool. Additionally, the fill estimate engine 620 may use the sensor assembly 105 to measure the quantity of earth accumulated in front of the leading edge of the tool while the tool is in the position set by the currently-in-progress target tool path. The fill estimate engine 620 may also use measurement sensors to measure the force of earth acting on the tool beneath the surface and adjust the angle of the tool to estimate the fill level of the tool.

Alternatively, the fill estimate engine 620 may access 676 a previously trained prediction model that is capable of receiving as input the distance traveled by the tool along with other parameters of the vehicle 115 and excavation routine and outputting an estimated amount of earth in the tool. These other parameters include, but are not limited to, any sensor value, the tool type and width, the vehicle type, and the depth of the leading edge of the tool below the ground surface during the target tool path. The fill estimate 620 applies the trained prediction model to generate 678 a trend line that extrapolates tool fill level as a function of distance traveled, which may in turn be used to generate an estimate when to initiate a check or dump routine. Alternately, the prediction model may generate such an estimate directly.

The fill estimate engine 620 compares 680 the fill estimate to a threshold volume. The threshold volume may be the maximum available volume of the tool, a volume set manually by a human operator, a volume set by a calibration procedure using the tool in an empty state, or another volume.

When the estimated volume is greater than the threshold volume, the digging engine 610 may receive instructions from the fill estimate engine 620 to measure the angle of the tool beneath the ground surface, adjusts the angle of tool towards the breakout angle, and raises the tool above the ground surface. Alternatively, when the estimated volume is less than the threshold volume, the fill estimate engine 620 may instruct the digging engine 610 to resume performance of the digging routine. However, in one implementation the fill estimate engine 620 calculates 682 the remaining distance for the tool to traverse in order to be filled at maximum capacity using a trend line generated by the prediction model. Based on the available volume in the tool, the trend line is inputted into the prediction model to determine the remainder distance on the target tool path that the tool needs to travel to be filled at maximum capacity.

As previously described, in some implementations, the fill estimate engine 620 measures the quantity of earth accumulated in front of the leading edge. When the measured quantity of earth is above a threshold quantity, the excavation vehicle raises the tool above the ground surface. Similarly, the fill estimate engine 620 may measure the force of earth acting on the tool beneath the ground surface and, when the measured force of earth is above a threshold quantity, the digging engine 610 receives instructions to raise the tool above the ground surface.

After calculating the remaining distance to be traveled, the fill estimate engine 620 traverses 684 the remaining distance and estimates 686 a new volume of earth in the tool. As with the previous volume estimate, the updated volume estimate is compared 688 to the threshold volume. This process may be repeated multiple times. When the estimated volume is greater than the threshold volume, the controller 150 performs a dump routine and releases 690 earth from the excavation tool. The dump routine is further described below in reference to FIG. 8A-8B.

Alternatively, the controller fill estimate engine 620 estimates the volume in the tool to be below a threshold value and repeats the target tool path without calculating a remaining distance. After navigation the tool over the remaining distance of the target tool path, the fill level estimate engine 620 periodically measures an updated tool fill level and repeats navigation over the target tool path until the updated volume estimate is greater than the threshold volume.

IV.D. Hydraulic Distribution Adjustment

Because maintaining the tool at a desired angle or depth through the carrying out of a target tool path is a non-trivial task, the hydraulic distribution engine 630 adjusts the hydraulic capacity allocated to the drive system and tool path dynamically to navigate a vehicle 115 over a target tool path, adjust a tool 175 to perform an earth shaping routine, or a combination thereof. Generally, the excavation vehicle only has sufficient hydraulic pressure to power a single system at full capacity. As a result, both the drive and tool systems may be powered equivalently at half capacity. However, if, based on soil friction, forces, speeds, tool angles, or other conditions, the angle and depth of the tool cannot be maintained at half capacity, the hydraulic distribution engine 630 may redistribute the hydraulic pressure within the system to favor the tool over the drive system (e.g., 75%-25% distribution, or otherwise). The calibration for the hydraulic system may be performed by observing joystick manipulations within the excavation vehicle and recording the changes in pressure distribution. The remainder of this section describes a number of example operating conditions that can trigger hydraulic pressure adjustments and what those adjustments are.

In moving the tool through the target tool path, the hydraulic distribution engine 630 measures the speed of the tool and compares it to a target speed. The target speed refers to the speed that the drive system is traveling. The hydraulic distribution engine 630 may calculate the target speed based on the knowledge of the earth of the site exhibiting an industry standard soil friction or a soil friction determined specifically for a particular excavation vehicle 115, a specific target tool path being performed within a site, or more generally the enter dig site. If the hydraulic distribution engine 630 measures that the speed of the vehicle is lower than the target speed, the hydraulic distribution engine 630 may determine that the soil friction (or force of soil exerted on the tool) is greater than expected and, in response, adjust the distribution of hydraulic pressure between the drive system and the tool to favor the tool to increase the speed of the tool. While this may be accomplished in some instances by increasing the amount of hydraulic pressure capacity allocated to the drive system, the amount of hydraulic capacity available is finite and so this is not always a viable solution. Often, greater than expected soil friction is due to the tool being too deep (or angled along a path proceeding downward), thus generating more friction and often causing the tool to fall off the target tool path. To compensate, the hydraulic distribution engine 740 may adjust the tool to a shallower depth or angle, which will accomplish reducing the soil friction and raising tool speed. This process may play out in reverse for a tool speed greater than expected, which may be adjusted by lowering the tool or setting it at a deeper angle.

The maintenance of the hydraulic capacity in this manner and as described elsewhere herein prevents the vehicle 115 from stalling during the performance of an earth moving routine or from complications regarding raising a tool above the ground surface. In one embodiment, to maintain sufficient hydraulic capacity for the vehicle to make adjustments to the position and orientation of the tool during the digging routine, the hydraulic distribution engine 630 maintains hydraulic pressure within the hydraulic system below a threshold 90% of the maximum hydraulic pressure capacity.

A breakout event and corresponding breakout angle may be detected as a tool 175 naturally breaks through the ground surface during the digging routine. At speeds above the target speed and/or at forces above the threshold force, the tool is unable to collect earth and break out of the ground surface. Similarly, at speeds below the target speed and forces below the threshold force, the tool inefficiently collects earth. To reduce the number of erroneous breakout events that occur during an earth shaping routine, the engine 630 measures the force of earth on the tool and adjusts the distribution of pressure, so that the tool angle has sufficient hydraulic pressure to be adjusted beneath the ground surface. For example, the tool may be lowered or angled downward to dig more deeply in cases of high speed/low force, and angled upward/raised to dig more shallowly in cases of low speed/high force. Additionally, as the tool moves through the target tool path and collects earth, the excavation vehicle may continuously adjust the angle of the tool. If the tool eventually breaks out of the ground surface, the excavation vehicle 115 records the breakout angle and may voluntarily opt to perform a volume check routine rather than continuing a digging routine.

Before a breakout event occurs, the digging engine 610 may also calculate an expected breakout angle based on the soil composition properties for the earth within the hole. Soil composition properties are further described below. During a digging routine, the digging engine 610 may define the breakout angle as the minimum angle of the tool at rest. Alternatively, the breakout angle may be established as inversely proportional to the soil cohesion measurement. To achieve the breakout angle as the tool is raised above the ground surface, the hydraulic distribution engine 740 adjusts the distribution of hydraulic pressure between the drive system and the tool 175 by monitoring engine load or line pressure sensors in the hydraulic system and dynamically adjusting power output commands to the drivetrain and to the tool actuators.

In another implementation, if the difference in the set of coordinates for the actual tool path and the target tool path is greater than a threshold difference, the distribution of hydraulic pressure is adjusted to lower or raise the tool at a greater or lesser depth below the ground surface to more closely match the target tool path.

Additionally, the hydraulic distribution engine 630 may use the target tool path received by the digging engine 610 to maintain the hydraulic capacity of the hydraulic system and, when appropriate, adjust the target speed of the drive system by adjusting the distribution of hydraulic pressures. Decreasing the target speed results in a reduction of the overall hydraulic pressure in the hydraulic system to ensure that the hydraulic system offers sufficient scope in to adjust the position and orientation of the tool during the digging routine within minimal delay. For example, if the hydraulic pressure within the system is 98% of the maximum hydraulic pressure, exceeding the threshold hydraulic pressure, the hydraulic distribution engine 740 can reduce the target speed of the excavation vehicle 115 by dynamically executing instructions to divert hydraulic pressure from the drivetrain to the set of tool actuators. By redistributing hydraulic pressure away from the certain components of engine system and towards other components of the engine system, the hydraulic distribution engine 740 can prioritize certain excavation functions and maintain high excavation efficiency by the tool and excavation vehicle 115.

V. Volume Check Routine

Figure 7A:
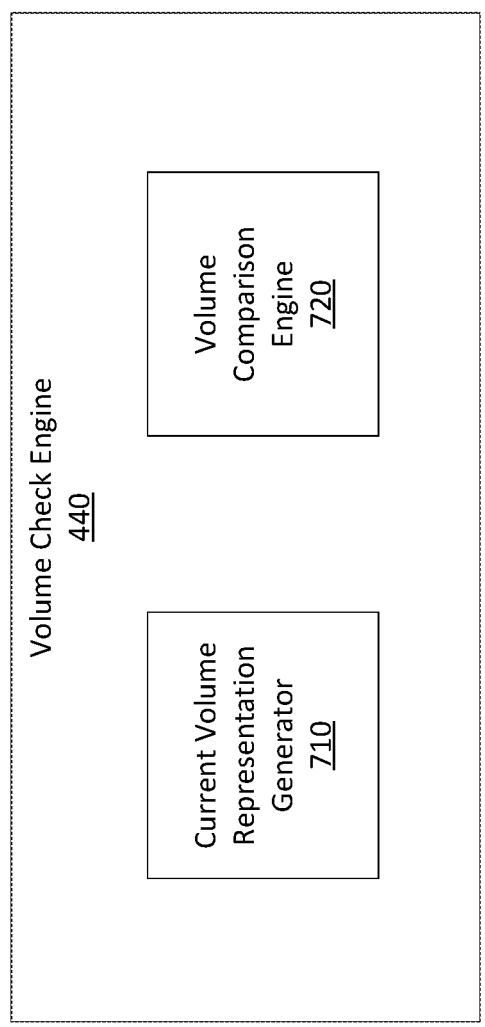
FIG. 7A is a system architecture diagram for a volume check engine, according to an embodiment.

As described above with reference to FIG. 6C, the fill estimate engine 620, may interrupt the performance of an earth moving routine to estimate a fill level of a tool 175 coupled to an excavation vehicle 115. If the fill level is estimated to below a threshold, the excavation vehicle continues to execute instructions for resuming a target tool path to complete the earth moving routine. However, if the fill level of the tool is estimated to be above a threshold, the fill estimate engine 620 communicates instructions for the volume check engine 440 to measure the volume of earth in the tool with higher accuracy. FIG. 7A is a diagram of the system architecture for the volume check engine 440 of an excavation vehicle 115, according to an embodiment. The volume check engine 440 performs operations to measure the volume of earth in the tool once raised above the ground surface and determining whether to continue moving the tool along the target tool path or to perform a dump routine of the earth within the tool. The system architecture of the volume check engine 440 comprises a current volume representation generator 710 and a volume comparison engine 720. In other embodiments, the volume check engine 440 may include more or fewer components. Functionality indicated as being performed by a particular engine may be performed by other engines instead. Some of the engines of the volume check engine 540 may be stored in the control logic 400.

To generate a current representation of the fill state of the tool, the current volume representation generator 710 uses data recorded by the sensors of the sensor array 110. The implemented sensors may include an imaging sensor, a spatial sensor, or some combination of the two sensors and the data describing the fill state of the tool may be represented as a point cloud or an image. The volume check engine 440 adjusts the tool 175 to a measuring position at a height in the field of view of the one or more sensors. For example, the volume check engine 440 can raise and tilt the tool to bring the interior volume of the tool into the field of view of the set of sensors. The volume check engine 440 may confirm that the tool is in the measuring position by sampling data from the position sensors 145 mounted directly on the tool 175 or within the hydraulic system. The volume check engine 440 may also confirm that the tool is in the measuring position by analyzing images recorded by a system of depth and imaging cameras mounted to the excavation vehicle 115. If the distribution of earth within the tool is uneven, the check routine instructions may cause the volume check engine 440 to shake the tool one or more times to achieve a more uniform distribution of the earth inside.

Alternatively, to determine the position of a tool 175 within the three-dimensional coordinate space, the current volume representation generator 710 may use the sensors 170 by measuring the quantity of earth in the tool and referencing a parametric model or lookup table to determine the position of the tool in the coordinate space. Lookup tables are generated by measuring the output of a sensors at various positions of the tool and correlating the two conditions. For example, at a depth of 1 meter, the tool is located at a position 4 meters perpendicular to the ground. The correlation between a depth measurement of 1 meter and a position measurement of 4 meters is stored within the lookup table. The referenced lookup table may differ depending on the type of sensor used and the format of the output provided. The current volume representation generator 710 may receive outputs from multiple sensors facing distinct regions of the interior of the tool.

Next, the current volume representation generator 710 generates a representation of the amount of earth currently in the tool based on the position of the tool within the coordinate space and one or more soil composition properties measured by the combination of sensors, for example the densities, sizes, shapes, and colors of the particles of the earth in the tool. The soil property engine 550 analyzes data captured by the sensors 170 to determine the soil composition of the excavated earth within the tool.

In addition to the representation of the amount of earth in the tool, the current volume representation generator 710 also accesses an empty representation of the tool calibrated prior to the performance of the digging routine. To calibrate the empty representation of the tool, the empty tool is adjusted to multiple heights and angles above the ground surface. For each of the heights and angles, the current volume representation generator 710 implements a sensor to record data describing the available volume within the empty tool. As described above, the recorded data and the respective height and angle measurements are stored in a lookup table to be referenced by the excavation vehicle 115. Depending on the sensor used to record the data, the contents of the lookup table may differ, for example a lookup table generated using a spatial sensor 130 includes a point cloud representation of the empty tool at various heights whereas a lookup table generated using a measurement sensor 125 includes a volume measurement of the empty tool at various heights.

The volume comparison engine 720 compares a representation of the current fill state of the tool (e.g., in image or point cloud form) and an empty representation of the tool (in a comparable form) to determine the volume of earth within the tool. The empty representation of the tool may be generated during an off-run calibration procedure and stored in a memory of the central computer 120 for access and use as part of the check routine. Alternatively, the empty representation may be provided to the volume comparison engine 820 manually by a human operator.

Figure 7B:
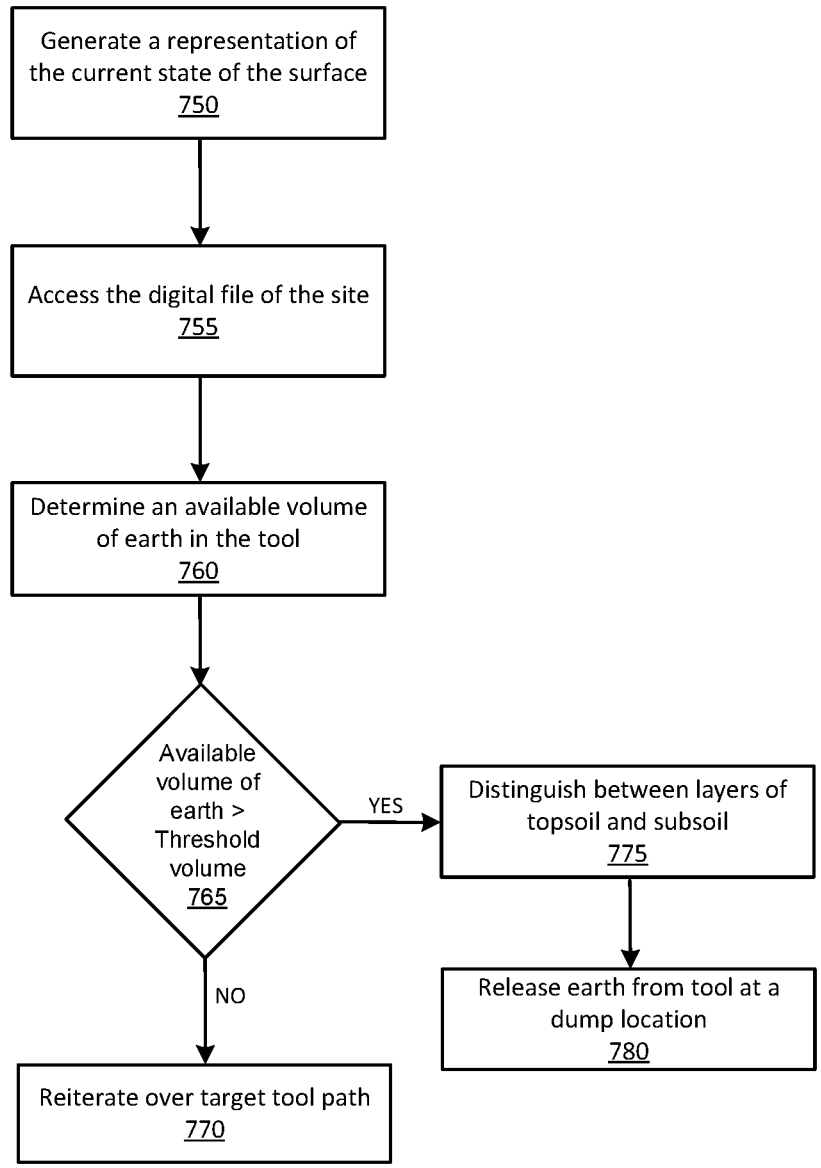
FIG. 7B is a flowchart describing a process for an earth shaping vehicle to perform a volume check routine, according to an embodiment.

FIG. 7B shows a flowchart describing an alternate implementation for an volume check engine 440 to perform a volume check routine. The current volume representation generator 710 generates 750 the representation of the amount of earth in the tool using a sensor, for example a spatial sensor 130, to output a three-dimensional representation of the current state of the ground surface. As with the previous implementation, the volume comparison engine 720 accesses 755 the digital file describing the expected state of the site. Using the digital file and the representation of the current state to describe the amount of earth excavated from the hole, the volume comparison engine 720 determines 760 a volume difference between the two representations describing the volume of earth within the tool. When comparing 765 the determined volume difference to a threshold difference, if the volume difference is less than a threshold difference, the volume check engine 440 readjusts and maintains the leading edge of the tool beneath the ground surface to adjust the angle of the tool and reiterates 770 over the target tool path. Alternatively, if the volume difference is greater than a threshold difference, the volume check engine 440 releases 775 earth from the tool at a corresponding fill location.

The volume check engine 440 may update the predictive excavation model based on data collected before, during, or after the completion of a target tool path to guide the movement of the excavation vehicle 115 within the site during any additional target tool paths. For example, the volume check engine 440 updates the trained predictive model discussed above with data with collected during the completed target tool path and implement the updated predictive model to determine the horizontal distance that the tool must travel, at a known depth below the ground surface, to excavate the remaining amount of earth. The volume check engine 440 may update the predictive model to define a relationship between the depths of the tool below the ground surface of the leading edge, the horizontal distance traversed by the tool, the amount of earth loaded into the tool, the soil composition within the site, and the tool width.

More information regarding the preparation of an earth-shaping routine and the generation of target tool paths outlining operations for performing the earth shaping routine can be found in U.S. patent application Ser. No. 15/877,223 filed on Jan. 22, 2018, which is incorporated by reference herein in its entirety.

VI. Remote Management of Earth Shaping Vehicles in a Dig Site

VI.A Overview

Although the techniques described above enable earth shaping vehicles 115 to autonomously or semi-autonomously perform earth shaping routines, a human operator may still be responsible for managing and overseeing the performance of the earth shaping routines. Because these routines are performed autonomously or semi-autonomously, the operator is not seated in the vehicle 115, but rather is located elsewhere in the dig site. However, such manual oversight is not practical in large dig sites in which multiple vehicles 115 are performing different earth shaping routines. Additionally, an operator navigating through a dig site while one or more earth shaping routines are being performed exposes the operator to undue risks and harm, for example standing in the path of an earth shaping vehicle or slipping on loose earth. Accordingly, the operator interface engine 450 generates graphical user interfaces based on data collected by the sensor assembly 110, which allow an operator to remotely monitor and manage one or more earth shaping routines occurring in a dig site. The operator interface engine 450 generates graphical user interfaces that enable an operator to remotely create a target tool path for performing an earth shaping routine, track the progress of the earth shaping routine in real-time, and modify the target tool path based on feedback from a vehicle 115 performing the earth shaping routine.

Figure 8:
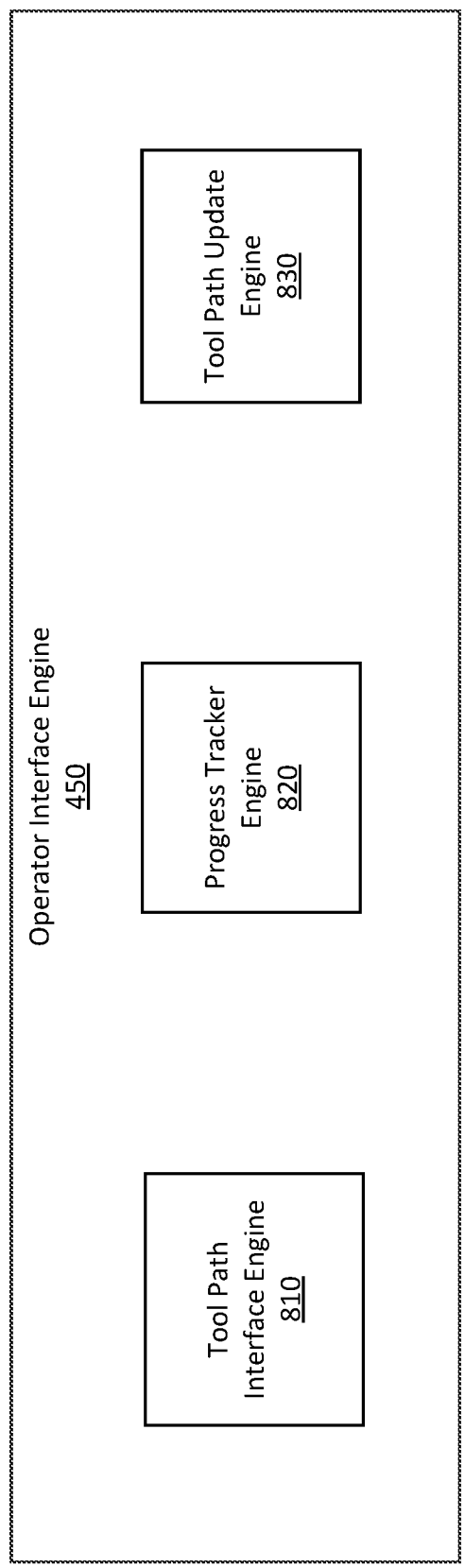
FIG. 8 is a system architecture diagram for an operations interface engine, according to an embodiment.

FIG. 8 is a diagram of the system architecture for the operator interface engine 450, according to an embodiment. The operator interface engine 450 is implemented by software within a central computer 120b (e.g., a remote computing device configured to receive inputs from an operator) The system architecture of the operator interface engine 450 includes a tool path interface engine 810, a progress tracker engine 820, and a tool path update engine 830. In other embodiments, the operator interface engine 450 may include more or fewer components. Functionality indicated as being performed by a particular engine may be performed by other engines instead.

For the sake of explanation, the operator interface engine 450 is illustrated as a component of the control logic 400 (e.g., an example embodiment of the controller 150). However, in other embodiments, the operator interface engine 450 may be a component of an off-unit computing device, for example an off-unit computer 120b, that is monitored by a remote operator. In such embodiments, the operator interface engine 450 is communicatively coupled with the controller 150 to continuously receive sensor data and to communicate initial target tool paths and/or modifications to the target tool paths.

The tool path interface engine 810 generates various graphical user interfaces and graphic elements that enable an operator to build a target tool path. The various interfaces and graphic elements are generated, modified, or displayed in response to an input from the operator, for example a touch input or a keystroke input. The interfaces generated by the tool path interface engine 810 are presented to the operator via a screen on a computing device. The tool path interface engine 810 generates a virtual representation of a dig site including a location of an earth shaping vehicle 115 within the site, other physical features within the site, a target location where earth is to be moved, and a geofence that restricts navigation of the vehicle 115 within the site based on inputs from the operator. As described herein, a location in the dig site that is subject to an earth shaping routine is referred to as a "target location." Examples of target locations include an area where earth is to be excavated or a hole where earth is to be filled. In some implementations, a target tool path defines multiple target locations or includes instructions for the vehicle 115 to move earth at multiple location in the site.

In one implementation, the tool path interface engine 810 generates a three-dimensional virtual representation of the dig site. The three-dimensional representation captures changes in depth of areas in the dig site affected by an earth shaping routine. For example, when building a target tool path for a trenching routine, the three-dimensional representation of the dig site displays an initial depth of the target location where the trench will be excavated. In other embodiments, where an ESV is filling earth into a hole or a trench, the tool path interface engine may capture changes in elevation of the hole or trench and areas in the dig site affected by the earth shaping routine. Alternatively, the tool path interface engine 810 may generate a two-dimensional representation of the dig site.

The toolpath interface engine 810 may additionally generate graphic elements that enable an operator to customize aspects of a target tool path including, but not limited to, dimensions of the target location and operational constraints of the vehicle 115. Once completed, the tool path interface engine 810 transmits the generated target tool path to the earth moving engine 430, which instructs an earth shaping vehicle 115 to perform the target tool path.

When an earth shaping vehicle 115 receives the target tool path and begins to perform operations defined in the target tool path, the operator interface engine 450 displays a graphical user interface with the virtual representation of the dig site to the operator via a computing device. As the earth shaping vehicle 115 continues to perform the target tool path sensors 170 mounted to the vehicle 115 record data describing conditions in the target location, a position of the earth shaping vehicle 115 and the tool 174 in the dig site, regions of the dig site surrounding the target location, and other features of the dig site. Graphical user interfaces generated by the tool path interface engine 810 are further discussed with reference to FIGS. 9A-9F.

The recorded sensor data is transmitted to the progress tracker engine 820, which modifies the displayed interface to reflect conditions in the dig site captured by the sensor data. Continuing from the previous example involving a trenching routine, as an earth shaping vehicle 115 carries out the trenching routine, the sensors 170 record a volume of earth excavated from the target location and a current depth of the trench at the target location. The sensor data may also describe a location where the earth excavated from the target location has been deposited (e.g., a dump pile) and dimensions of the deposited earth (e.g., a height of the dump pile). Additionally, sensor data may indicate that while performing the target tool path, the vehicle 115 navigated to a new position relative to the target location. Accordingly, the progress tracker engine 820 modifies the displayed virtual representation of the dig site in real-time or near real-time to reflect a current depth of the trench, a current height of the dump pile, a current position of the earth shaping vehicle, and other conditions within or around the dig site.

Sensor data may be transmitted by the sensors 170 (or the sensor assembly 110) continuously to enable the progress tracker engine 820 to modify the graphical user interface in real-time. In other embodiments, sensor data may be transmitted by the sensors 170 periodically, at a frequency that enables real-time or near real-time updates of the interface. Graphical user interfaces generated by the progress tracker engine 820 are further discussed with reference to FIGS. 10A-H.

In some embodiments, the progress tracker engine 820 generates a graphical user interface that displays a two-dimensional representation of an earth shaping tool of the vehicle 115, for example the tool 175, relative to the target location. Data received from spatial and position sensors, for example end-effector sensors, mounted at various joints on the tool enables the progress tracker engine 820 to generate a graphical user interface focused on the actuation of the tool 175 as the vehicle 115 performs operations defined in a target tool path. Graphical user interfaces displaying representations of the tool are further described with reference to FIG. 11.

In some implementations, an operator may build multiple target tool paths via the tool path interface engine 810. The multiple target tool paths may be transmitted to a single earth shaping vehicle 115 to be performed sequentially or to multiple earth shaping vehicles 115 to be performed in parallel. A single earth shaping routine, for example a trenching routine, may be divided into multiple target tool paths, where each target tool path represents a region of the trench. Alternatively, each of the multiple target tool paths may represent a different earth shaping routine. For example, a first target tool path may include operations for an excavation routine, a second target tool path may include operations for a filling routine, and a third target tool path may include operations for a compacting routine. Accordingly, an earth shaping vehicle performing the three target tool paths sequentially would first excavate earth from a target location, then fill the excavated earth at another target location, and finally compact the earth at the other target location.

In implementations where a second target tool path causes an earth shaping vehicle 115 to navigate to a second target location, the progress tracker engine 820 may receive a second set of sensor data indicating that the vehicle 115 has navigated to the second target location. In response to receiving the second set of sensor data, the progress tracker engine 820 may modify a graphical user interface displaying the virtual representation of the site to reflect the position of the vehicle at the second target location. Additionally, as the vehicle 115 navigates from a first target location to the second target location, the sensors 170 may continuously record and transmit sensor data to the progress tracker engine 820. Based on the sensor data, the progress tracker engine 820 may continuously modify the graphical user interface to reflect the movement of the vehicle 115 between the first target location and the second target location.

At the second target location, as the earth shaping vehicle 115 begins to perform operations defined in the second target tool path, the progress tracker engine 820 modifies the virtual representation of the site displayed on the graphical user interface based on the activity of the vehicle 115. For example, the progress tracker engine 820 modifies the interface to display a current depth of the second target location, a position of the EV relative to the second target location, and an updated height of the dump pile.

In some embodiments, the tool path update engine 830 modifies a target tool path based on received sensor data. The update to the target tool path may be generated automatically or in response to a user input. Continuing from the earlier example of the trenching routine, after a section of the trench has been excavated, the vehicle 115 may reposition itself relative to the trench to excavate another section of the trench. Based on sensor data received from the sensors 170, the progress tracker engine 820 may determine that the vehicle 115 cannot safely navigate over the excavated section of the trench. Accordingly, the tool path update engine 830 modifies the target tool path for the trenching routine with instructions to prevent the vehicle 115 from navigating over the excavated section of the trench. The progress tracker engine 820 may also modify the target tool path to reflect the completed excavation of that region.

As another example, an earth shaping vehicle following a target tool path to navigation between a start location and an end location may detect a presence of an obstacle. Accordingly, the tool path update engine 830 modifies the target tool path to circumvent the obstacle (e.g., updating the navigation instructions to travel around the obstacle). Alternatively, the tool path update engine 830 may modify the target tool path by adding an operation with instructions for actuating an earth shaping tool to remove the obstacle (e.g., breaking down the obstacle). As an additional example, an earth shaping vehicle may performing operations to fill earth from a dump pile into a hole may detect that no more earth is available at the first location. Accordingly, the tool path update engine 830 modifies the target tool path with instructions to navigate to a second dump pile and to fill earth from the second dump pile into the hole. In yet another example, an earth shaping vehicle 115 may complete a target tool path to fill earth into a hole and determine that the surface of the hole is uneven. Accordingly, the tool path update engine 830 modifies the target tool with instructions to actuate an earth shaping tool 175 to grade the surface of the hole to achieve an even surface.

In addition to modifying a target tool path, the tool path update engine 830 may generate graphical user interfaces for an operator to modify a visual representation of the dig site. For example, in response to an indication or an alert from an earth shaping vehicle, the tool path update engine 830 may generate a graphical user interface for an operator to manually modify coordinates of a geofence within the dig site, add coordinates to the geofence, delete coordinates from the geofence, or a combination thereof. As described herein, a geofence is combination of points within a coordinate system of the site (e.g., a geographic coordinate system, a relative coordinate system, and an absolute coordinate system) and a perimeter within the coordinate system represented by a connection of the combination of points within the coordinate system. When communicated to a controller 150 on an earth shaping vehicle 115, a geofence represents a boundary within which the vehicle 115 can navigate. When the operator interface engine 450 generates a virtual representation of the dig site, the virtual representation comprises a geofence representing the boundaries of the dig site that allows earth shaping vehicles to navigate without exiting the dig site.

When generating a target tool path, the tool path interface engine 810 generates a second geofence around a target location. As an earth shaping vehicle 115 performs a target tool path at the target location, the vehicle 115 is restricted to navigate within the geofence around the target location. In some implementations in which an earth shaping vehicle 115 asynchronously performs multiple target tool paths, the vehicle 115 may transition seamlessly between geofences defined in each target tool path. For example, if an earth shaping vehicle 115 performing an excavation routine interrupts the excavation routine to perform a filling routine, the vehicle 115 exits the geofence associated with the excavation routine to enter a geofence associated with the filling routine.

Returning to the tool path update engine 830, the tool path update engine 830 may generate a graphical user interface that enables an operator to modify a geofence based on a signal received from an earth shaping vehicle. Initially, when an earth shaping vehicle 115 begins to perform a target tool path, the progress tracker engine 820 generates a graphical user interface displaying a representation of the dig site and an initial geofence surrounding a target location. In some implementations, the vehicle navigates within the initial geofence and encounters an obstacle, which is recorded by one or a combination of the sensors 170. More information regarding obstacles and obstacle detection can be found in U.S. patent application Ser. No. 15/996,408 filed on Jun. 1, 2018, which is incorporated by reference herein in its entirety.

The tool path update engine 830 receives sensor data with an indication of the obstacle. Based on the received sensor data, the tool path update engine 830 modifies the graphical user interface displaying the representation of the dig site to also display a location of the obstacle within the initial geofence.

In some implementations, the modified graphical user interface additionally displays an alert notification indicating that the obstacle is an immutable obstacle, which cannot be removed by the earth shaping vehicle. In alternate implementations, the obstacle may be classified as a modifiable obstacle, which can be removed by an earth shaping vehicle. In such implementations, the modified graphical user interface additionally displays a classification of the obstacle (e.g., a description of the obstacle) and a graphic element for building a removal tool path for removing the modifiable obstacle from the dig site. Based on inputs from the operator to build the removal tool path, the tool path update engine 830 transmits the removal tool path the vehicle 115 that encountered the dig site with the removal tool path. The vehicle 115 performs operations to remove the obstacle (per the removal tool path), before continuing with the operations defined in the target tool path.

The modified graphical user interface displaying the location of the obstacle within the geofence may also include graphic elements than enable an operator to modify the geofence via user inputs to the interface. An operator may interact with the interface to modify the geofence to exclude the obstacle, but still include the target location. Based on inputs from the operator to update coordinates of the geofence, the tool path update engine 830 generates an updated geofence and transmits instructions to an earth shaping vehicle 115 to navigate within the updated geofence. For example, an operator may modify a position of one or more points of the geofence to update the initial geofence to circumvent or exclude an obstacle. Depending on the graphic elements displayed on the interface, an operator may modify points in the initial geofence by editing the actual location of points in the representation of the dig site or by defining updated coordinates of points in the coordinate system representing the dig site. Based on the points updated by the operator, the tool path update engine 830 generates an updated geofence by connecting each unmodified point of the initial geofence and each of the one or more modified points.

In alternate embodiments, the tool path update engine 830 generates a modified graphical user interface displaying a suggestion for a modified geofence based on a position detected obstacle or alternate feature of the dig site relative to other features of the dig site and the existing geofence. For example, the tool path update engine 830 may generate the suggested modified geofence by identifying a candidate area to be included or excluded from the geofence based on the location and dimensions of the detected obstacle. The modified graphical user interface may include a graphical element, which an operator can select to confirm that the geofence should be updated in accordance with the suggested modified geofence. The modified graphical user interface may also include graphical elements, which an operator can select to reject the suggestion or to manually revise the suggested modified geofence. Graphical user interfaces for modifying geofences further described with reference to FIGS. 13A-B.

Functionality described above with reference to the preparation engine 420 may also be performed manually be an operator via displays generated by the operator interface engine 450. Alternatively, the preparation engine 420 may function cooperatively with the operator interface engine 450. For example, the preparation engine 420 generates a digital terrain model of a dig site and the operator interface engine 450 uses the digital terrain model to generate a graphical user interface with a virtual representation of the dig site. As another example, the preparation engine 420 generates a target tool path based on a digital terrain model of a dig site and the operator interface engine 450 presents a graphical user interface to an operator for them to manually modify the target tool path.

VI.B User Interfaces for Building a Target Tool Path

FIGS. 9A-9F are illustrations of graphical user interfaces presented to an operator to initialize a target tool path, according to an embodiment. As described above the tool path interface engine 810 generates graphical user interfaces, which when displayed to an operator, enable an operator to build a target tool path for an earth shaping routine within a dig site. Based on instructions or other inputs received from the operator, the tool path interface engine 810 generates and transmits codified instructions representing a target tool path to an earth shaping vehicle 115.

Figure 9A:
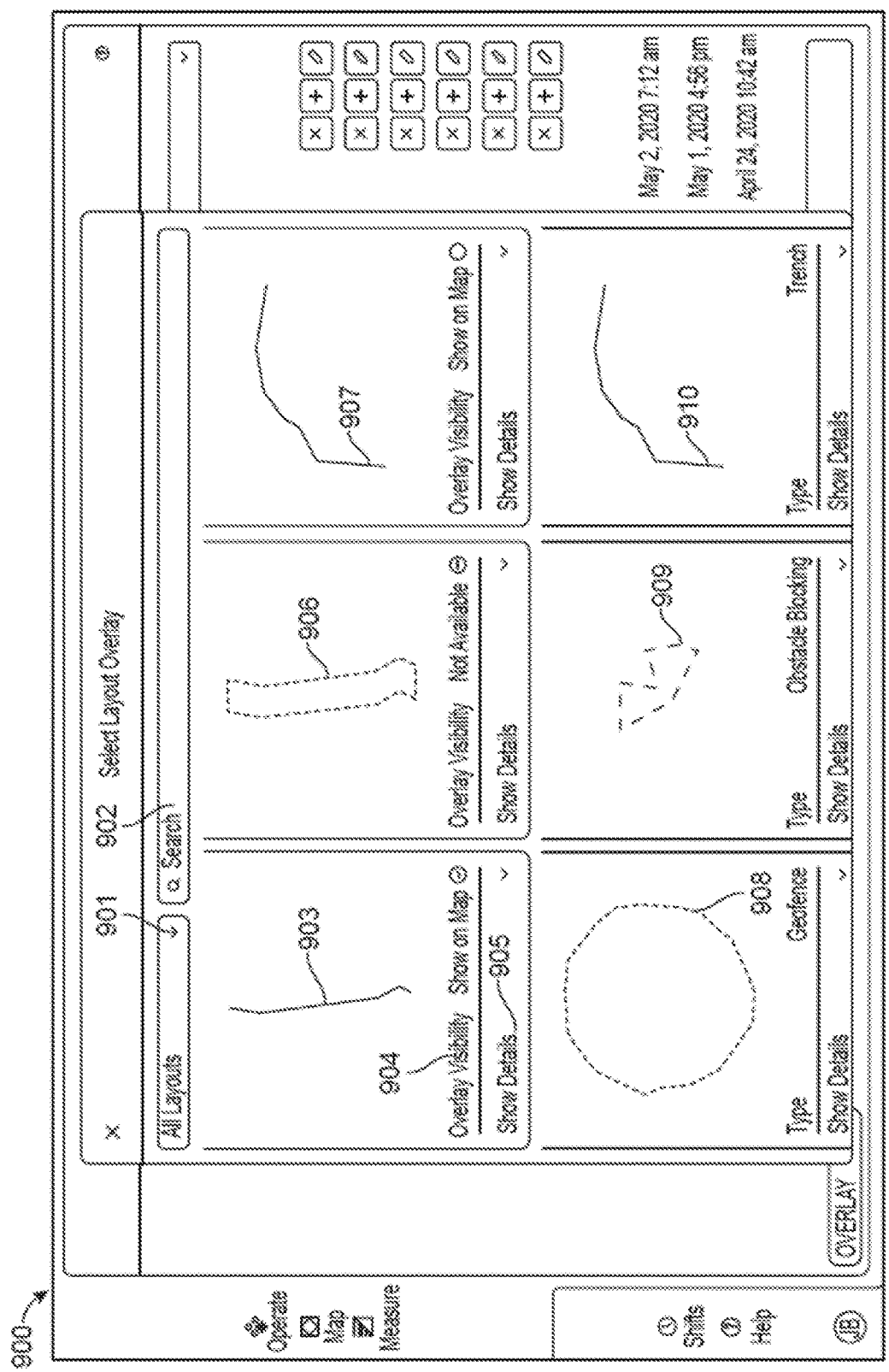
FIGS. 9A-9F are illustrations of graphical user interfaces presented to an operator to initialize a target tool path, according to an embodiment.

FIG. 9A illustrates of an interface displaying layouts for building a target tool path, according to an embodiment. As described herein, layouts displayed on the layout interface represent features of the dig site to be considered when an earth shaping vehicle 115 performs a target tool path. For example, features represented by layouts include geofences that restrict the area within which the vehicle 115 may navigate, obstacles for the vehicle 115 to avoid, and task geometries for earth shaping routines. The illustrated interface 900 includes graphic elements 901 and 902 which enable an operator to view pre-defined layouts or layouts defined for a previous tool path. The graphic element 901 is a selectable feature that, when selected, modifies the interface 900 to display all pre-defined and previously implemented layouts to a user. The graphic element 910, is an input element that, in response to user input, displays a subset of layouts. For example, an operator may input search criteria to the graphic element 902 and the tool path interface engine 810 modifies the interface 900 to display a subset of layouts that match the search criteria.

FIG. 9A illustrates six example layouts 903, 906, 907, 908, 909, and 910. The layouts 903, 907, and 910 represent task geometries. Task geometries may represent a shape of a target location where earth is to be shaped by an earth shaping vehicle 115. The task geometries may be applied to a coordinate space for any dig site and may be enlarged or minimized to suit the specifications of a dig site. When a task geometry is selected and their location in the dig site is confirmed by an operator, the tool path interface engine 810 updates a virtual representation of the dig site with the task geometry and assigns the confirmed geometry a set of coordinate points in the coordinate system of the dig site. In particular, the layout 910 represents a geometry for a trench.

The layouts 906 and 908 represent geofences, which define boundaries that govern where an earth shaping vehicle 115 can navigate. In some embodiments, an operator may select multiple geofences. For example, the layout 908 may be implemented as a geofence that restricts navigation of an earth shaping vehicle that is not performing a target tool path, whereas the layout 906 may be implemented as a geofence that restricts navigation of an earth shaping vehicle performing the target tool path. Layout 909 represents boundaries of an obstacle in the dig site, for example an immutable obstacle that the vehicle 115 must navigate around. When geofences and obstacles are selected and their locations in the dig site are confirmed by an operator, the tool path interface engine 810 updates a virtual representation of the dig site with the geofences and the obstacles. Additionally, the tool path interface engine assigns the boundary of each geofence and obstacle a set of coordinate points in the coordinate system of the dig site.

The illustrated interface 900 further includes graphic elements 904 and 905, which are selectable features of the interface 900. The graphic element 904, when selected, generates instructions to visibly display the layout on a virtual representation of the dig site. The instructions are executed by the tool path interface engine 810. The graphic element 905, when selected, modifies the interface 900 to display additional details regarding a layout.

Figure 9B:
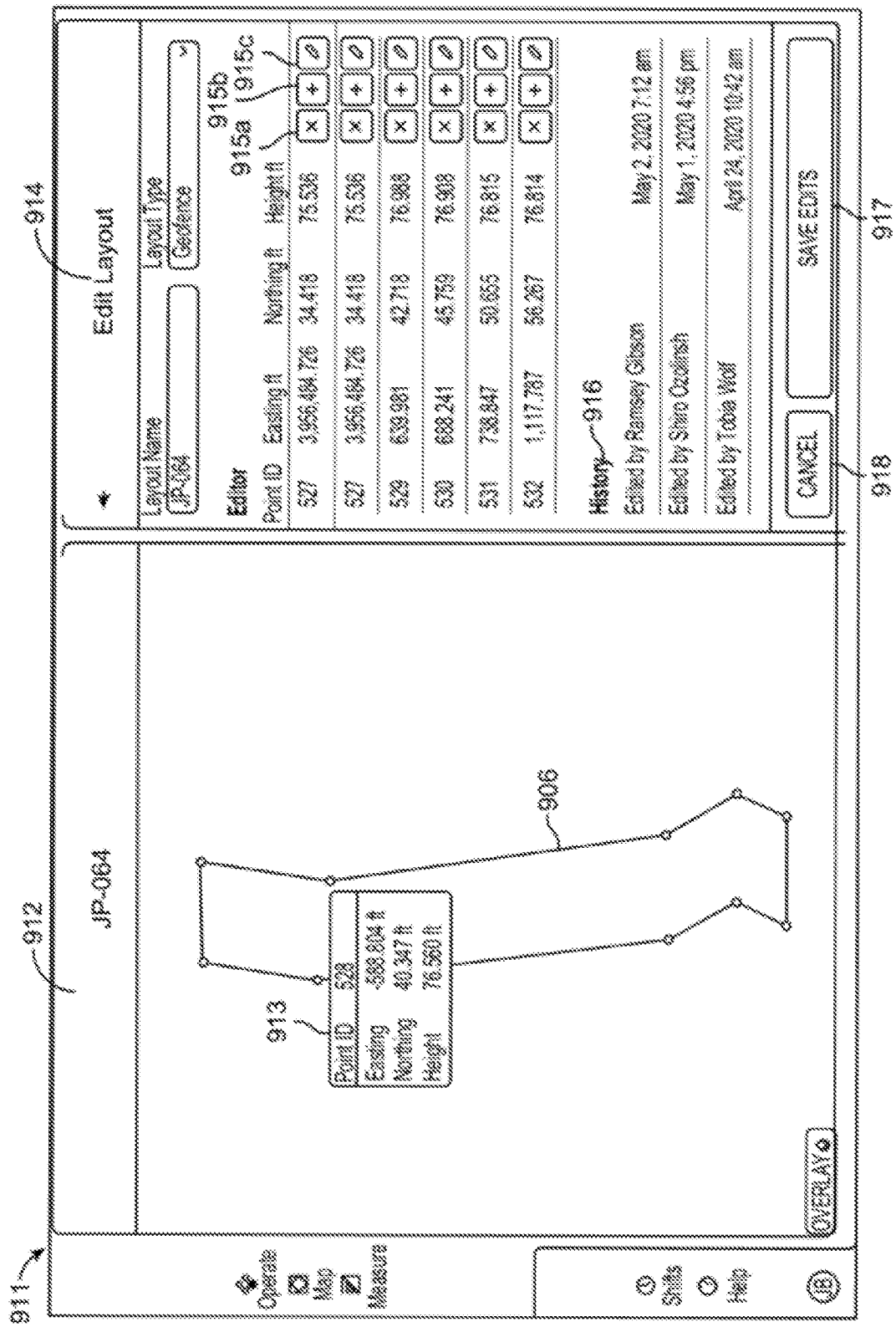

FIG. 9B illustrates an interface for designing a virtual representation of a dig site, according to an embodiment. The illustrated interface 911 includes display panels 912 and 914. The display panel 912 displays a coordinate system of a dig site. In some implementations, the display panel 912 displays a coordinate system representing an entire dig site, but in other implementations, the display panel 912 is focused on a coordinate system for a particular region of the dig site.

Upon selection of one or more layouts at the interface 900, the tool path interface engine 810 modifies the display panel 912 to overlay the selected layouts on the coordinate system of the dig site. In the illustrated interface 911, layout 906 (a geofence) has been selected and is overlaid onto the coordinate system of the dig site. In the illustrated embodiment, the layout 906 comprises ten modifiable points, but in other embodiments the layout may be assigned more or fewer modifiable points. As described herein, modifiable points are points on the geofence which may be edited or adjusted by an operator. The tool path interface engine 810 assigns each modifiable point a coordinate point corresponding to an actual location in the dig site. Each modifiable point may additionally be assigned an easting orientation, a northing orientation, and a height of the ground surface at the corresponding location in the dig site. In response to an input that selects a modifiable point, the tool path interface engine 810 may modify the display panel 912 to display graphic element 913. Graphic element 813 display additional information regarding the selected modifiable point.

The display panel 914 displays selectable graphic elements that enable the operator to modify or edit points of the layout displayed on the display panel 912. In response to the operator selecting a layout from the interface 900, the interface 911 is modified such that the display panel 914 displays a name and type of the selected layout. Additionally, each modifiable point of the selected layout is displayed on the display panel 914 with coordinate information including, but not limited to, a coordinate point in the coordinate system, an easting orientation, a northing orientation, and a height of the modifiable point. For each modifiable point, the display panel 914 includes graphic elements 915a, 915b, and 915c, which are selectable graphic elements. In one embodiment, an operator can delete a modifiable point by selecting graphic element 915a, add a modifiable point by selecting graphic element 915b, or edit information assigned to a modifiable point by selecting graphic element 915c. Changes made by the operator via display panel 914 are received by the tool path update engine 830. The tool path update engine 830 modifies the display panel 914 to reflect the changes and communicates an updated target tool path with the changes to one or more earth shaping vehicles in the dig site. Additionally, the tool path update engine 830 modifies content displayed on the display panel 912 to reflect the changes.

The display panel 914 additionally includes graphic elements 917 and 918. An operator can select graphic element 917 to the save modifications to a layout. Alternatively, an operator can select graphic element 918 to cancel any modifications to the layout. The display panel 914 may additionally include a rolling record of 916 describing operators who have contributed to or interacted with the virtual representation displayed at the display panel 912 and a timestamp of their interaction or contribution.

Figure 9C:
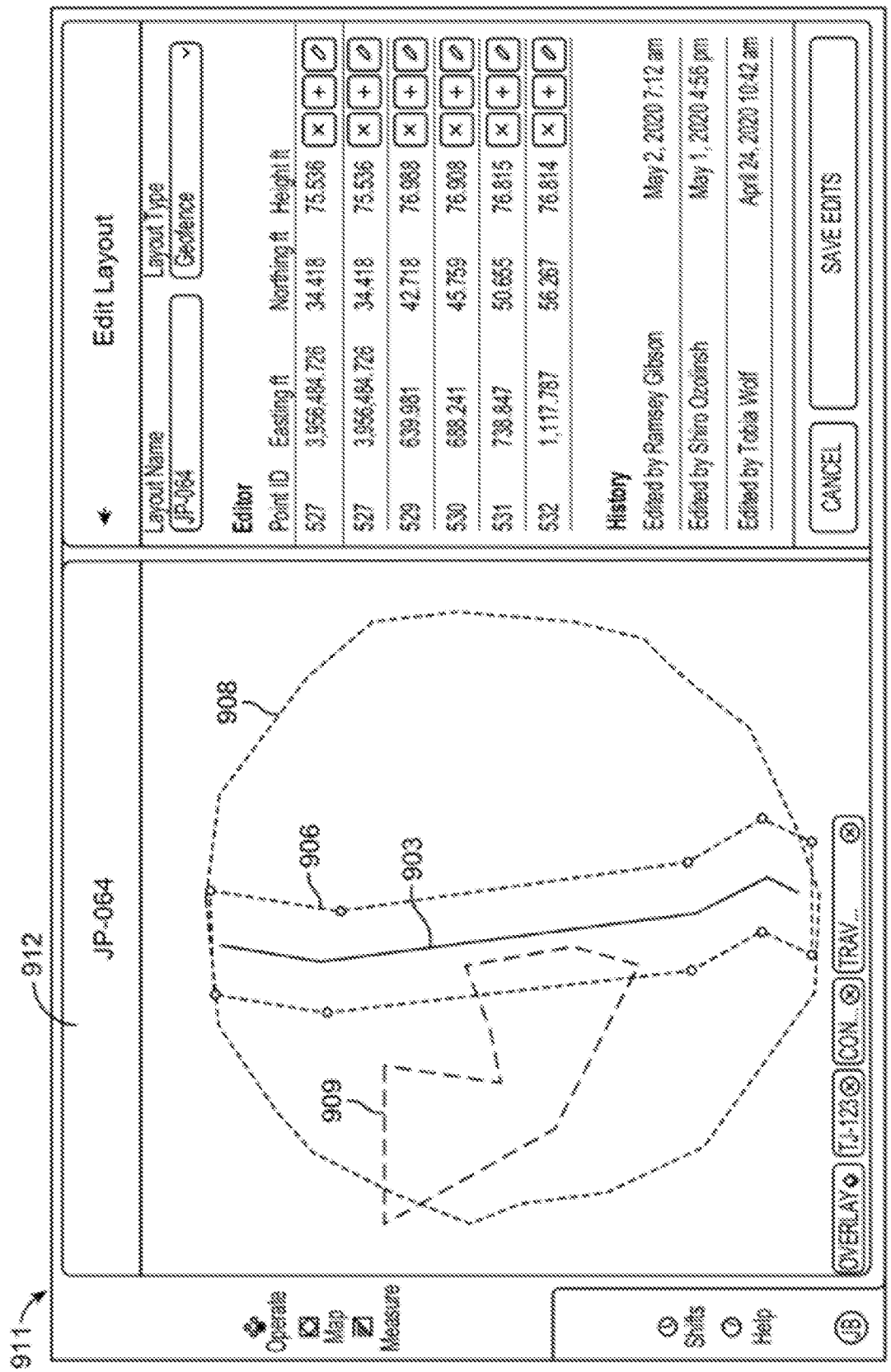

FIG. 9C illustrates the interface 911 modified to display multiple layouts on the display panel 912, according to an embodiment. Whereas the display panel 912 illustrated in FIG. 9B displayed a single layout (e.g., the layout 906), the display panel 912 illustrated in FIG. 9C displays multiple layouts overlaid onto a coordinate system of a dig site (e.g, layouts 903, 908, and 909). Accordingly, the display panel 912 of FIG. 9C, is illustrative of a completed virtual representation of a dig site. Turning now to FIG. 9C, the layout 908 is a geofence representing a boundary for earth shaping vehicles to navigate freely, for example a boundary of the dig site. The layout 909 is an obstacle that earth shaping vehicles within the dig site should avoid. The layout 903 represents a target location, or a series of target locations, where earth shaping vehicles performing a trenching routine to excavate a trench. The layout 906 is a geofence representing a boundary that restricts navigation of earth shaping vehicles performing the trenching routine.

Whereas the layout 908 is a geofence that restricts navigation of all earth shaping vehicles within the dig site, the layout 906 is a geofence that restricts navigation of a subset of earth shaping vehicles performing operations to excavate the trench outlined by layout 903. Accordingly, the combination of layouts 903, 906, 908, and 909 displayed via the display panel 912 may be overlaid to generate a virtual representation of the dig site.

In response to user input confirming that a virtual representation of a dig site is complete, the tool path interface engine 810 may determine whether the virtual representation approved by the operator includes a task geometry or an alternate indication of an earth shaping routine to be performed in the dig site. Because the task geometry describes a shape of a target location where earth is to be moved, the tool path interface engine 810 may determine than an earth shaping routine is to be performed at the target location and that the earth shaping routine should result in the feature describes in the task geometry. For example, based on the layout 903 (a task geometry for excavating a trench), the tool path interface engine 810 may determine that a trench is to be excavated along the coordinate points displayed on the display panel 912. Alternatively, at a previous graphical user interface element, an operator may specify an intent to perform an earth shaping routine within the dig site. Accordingly, the tool path interface engine 810 generates a graphical user interface that enables a user to build a target tool path for the earth shaping routine.

Figure 9D:
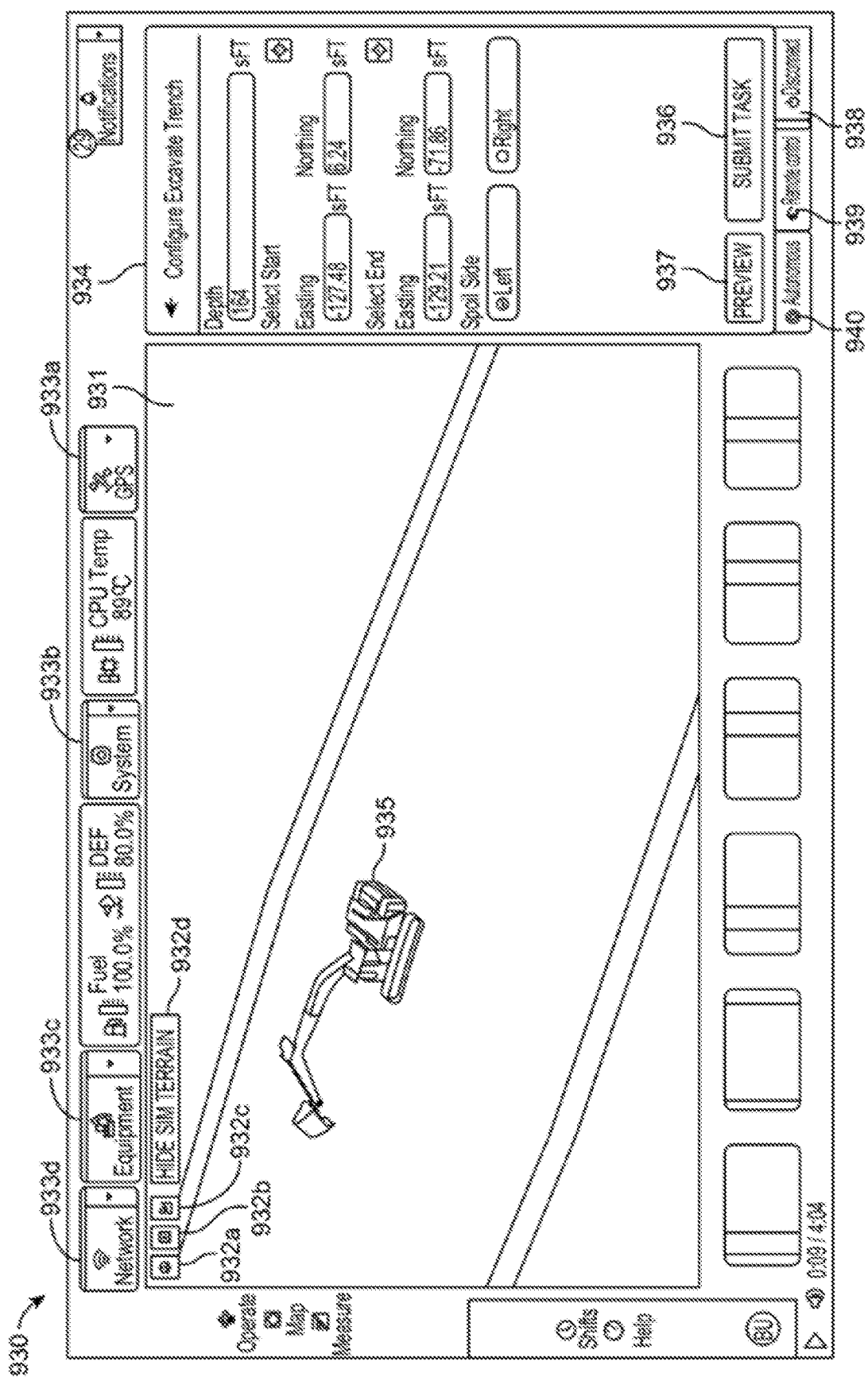

FIG. 9D illustrates an interface displayed to an operator to build target tool paths, according to an embodiment. In response to an operator finalizing a visual representation of a dig site, for example the visual representation displayed on display panel 912, tool path interface engine 810 generates an interface 930 that enables the operator to build a target tool path. The illustrated interface 930 includes display panels 931 and 934. The display panel 931 displays a representation of an earth shaping vehicle 935 near a target.

The illustrated interface 911 includes display panels 931 and 934. The display panel 931 also includes graphic elements 932a, 932b, 932c, and 932d, which are selectable features that can modify the representation displayed on the display panel 931. In response to a selection of one of the graphic elements 932a, 932b, 932c, or 932d, the tool path interface engine 810 modifies the representation displayed on the display panel 931. For example, in response to a selection of the graphic element 932a, the tool path interface engine 810 modifies the display panel 931 to display a three-dimensional representation of the earth shaping vehicle and the target location. In response to a selection of the graphic element 932b, the tool path interface engine 810 modifies the display panel 931 to display a two-dimensional representation of the earth shaping vehicle and the target location from a bird's eye perspective. In response to a selection of the graphic element 932c, the tool path interface engine 810 modifies the display panel 931 to display a side view of the earth shaping vehicle and the target location. The side view display panel is further described with reference to FIG. 10E. In response to a selection of the graphic element 932d, the tool path interface engine 810 modifies the display panel 931 to display or hide a topography map of the target location, illustrating the terrain surrounding the vehicle.

The display panel 934 includes graphic elements that enable a user to customize or design a target tool path. Continuing from the interface 911 where the virtual representation included a trench to be excavated from the dig site, the display panel 934 includes input graphic elements that allow a user to specify design parameters of the trench. For example, the display panel 934 includes input graphic elements where an operator can define a depth of the trench, coordinates for a start point of the trench, and coordinates for an endpoint of the trench. For earth shaping routines where earth is removed from the target location (e.g., excavation routines, trenching routines, drilling routines), the display panel additionally includes a graphic element for defining a location for dumping earth in the earth shaping tool. The illustrated display panel 934 displays, a pair of selectable graphic elements. By interacting with the selectable graphic elements, an operator picks a side of the trench to deposit earth. In alternate embodiments, an operator may define locations for one or more dump piles by providing specific coordinates for each dump pile.

In embodiments where an earth shaping routine is to be performed with varying dimensions (e.g., a trench of varying depth) an operator may define a separate target tool path for each depth using the display panel 934. Alternatively, the display panel 934 may include additional configuration settings and options that enable an operator to build a single target tool path for the entire trench.

The display panel 934 additionally displays graphic elements 936 and 937. In response to a selection of the graphic element 936, the tool path interface engine 810 generates a target tool path with instructions for an earth shaping vehicle to perform operations to excavate the trench and transmits the instructions to one or more earth shaping vehicles. In the context of illustrated interface 930, the generated target tool path would include operations for the earth shaping vehicle to excavate earth between the start and end point of the trench at the defined depth. In response to a selection of the graphic element 937, the tool path interface engine 810 modifies the display panel 931 to display a preview of the target location once the earth shaping routine has been completed. In the context of illustrated interface 930, the preview would display a trench between the start and end points with the defined depth.

The display panel 934 additionally includes graphic elements which enable an operator to define an operation state of an earth shaping vehicle, for example the earth shaping vehicle 935, as the vehicle performs the target tool path. In response to selection of the graphic element 940, the operator interface engine 810 instructs a controller 150 on-board an earth shaping vehicle 935 to operate autonomously when performing the target tool path. In response to selection of the graphic element 939, the operator interface engine 810 instructs a controller 150 on-board the earth shaping vehicle 935 to operate based on instructions received from an off-unit computer, for example off-unit computer 120b. Although not shown, the interface 934 may also include a graphic element, which when selected, causes the operator interface engine 810 to instruct a controller 150 on-board the earth shaping vehicle 935 to operate semi-autonomously. In response to selection of the graphic element 938, the operator interface engine 810 instructs a controller 150 on-board the earth shaping vehicle 935 to disconnect from the network and any communicatively coupled controllers and computing units. When disconnected, an operator may manually operate the earth shaping vehicle 935.

Additionally, the interface 930 displays graphic elements 933. Each of the graphic elements 933 monitor the functionality of an earth shaping vehicle 935 while performing a target tool path. Each graphic element 933 is a selectable feature of the interface 930. When selected by an operator, the tool path interface engine 810 modifies the interface 930 to display an expanded element 933 with additional information related to the earth shaping vehicle 935. The graphic element 933a monitors a position of the earth shaping vehicle 935 within a dig site and connection between position sensors on the vehicle and the operator interface engine 800. The graphic element 933b monitors the operation of electronics on-board the earth shaping vehicle 935, for example a temperature of the on-board controller. The graphic element 933c monitors the performance of the vehicle 935 itself, for example fuel levels and hydraulic distribution. The graphic element 933d monitors the network connection between the sensors 170 and the controller on-board the vehicle 935 and off-board computing devices, for example the computer 120b.

Figure 9E:
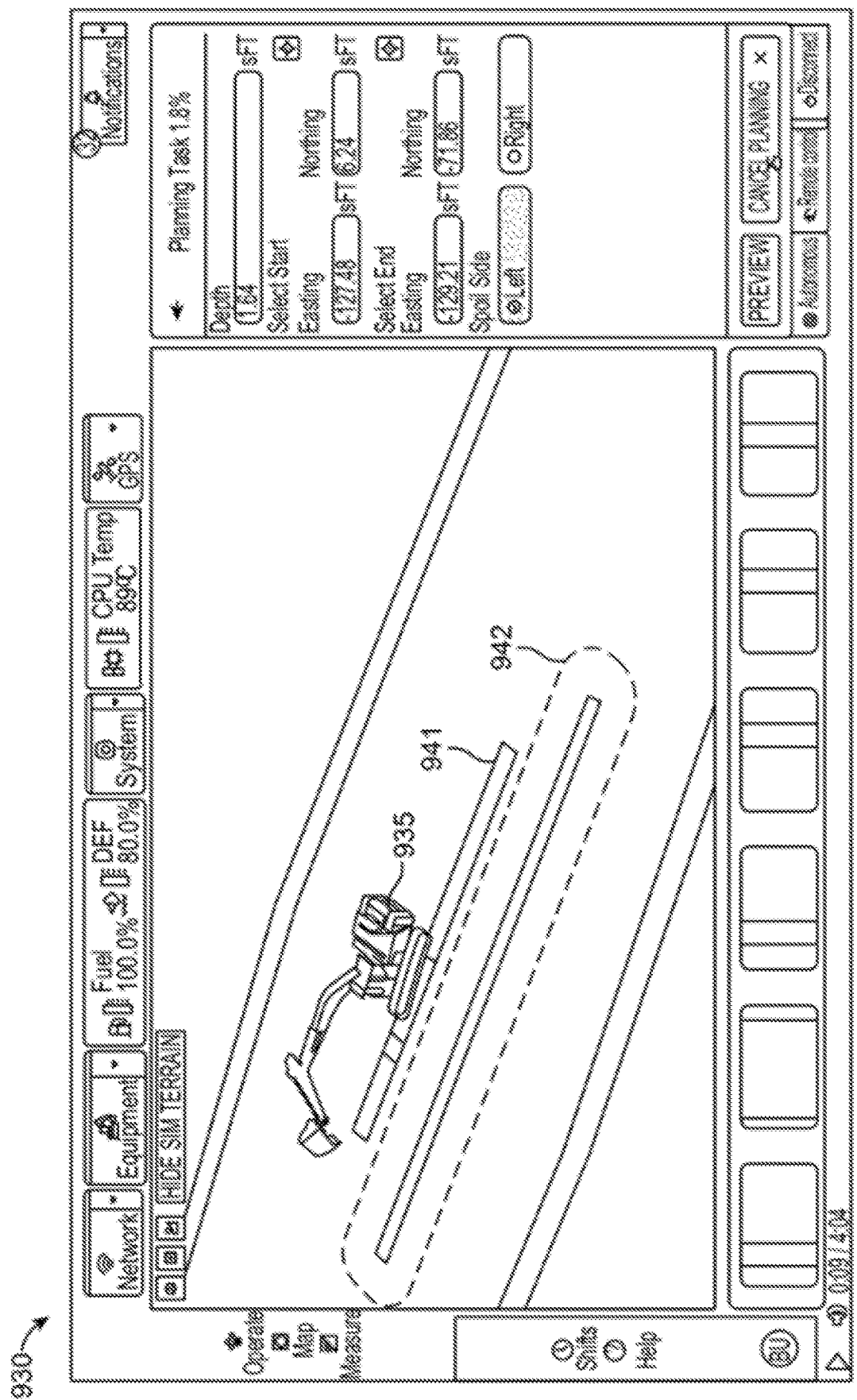

In response to an operator selecting the graphic element 935 to finalize a target tool path, the tool path interface engine 810 modifies the display panel 931 to display a representation of the target location and a representation of the dump pile relative to the vehicle 935. FIG. 9E illustrates a modified interface 930 displaying a representation of the vehicle 935 relative to a target location of the trench 941 and a representation of the dump pile 942, according to an embodiment. As illustrated in FIG. 9E, the representation of the target location 941 is divided into multiple segments, each of which represents either a distinct target tool path or an iteration of a single target tool path. For example, the vehicle 935 may perform a target tool path to excavate the first segment of the trench. After completing the excavation of the first segment, the vehicle 935 navigates to the second segment to repeat the same target tool path to excavate the second segment of the trench.

The representation of the dump pile 942 is a region of the dig site adjacent to the target location 941. In the illustrated embodiment of FIG. 9E, the dump pile 942 spans the entire length of the trench. In other embodiments the dump pile 942 may be positioned at a single set of coordinates adjacent to the target location 941.

Figure 9F:
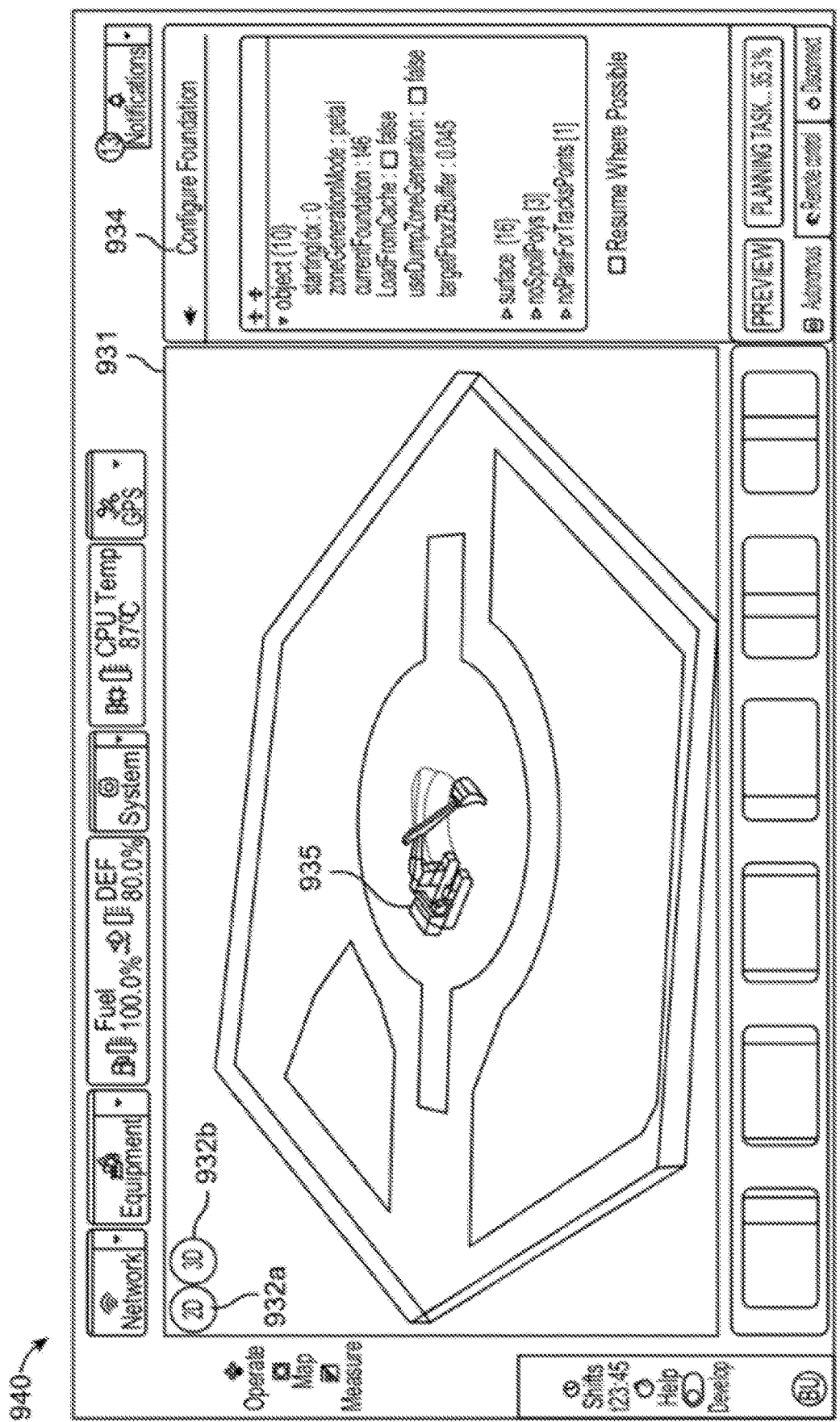

The embodiments of the display panel 931 described with reference to FIGS. 9D and 9E illustrate a two-dimensional representation. However, the tool path interface engine 830 may additionally generate a three-dimensional representation, for example in response to a selection of graphic element 932b. FIG. 9F illustrates an interface displaying a three-dimensional representation of the vehicle relative to other features in a dig site, according to an embodiment. In addition to the various features described with reference to FIG. 9A-E, the three-dimensional representation illustrated in FIG. 9F displays a depth or elevation of features in the dig site and a position of earth shaping tools below the ground surface.

VI.C User Interfaces for Monitoring an Earth Shaping Vehicle

FIGS. 10A-H are illustrations of an example coordinate space in which an earth shaping vehicle updates a computing device while performing an earth shaping routine, according to an embodiment. As described above, the progress tracker engine 820 modifies a graphical user interface to reflect a current state of the dig site, a current state of the target location, and a position of an earth shaping vehicle 115 as the vehicle 115 performs a target tool path. The progress tracker engine 820 modifies the interface displayed to an operator in real-time or near real-time based on spatial, image, measurement, and position data recorded by sensors 170 mounted to the vehicle 115. The progress tracker engine 820 receives the sensor data and modifies the displayed graphical user interface accordingly.

Figure 10A:
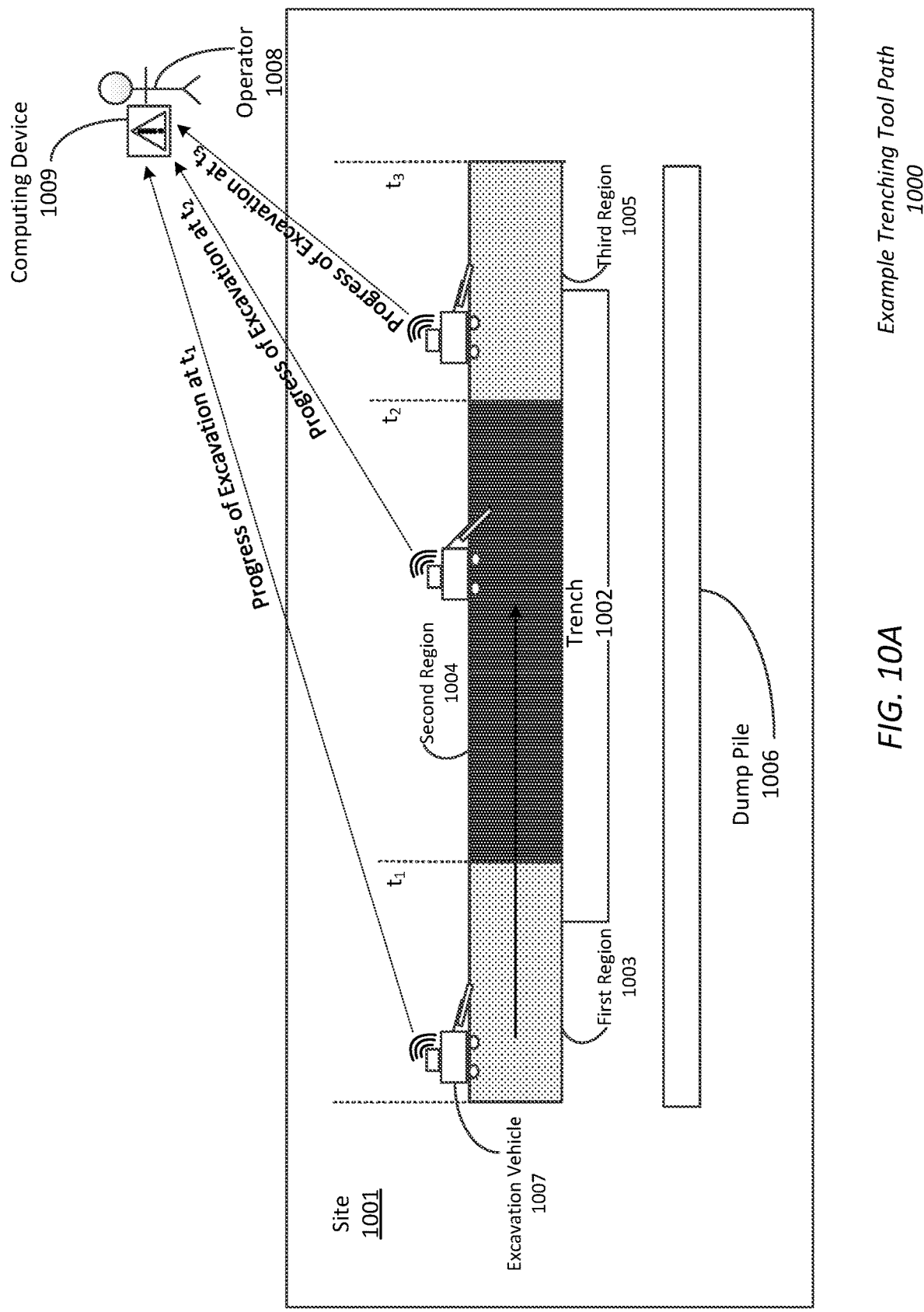
FIG. 10A is an illustration of an example coordinate space in which an earth shaping vehicle updates a computing device while performing an earth shaping routine, according to an embodiment.

FIG. 10A is an illustration of an example coordinate space in which an earth shaping vehicle follows a target tool path to perform a trenching, according to an embodiment. In the illustrated example, an excavation vehicle 1007 navigates within the dig site 1001. The excavation vehicle 1007 performs operations outlined in a target tool path to excavate a trench 1002 within the dig site. The target tool path includes operations for excavating the trench 1002 in three regions: a region 1003 with a first depth, a region 1004 with a second depth, and a region 1005 with a third depth. Adjacent to the trench 1002 is a dump pile 1006, where the excavation vehicle 1007 deposits earth excavated from the trench 1002. An operator 1008 is located at a position away from the target location of the trench, for example a location outside of the site 1001 as is illustrated in FIG. 10A. The operator 1008 controls a computing device 1009, which is communicatively coupled to the excavation vehicle 1007. As the excavation vehicle 1007 performs the target tool path to excavate the trench, the vehicle 1007 sends signals to the computing device 1009 to update the operator 1008 of the vehicle's progress. Upon receipts of the signals, the computing device 1009 modifies a user interface displayed on the device 1009 to inform the operator 1008 of the vehicle's progress and current status.

The excavation vehicle 1007 begins to perform operations to excavate the region 1003 of the trench at the first depth at a time $t_1$. As the excavation vehicle 1007, excavates the first region, the vehicle 1007 records and sends sensor data to the computing device 1009 describing the progress of the excavation routine (e.g., the trenching routine). For example, at $t_1$, the vehicle communicates sensor data indicating the progress of the excavation at $t_1$. After excavating the first region to the first depth 1003, the excavation vehicle 1007 navigates to the second region 1004. Based on sensor data indicating the updated position of the vehicle 1007, the interface displayed on the computing device 1009 is modified to display the updated position of the vehicle. At a time $t_2$ when the vehicle 1007 is excavating the second region of the trench, the vehicle 1007 records sensor data indicating progress of the excavation routine at $t_2$. The interface displayed on the computing device 1009 is again modified to display an updated state of the second region 1004. After completing excavation of the second region 1004, the excavation vehicle 1007 navigates to the third region and the interface displayed on the computing device 1009 is modified to display the updated position of the vehicle. At a time $t_3$ when the vehicle 1007 is excavating the third region 1005 of the trench, the vehicle 1007 records sensor data indicating progress of the excavation routine at $t_3$. The interface displayed on the computing device 1009 is again modified to display an updated state of the third region.

Figure 10B:
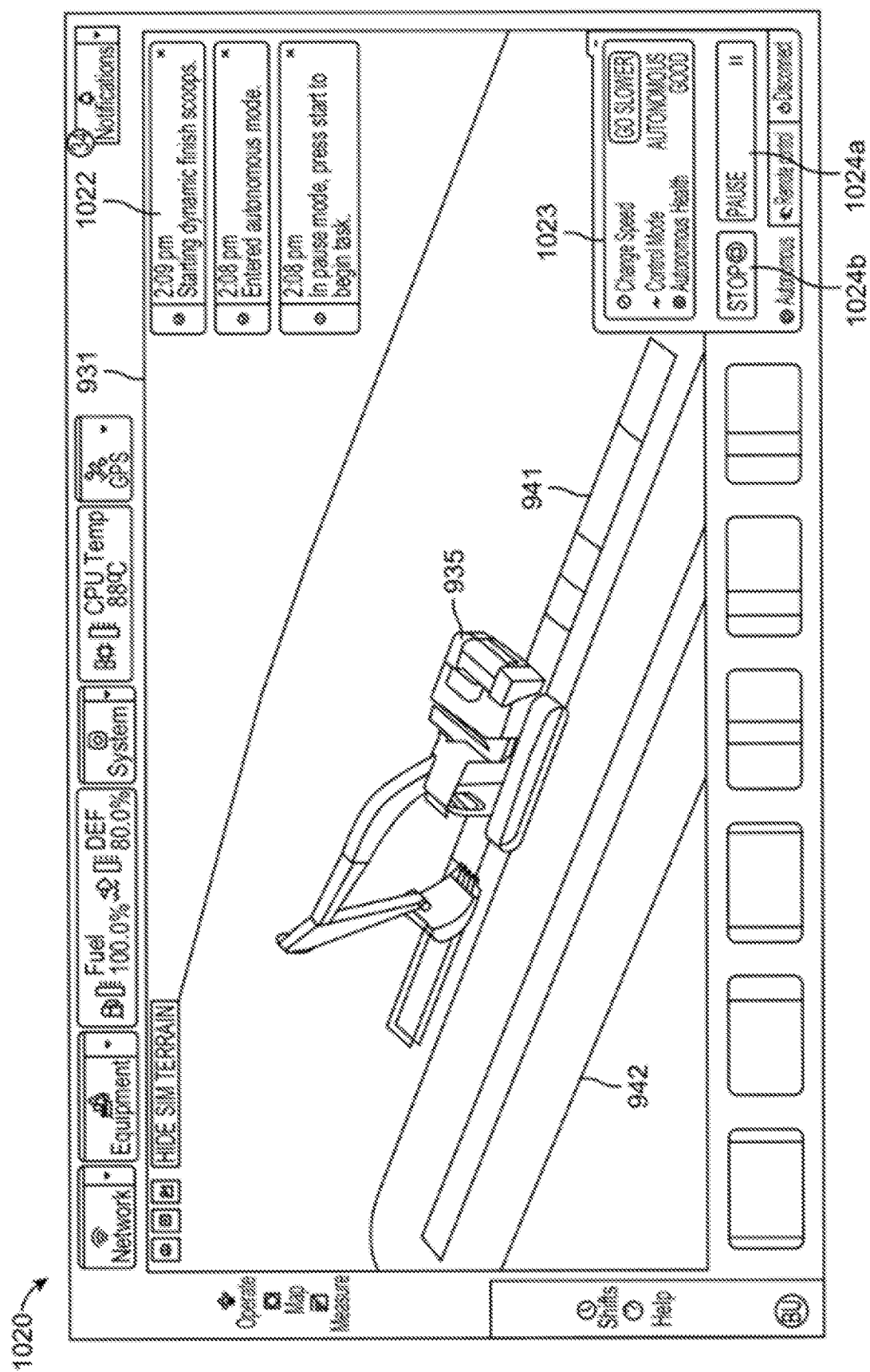
FIGS. 10B-10H are illustrations of graphical user interfaces presented to an operator to monitor an earth-shaping routine and an earth shaping vehicle, according to an embodiment.

FIG. 10B illustrates an interface 1020 displaying a representation of an earth shaping vehicle 935 excavating earth from a target location, according to an embodiment. Continuing from the interface illustrated in FIG. 9E where a target tool path is generated and communicated to the vehicle 935, the progress tracker engine 820 generates and modifies the interface 1020 as the vehicle 935 performs the trenching routine. The progress tracker engine 820 modifies the display panel 931. The display panel 931 (as described in FIG. 9E) initially illustrated a view of the earth shaping vehicle 935 near the target location, a target location 941 where the trench is to be excavated, and a dump pile 942. As the vehicle 935 begins to perform operations to excavate the trench 941, the progress tracker engine 820 modifies the display panel 931 to display the earth shaping vehicle 935 as it excavates the trench. As the earth shaping vehicle 935 begins to excavate the trench, the progress tracker engine 820 modifies the display panel 931 illustrated in the FIG. 9E to display an updated position of the earth shaping vehicle 935 and a position of an earth shaping tool 1021.

The interface 1020 displays a representation of the vehicle where the earth shaping tool 1021 is positioned beneath a ground surface to excavate earth from the trench. The earth shaping vehicle 935 navigates from its initial position adjacent to the target tool path of the trench to an updated position on the target tool path. Accordingly, the progress tracker engine 820 receives sensor data indicating the updated position and modifies the display panel 931 to display the updated position of the vehicle 935. The illustrated display panel 931 displays the target location 941 and the dump pile 942 in three-dimensions, which allows an operator to observe changes in the depth of a target location. As earth is excavated according from the target location 941, the progress tracker engine 820 receives sensor data describing an updated depth of the trench and modifies the display panel 931 to display the updated depth. Accordingly, the display panel 931 enables an operator to visualize sections of a target location that have been excavated compared to regions that have not yet been excavated.

Additionally, in some embodiments, the progress tracker engine 820 generates notifications 1022 describing an operation being performed by the earth shaping vehicle 935. The notifications may be verbal messages generated in real-time based on sensor data received from the vehicle 935. Because the display panel 931 in FIG. 10B displays the earth shaping tool 1021 in the process of excavating earth, the illustrated notifications 1022 indicate that the vehicle 935 is in the process of removing earth from the target location.

Based on the context of the earth shaping routine or the current conditions in the site, the content of the notifications 1022 may be separated into categories including, but not limited to, warning messages, error messages, fatal error alerts, information messages, and interactive messages. The progress tracker 820 generates warning messages in response to a detection or alert of a condition that would jeopardize or inhibit an ability of an earth shaping vehicle to perform an earth shaping routine. Examples of warning messages include, but are not limited to, an alert that a vehicle has insufficient space to navigate within a geofence or that a ramp is too small for the vehicle to enter on, an alert that a vehicle is not located within a geofence, an alert that the vehicle could not dump earth at a dump pile, an alert that the vehicle equipment information is missing, or an alert that electrical components on the vehicle have been disabled or are not functioning properly. The progress tracker 820 generates error messages in response to a detection or an alert that a vehicle has improperly executed an instruction in a target tool path or cannot properly execute an instruction in the target tool path. The progress tracker 820 generates fatal error alerts in response to a detection or an alert that a vehicle has improperly executed in instruction or encountered a condition that will result in a complete shut down or inoperability of the vehicle. The progress tracker 820 generates informational messages, which are verbal summaries of the operations that are being performed by the vehicle 935. The progress tracker 820 generates interactive messages which display a prompt for an operator to provide additional information regarding a target tool path, for example a modification or an update.

During the operation of the earth shaping vehicle 935 to follow the target tool path, the progress tracker engine 820 modifies the display panel 931 to display a graphic element 1023 that monitors performance of the vehicle 935. The graphic element 1023 includes two additional selectable elements 1024a and 1024b, which respectively enable an operator to send a signal to pause or stop operation of the vehicle 935. The graphic element 1023 may additionally include recommendations for an operator, for example a recommendation to adjust the speed of the vehicle.

Once the tool 1021 is filled with earth excavated from the target location, the vehicle 935 performs operations to empty the excavated earth at the dump pile 942. Accordingly, the progress tracker engine 820 receives sensor data describing the actuation of the tool to deposit the earth and modifies the display panel 931 to display the updated position of the tool. As earth is deposited at the dump pile, sensors 170 mounted to the vehicle measure changes in the elevation of the dump pile 942. Based on the measured elevation, the progress tracer engine 1025 additionally modifies the display panel 931 to display the earth deposited at the dump pile and the current elevation of the dump pile.

Figure 10C:
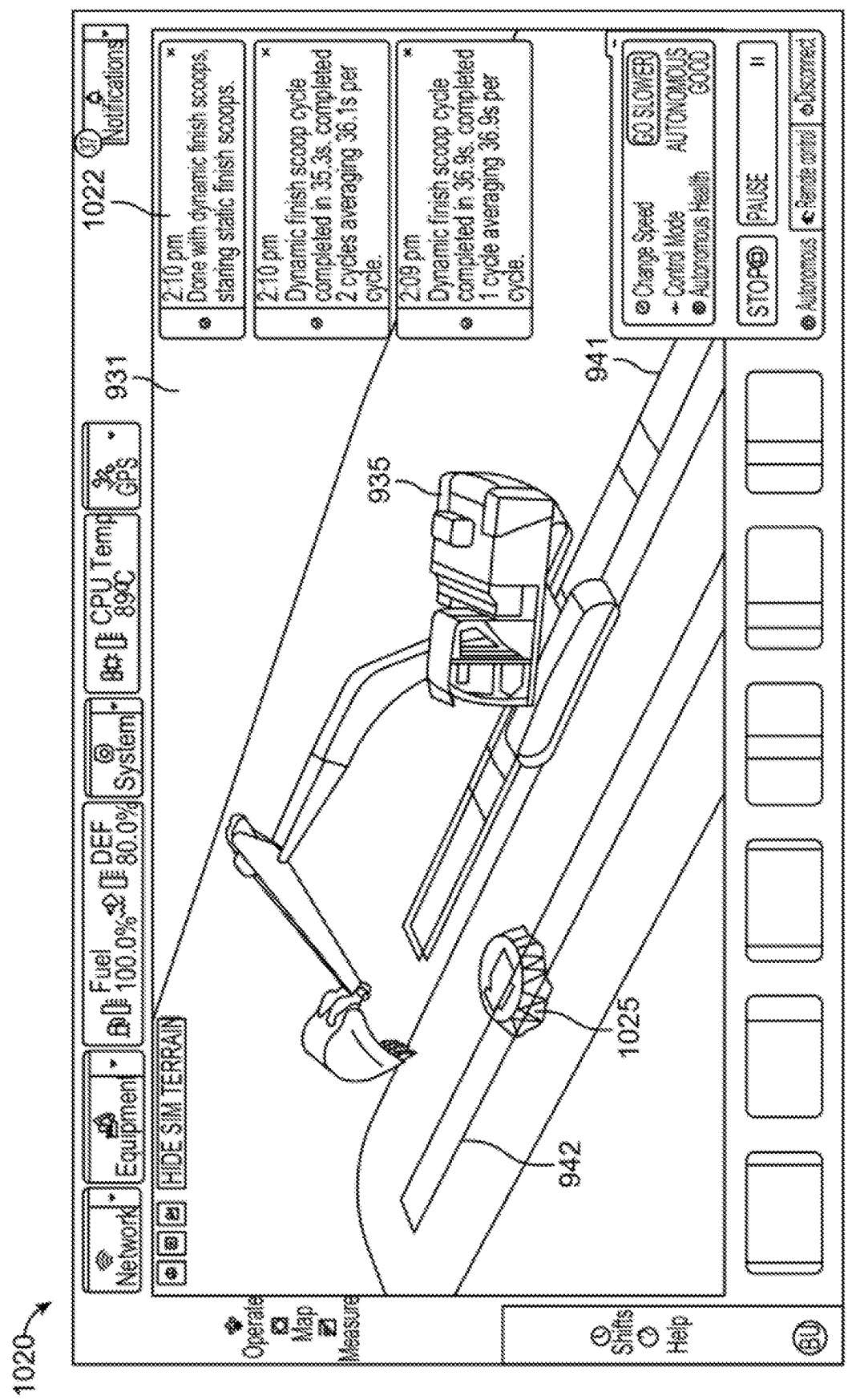

FIG. 10C illustrates the interface 1020 modified to display the earth shaping vehicle 935 depositing earth at the dump pile 942, according to an embodiment. As described in FIG. 10B, the earth shaping tool 1021 earth from the target location 941 according to the tool path. The depth of areas of the target location where earth was excavated are displayed in the display panel 931. In FIG. 10B, the interface 1020 displayed the earth shaping tool 1021 at a position beneath the ground surface of the target location. In FIG. 10C, the progress tracker engine 820 modifies the display panel 931 to update the position of the earth shaping tool from beneath the ground surface at the target location to above the dump pile 942. Earth deposited at the dump pile 942 by the tool 1021 collects in a mound 1025. The mound 1025 is displayed three-dimensionally to capture the height of the mound 1025 above the ground surface. Because, the illustrated vehicle 935 has transitioned from performing operations to excavate earth to performing operations to fill earth, the notifications 1022 are also updated to describe the current operation of the vehicle 935.

Figure 10D:
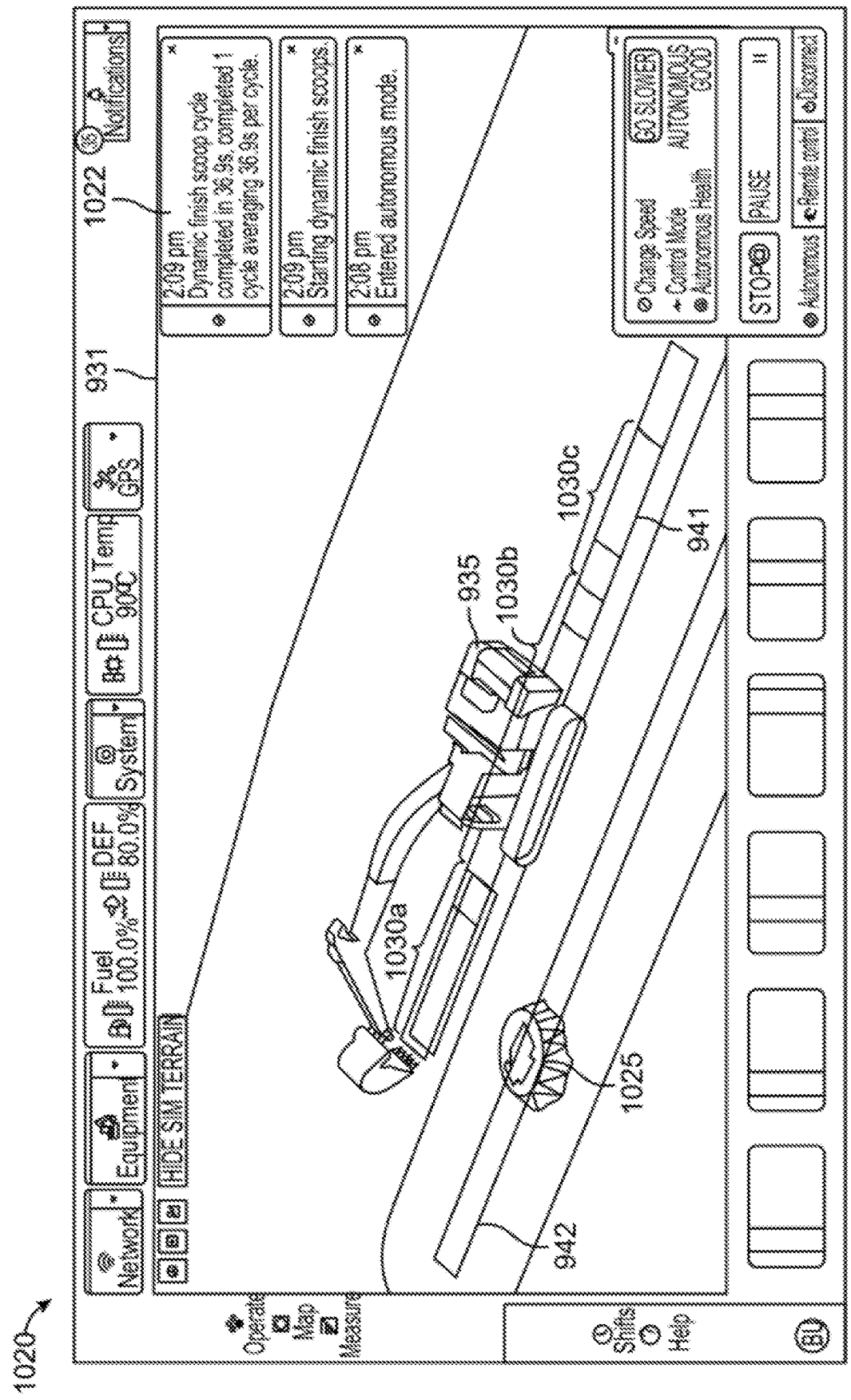

After emptying earth from the tool 1021 onto the mound 1025, the earth shaping vehicle 935 returns the tool to the target location to continue excavating earth. Sensor data indicating the movement of the tool 1021 back to the target location to excavate earth causes the progress tracker engine 820 to again modify display panel 931 to display the continued excavation of earth from the target location. FIG. 10D illustrates an interface 1020 modified to display the earth shaping vehicle 935 continuing to excavate earth from the target location. As described above, the target location 941 may be broken into several smaller regions depending on structural and mechanical constraints of the vehicle, for example the maneuverability and the carrying capacity of the earth shaping tool 1021. In the illustrated embodiment of FIG. 10D, the target location 941 is divided into three segments: 1030a, 103b, and 1030c. In some embodiments, a target tool path is generated with instructions for excavating each segment. Alternatively, a single target tool path may be generated with instructions to excavate the entire target location 941. In yet another alternate embodiment, a single target location may be repeated at each segment.

Figure 10E:
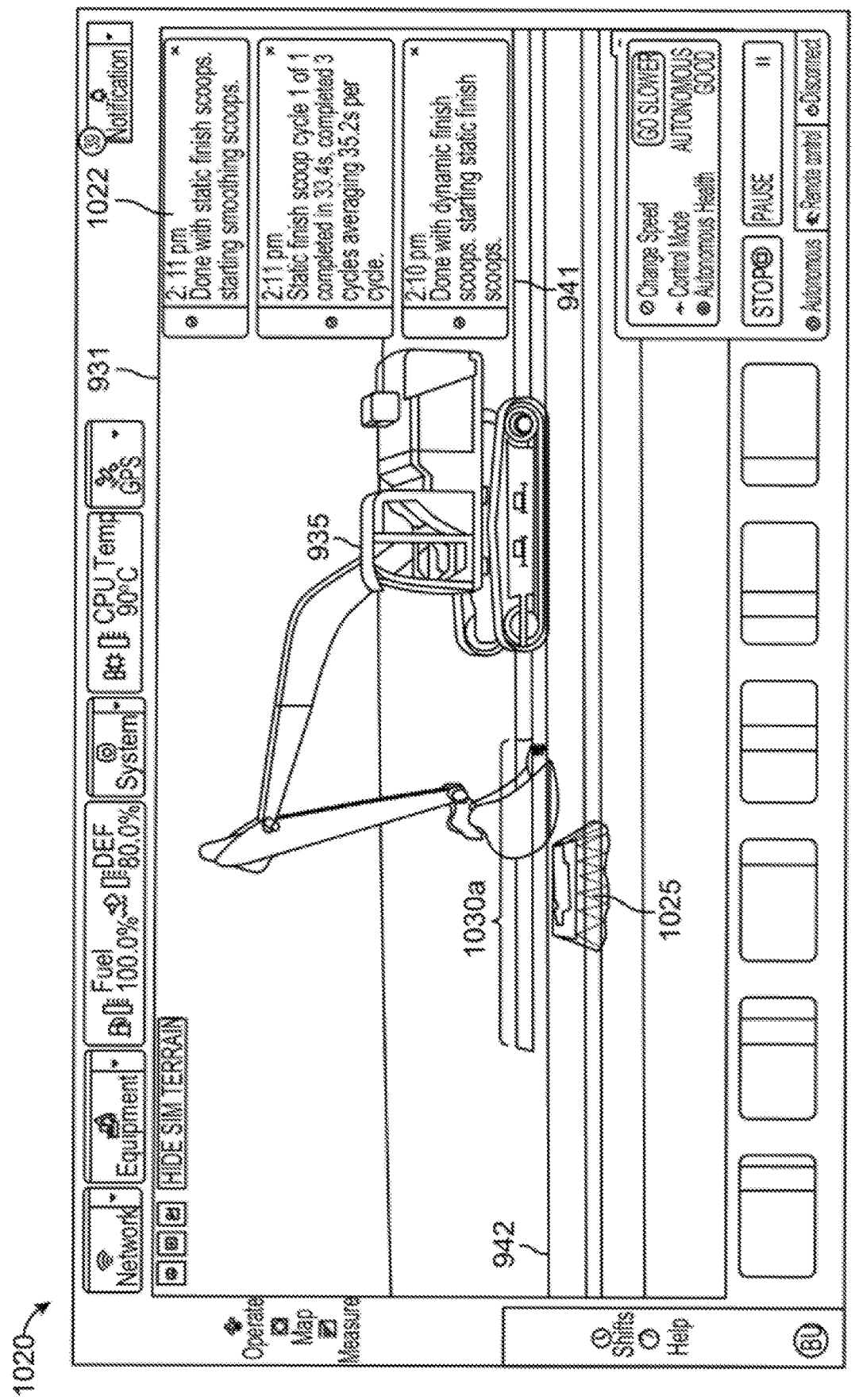

In some embodiments, in response to a request from an operator, the progress tracker engine 820 modifies the display panel 931 to display a side profile of the vehicle 935 and the dig site. FIG. 10E illustrates an interface 1020 modified to display a side profile of the earth shaping vehicle 935 as the vehicle performs a target tool path, according to an embodiment. Consistent with the views illustrated in FIG. 10B-10E, the side profile view allows an operator to visualize a position of an excavate tool relative to the ground surface. In the interface 1020 of FIG. 10E, the tool is positioned beneath the ground surface at an end of segment 1030a. Additionally, because segment 1030a is in the process of being excavated, the progress tracker engine 820 modifies the display to distinguish section 1030a from the unexcavated sections of the target location 941. The side profile view also illustrates the height of the mound 1020 in the dump pile 942.

Figure 10F:
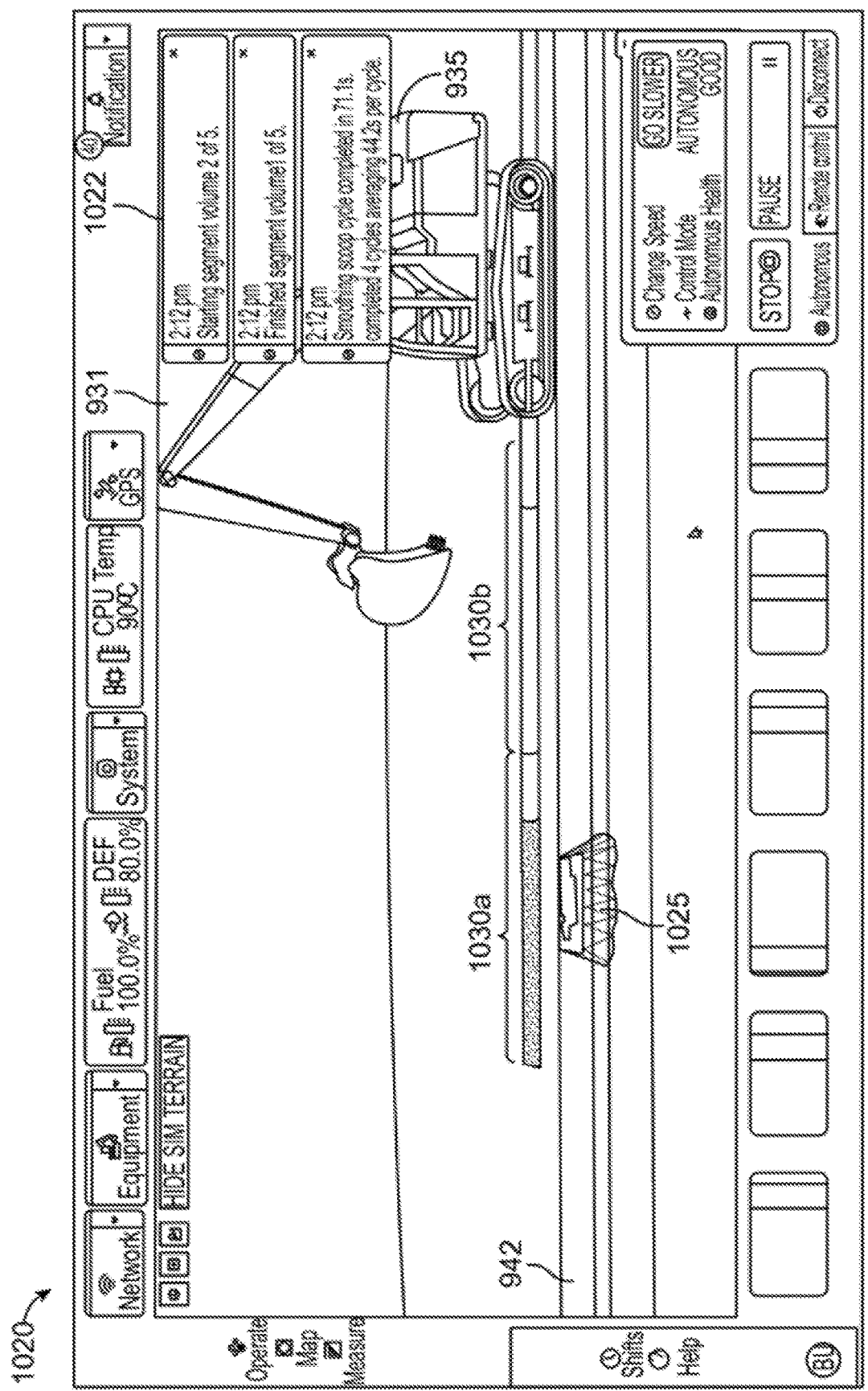

In embodiments in which the target location is broken into multiple segments, after the completed excavation of one segment, the earth shaping vehicle 935 repositions itself to excavate the next segment. The progress tracker engine 820 modifies the display panel 931 to display the repositioned earth shaping vehicle 935. FIG. 10F illustrates an interface 1020 modified to display an updated position of the earth shaping vehicle 935. In the illustrated embodiment, the earth shaping vehicle 935 has completed excavation of the segment 1030a. Accordingly, the vehicle navigates backward through the target location to position itself in range of segment 1030b. In some embodiments, the excavation of segment 1030a causes the tool path update engine 830 to update the target tool path with instructions that prevent the earth shaping vehicle 935 from navigating over the segment 1030*a*.

Figure 10G:
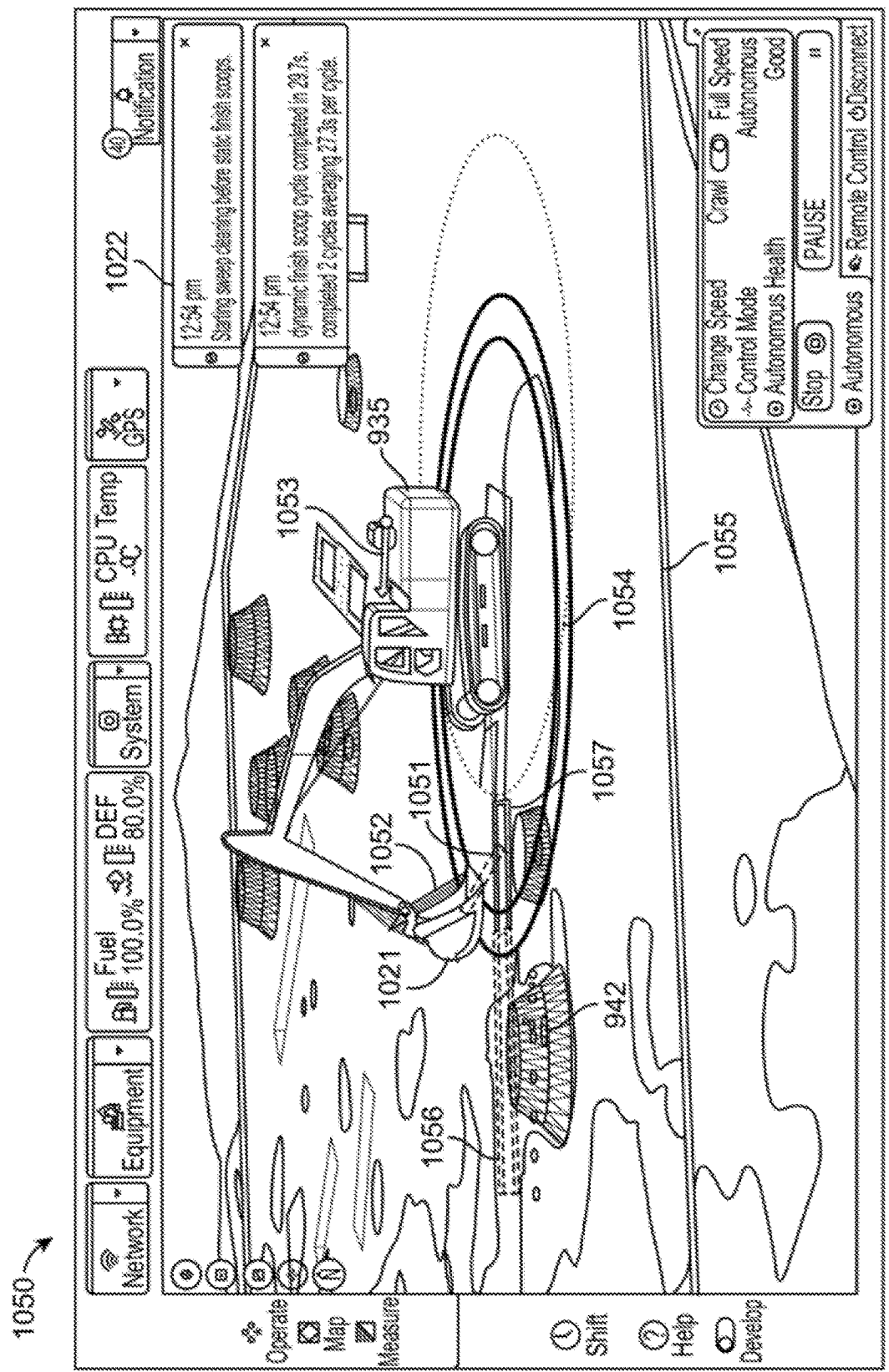

In addition to the features described above, the tool path interface engine 810 and the progress tracker 820 may additionally modify an interface to display additional insight regarding the dig site and/or the earth shaping vehicle 935. FIG. 10G illustrates an interface 1020 augmented with a topographical map of the dig site and additional graphic elements that provide insight into operation of the vehicle 935, according to an embodiment. In the illustrated embodiment, the display panel 931 is modified with a topographical map that uses varying color schemes to characterize the landscape of the dig site. When necessary, the topographical map includes three-dimensional representations of features above and below the ground surface of the dig site. The display panel 931 illustrated in in FIG. 10G illustrates the dump pile 942, the target location 941, and the earth shaping vehicle 935 in the dig site. The tool path interface engine 810 generates a graphic element 1055 illustrating a geofence around the dig site. As the earth shaping vehicle 935 begins to perform operations to excavate earth according to a target tool path, the progress tracker engine 820 modifies the display panel 931 to generate a graphic element 1054 illustrating a swing radius of the earth shaping tool 1021. The graphic element 1054 may also represent the range of motion of the tool 1021, other components of the vehicle 935, or both. As described herein, examples of other components of the vehicle include, but are not limited to, the pitch, roll, and yaw of a blade on a bulldozer and an articulation range of motion of a truck. The target location is separated into two regions, which are overlaid with graphic representations 1056 and 1057. The graphic element 1056 is a three-dimensional representation of an area of a target location previously excavated by the vehicle 935. The progress tracker engine 820 may additionally modify display panel 931 to display the graphical feature 1057, a three-dimensional representation of an area of a target location currently being excavated or yet to be excavated by the vehicle 935.

Relative to the position of the tool, the progress tracker engine 820 may generate a graphic element 1051 illustrating the planned movement of the tool 1021 and a graphic element 1052 illustrating the actual movement of the tool 1021. The movement of the tool 1021 may be monitored as the bucket moves through air and the ground surface. In some embodiments, the graphic representation 1051 is a visualization of the instructions defined in a target tool path. A comparison of the graphic element 1051 relative to the graphic element 1052 describes a deviation of the earth shaping tool 1021 from its planned path. In the illustrated embodiment, the progress tracker 820 further modifies the display panel 931 to display the graphic element 1053 illustrating the movement of a boom or a cab of the earth shaping vehicle 935.

Figure 10H:
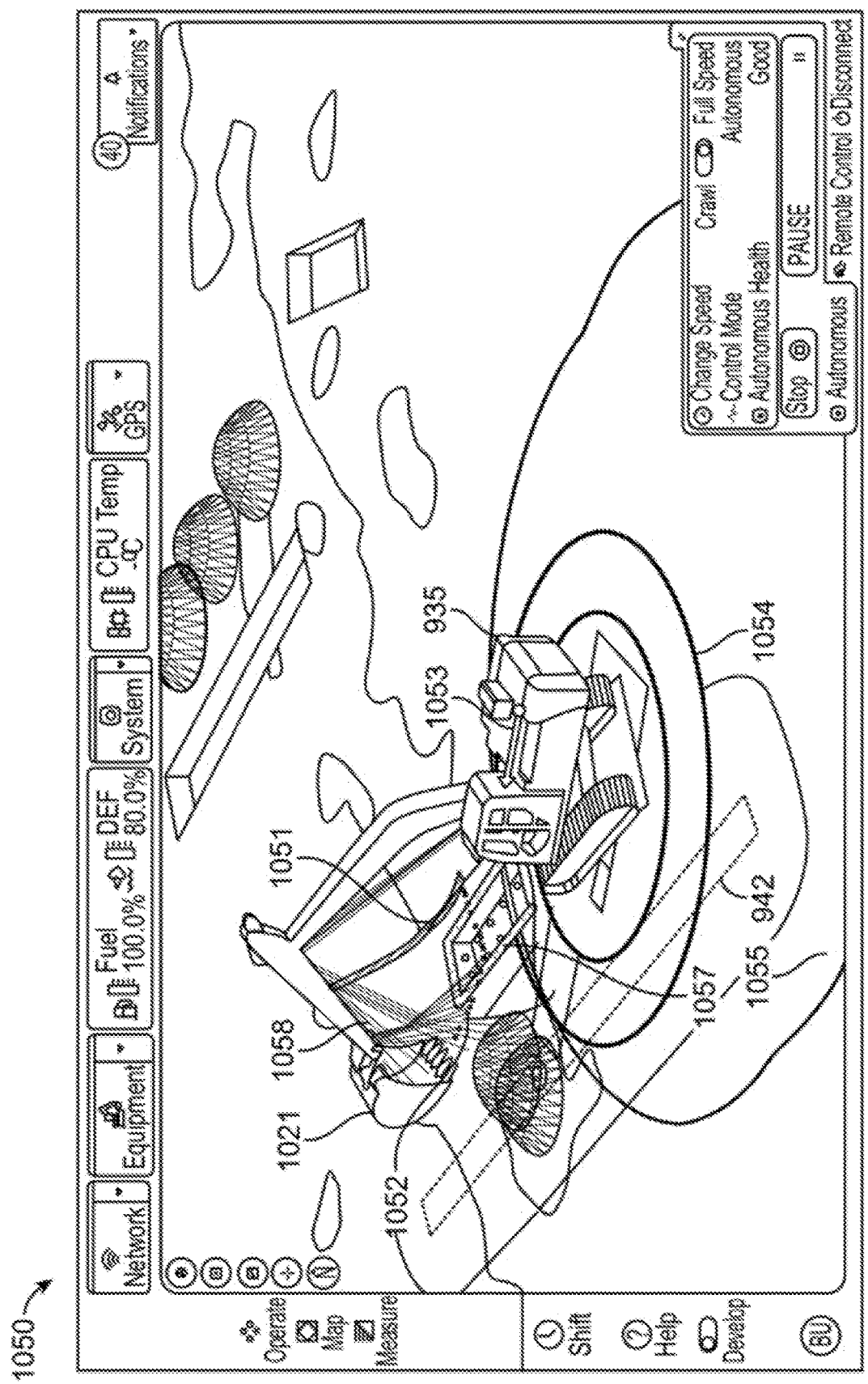

FIG. 10H illustrates an interface 1020 with an aerial view of the dig site that is augmented with the additional graphic elements, according to embodiment. The graphic elements 1051, 1052, 1053, 1054, 1055, 1056, and 1057 are consistent with the description in FIG. 10G. As illustrated in FIG. 10H, the progress tracker engine 820 may additionally modify the display panel 931 to display a graphic element 1058 illustrating the continuous movement of the earth shaping tool 1021 as the vehicle 935 performs a target tool path.

Figure 11:
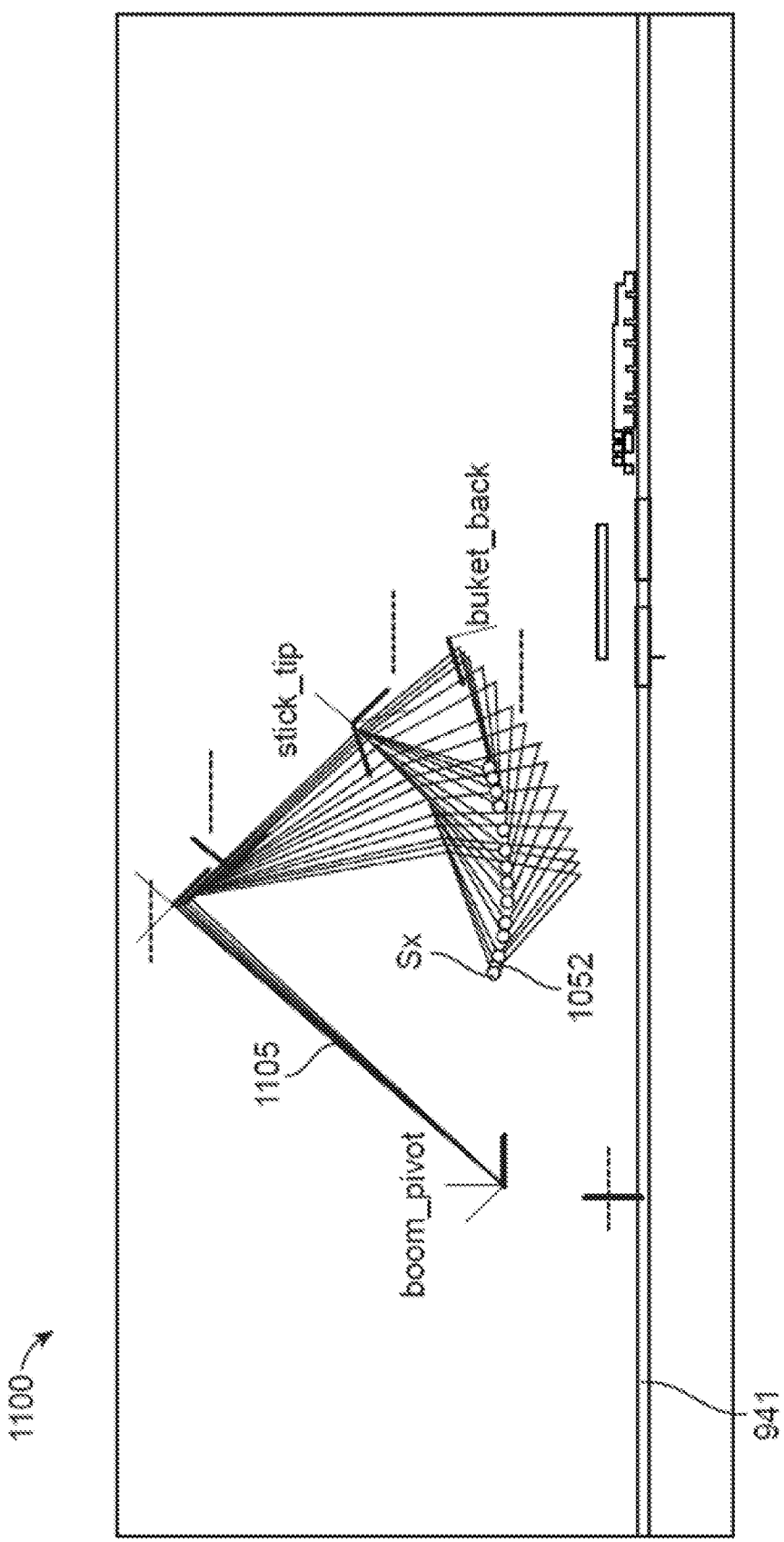
FIG. 11 is an illustration of a graphical user interface presented to an operator to monitor actuation of an earth shaping tool on an earth shaping vehicle, according to an embodiment.

In some embodiments, the progress tracker engine 820 generates a graphical user interface for tracking the continuous movement of an earth shaping tool 1021 relative to the surface of a target location. FIG. 11 is an illustration of a graphical user interface 1100 for monitoring the actuation of an earth shaping tool on an earth shaping vehicle, according to an embodiment. Position sensors, for example end-effector sensors, mounted to joints along an earth shaping tool 1105 transmit sensor data to the progress tracker engine 820, which continuously modifies the interface 1100 to display the actuation of the tool. In the illustrated embodiment of FIG. 11, the tool 1105 is actuated above the ground surface of target location 941, but the actuation of the tool 1105 could also be tracked below the ground surface. In some embodiments, the progress tracker engine 820 may modify the graphical user interface 1100 with graphical features 1051 and 1052 to illustrate the actual movement of the tool 1105 and the planned movement of the tool 1105.

Figure 12A:
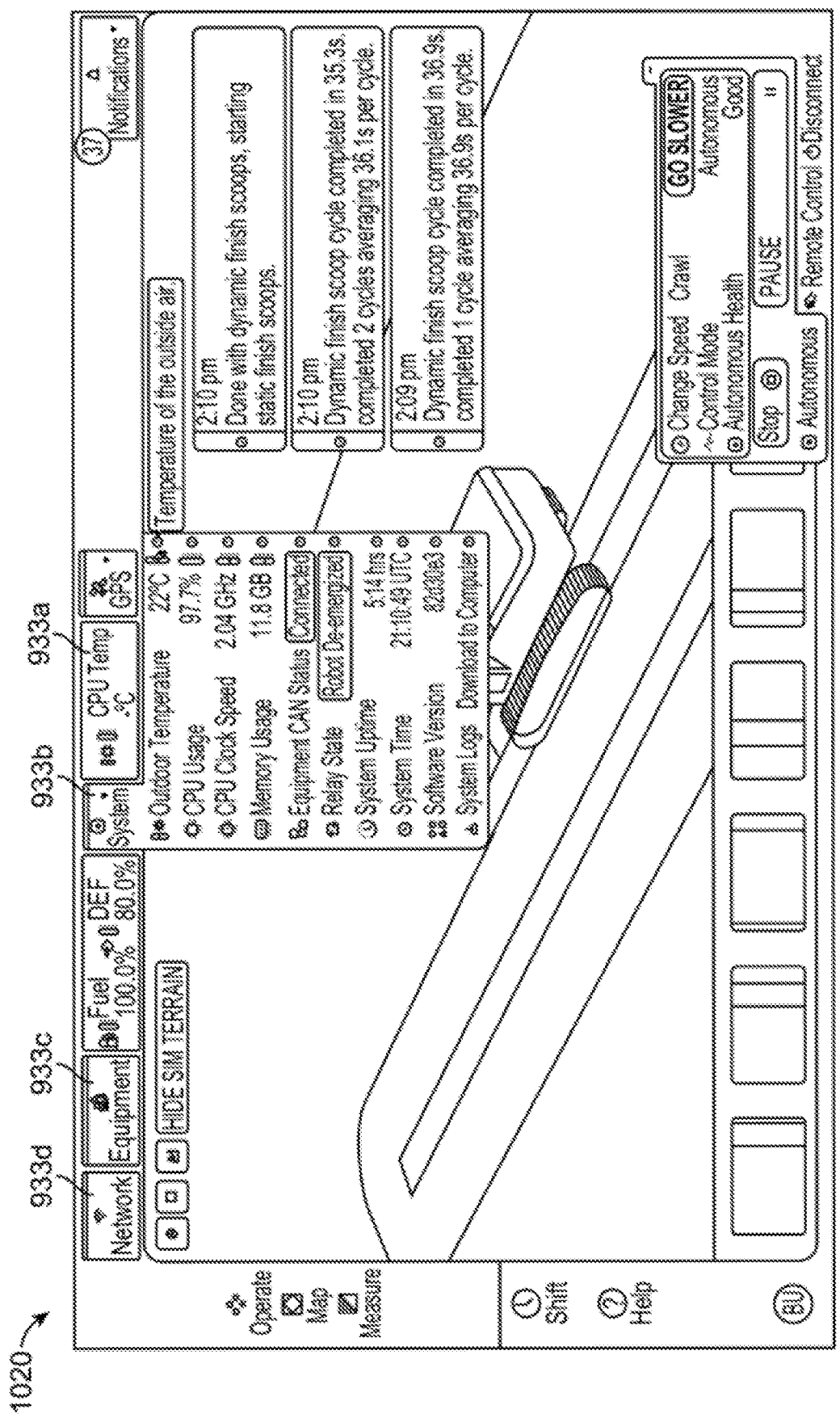

As described above with reference to FIG. 9D, the tool path interface engine generates a graphical user interface including graphic elements 933*a*, 933*b*, 933*c*, and 933*d*, which monitor the functionality of an earth shaping vehicle while the vehicle performs the target tool path. Each of the graphic elements 933 are selectable features of the graphical user interface. The graphic element 933*b* monitors the operation of the electronics on-board the earth shaping vehicle 935. In response to selection of the graphic element 933*b* by an operator, the progress tracker engine 820 modifies the user interface to display a drop-down menu of the additional operational details. FIG. 12A is an illustration a graphical user interface 1200 displaying information regarding additional operational details, according to an embodiment. In the illustrated embodiment, the monitored system metrics include an outdoor temperature measurement, a CPU usage, a CPU clock speed, a memory usage, an equipment CAN status, a relay state, a system uptime, a system time, a software version, and a system log. In other embodiments, the modified user interface may include additional metrics or fewer metrics than the illustrated embodiment.

Figure 12B:
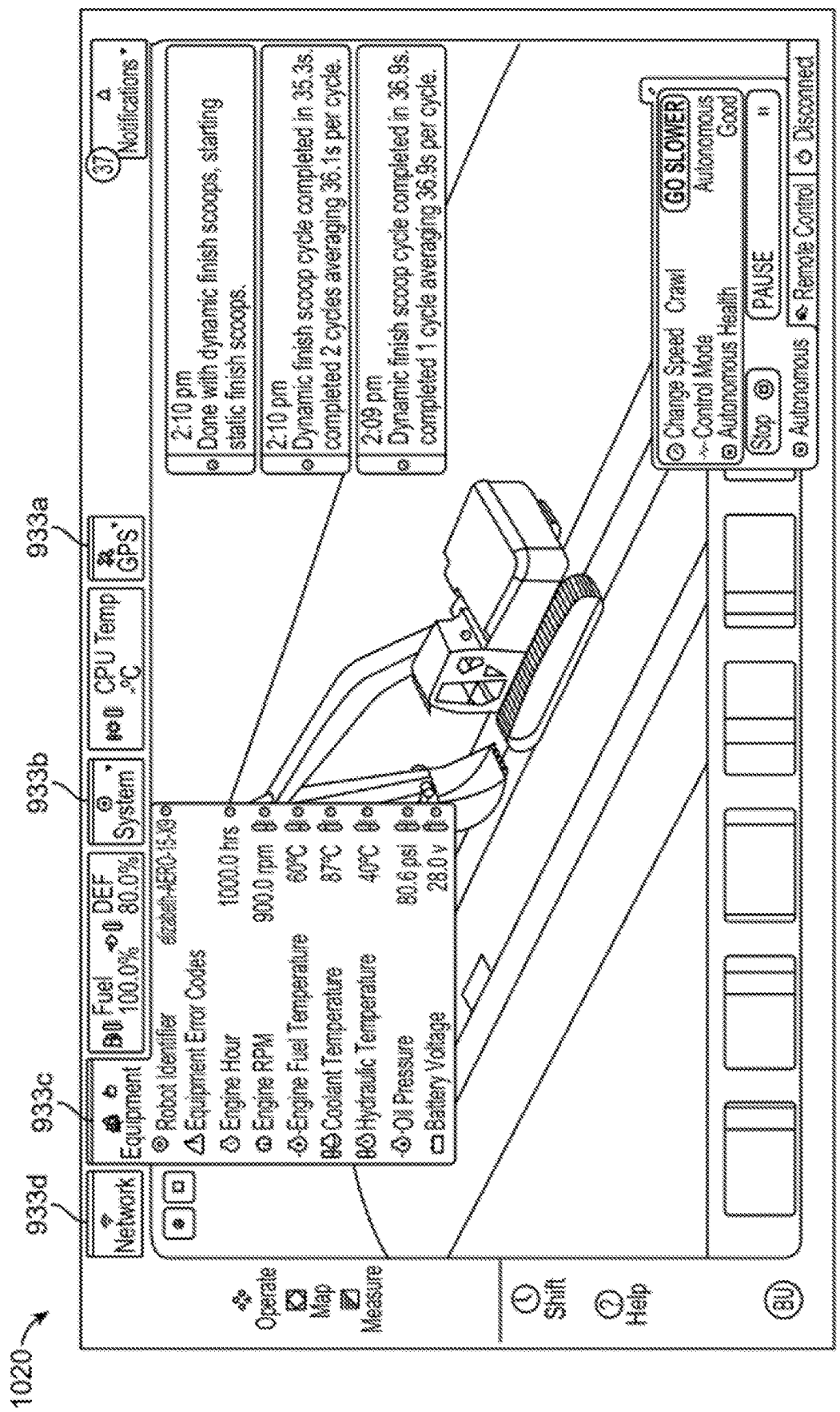

The graphic element 933*c* monitors the performance of the earth shaping vehicle 935. In response to selection of the graphic element 933*c* by an operator, the progress tracker engine 820 modifies the user interface to display a drop-down menu of the additional performance metrics. FIG. 12B is an illustration of a graphical user interface 1200 presented to an operator with information regarding a complete set of performance metrics, according to an embodiment. In the illustrated embodiments, the monitored performance metrics include an ID for the vehicle 935, a record of equipment error codes, a record of engine hours, an engine RPM, an engine fuel temperature, a coolant temperature measurement, a hydraulic temperature measurement, and an oil pressure measurement. In other embodiments, the modified user interface may include additional metrics or fewer metrics than the illustrated embodiment.

Figure 12C:
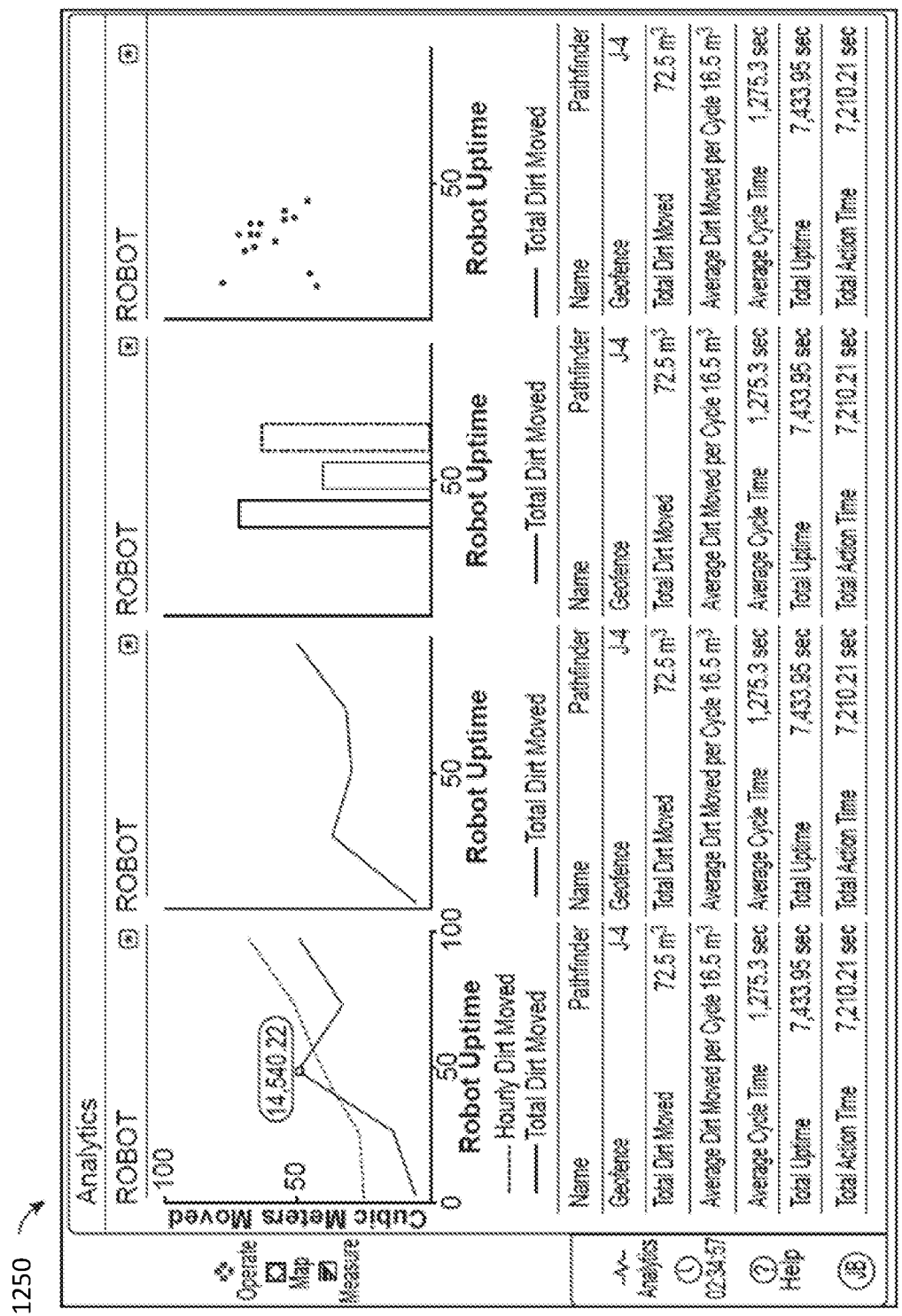

When an earth shaping vehicle 115 has completed an earth shaping routine, for example the trenching routine described in FIGS. 9A-F and FIGS. 10A-H, the tool path interface engine 810 generates a graphical user interface with analytics summarizing the earth shaping routine and the performance of the earth shaping vehicle. FIG. 12C is an illustration of a graphical user interface 1250 displaying analytics regarding a completed excavation routine, according to an embodiment. The illustrated embodiment includes various graphical representations describing the performance of the earth shaping vehicle, for example a graph plotting the total volume of earth and the hourly volume of earth moved. In alternate embodiments, the displayed interface may include a different combination of graphics or analytics than the illustrated interface 1250.

FIG. 12D is an alternate illustration of a graphical user interface displaying analytics regarding a completed excavation routine, according to an embodiment. The illustrated interface 1275 displays an alternate set of analytics and performance information compared to the interface 1250. In alternate embodiments, the displayed interface may include a different combination of graphics or analytics than the illustrated interface 1275.

VI.C User Interfaces for Updating a Target Tool Path

Figure 13A:
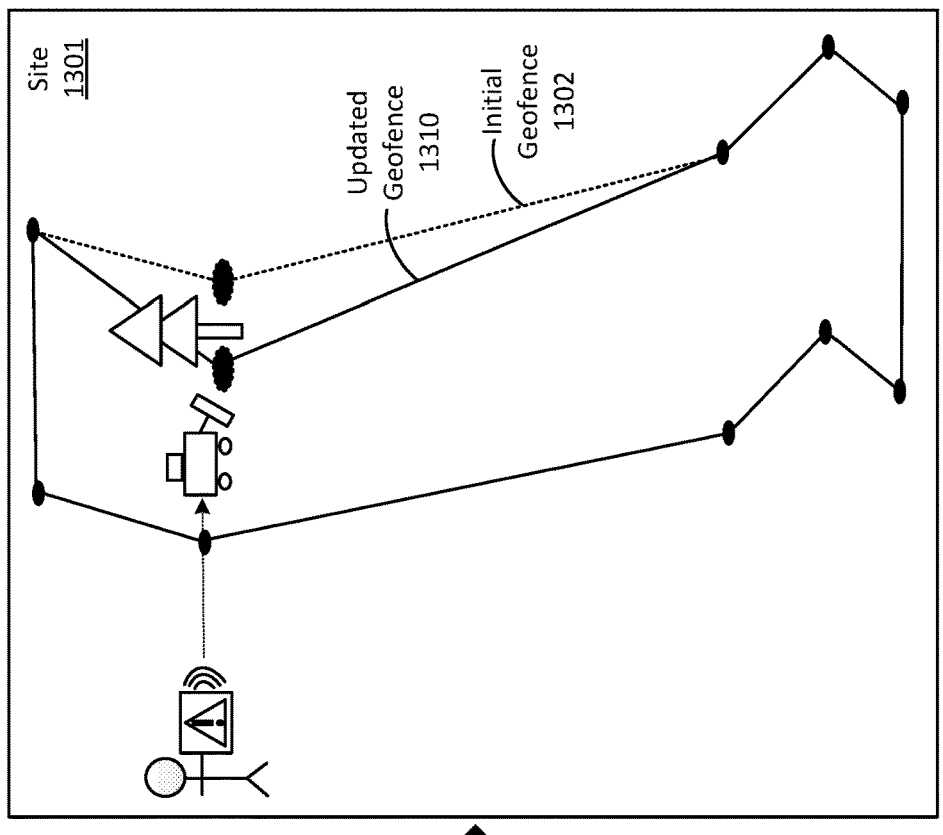
FIG. 13A is an illustration of an example coordinate space in which a geofence is updated based on an indication from an earth shaping vehicle navigating within the geofence, according to an embodiment
Figure 13A:
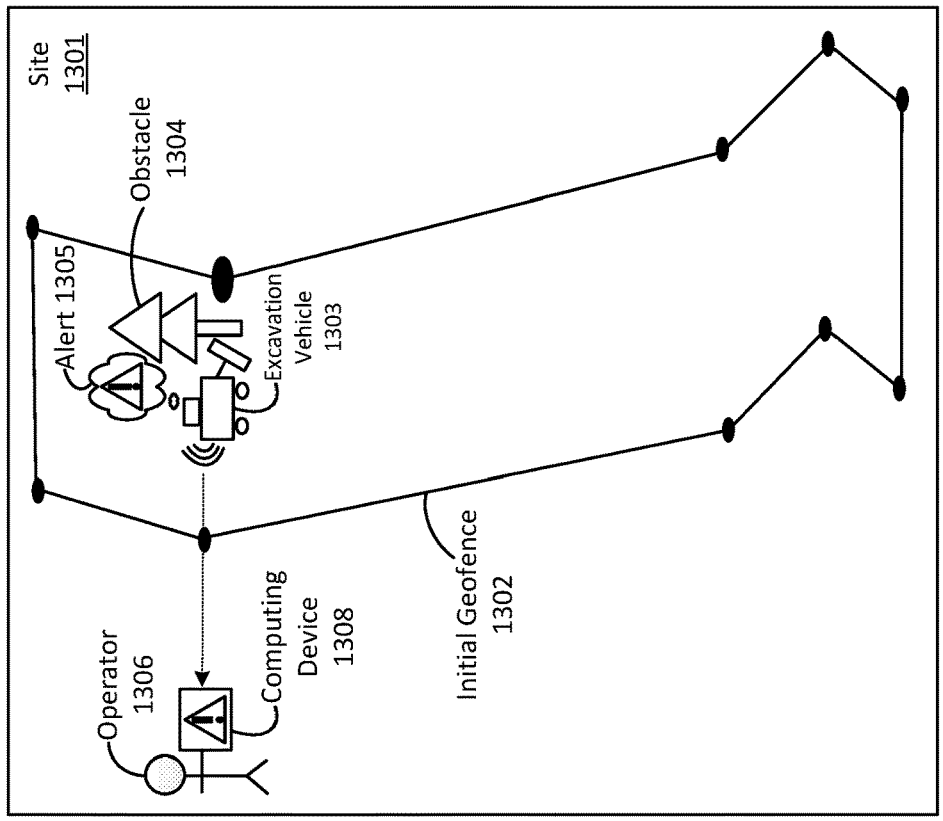

FIG. 13A is an illustration of an example coordinate space in which an earth shaping vehicle is navigating within a geofence, according to an embodiment. In the illustrated example, an excavation vehicle 1303 is deployed in a site 1301. An operator 1008 is located at a position away from the target location of the trench, for example outside of the initial geofence 1301 as is illustrated in FIG. 13A. The operator 1306 controls a computing device 1009, which is communicatively coupled to the excavation vehicle 1303. As excavation vehicle 1303 navigates within an initial geofence 1302, the vehicle 1303 encounters an immutable obstacle 1304. As described above, an excavation vehicle cannot remove an immutable obstacle 1304 from the dig site, for example using a removal tool path. Accordingly, the excavation vehicle 1303 communicates an alert 1305 to the computing device 1308 to inform the operator 1306 of the of the obstacle 1304.

Because the obstacle cannot be removed, the computing device 1308 displays a graphical user interface that enables the operator 1306 to revise the target tool path being performed by the vehicle 1303. In the illustrated embodiment, the operator 1306 revises the target tool path by modifying the initial geofence 1302 to generate the updated geofence 1310. The updated geofence 1310 excludes the obstacle 1304. As a result, the vehicle 1303 navigating within the updated geofence 1310 may perform the target tool path without encountering or being obstructed by the obstacle 1304.

To update a target tool path (e.g., to modify a geofence), the tool path update engine 830 may re-display a graphical user interface previously displayed to an operator during the building of a target tool path. For example, in response to an alert indicating that a geofence around a target location should be modified, the tool path update engine 830 may re-display the graphical user interface 911 to an operator. The graphical user interface 911, described with reference to FIG. 9B, enabled an operator defined an initial geofence for a target tool path. The interface 911, the includes a display panel 912 that displayed a representation of the initial geofence 906 in a coordinate system and a display panel 914 that displayed information associated with each modifiable point of the geofence 906.

In addition to the detection of an immutable obstacle within the initial geofence, an initial geofence may be updated or modified for a variety of reasons. For example, a target tool path may include instructions for a vehicle to navigate into an area of the site that lies outside of the initial geofence. As another example, a geofence may define a prohibited region of the dig site where an earth shaping vehicle 115 cannot travel. Examples of prohibited regions of the dig site include, but are not limited to, an area of wet earth, a rocky area, a large body of water, or any other area where an earth shaping vehicle 115 cannot safely navigate. While navigating along a target tool path in the dig site, the earth shaping vehicle 115 detects an immutable obstacle in proximity to the prohibited region. Because the immutable obstacle cannot be removed, an operator revises the target tool path by expanding the geofence to include the immutable obstacle. As a result, the expanded geofence represents an expanded prohibited region included the original prohibited region and the immutable obstacle. As a result, the vehicle 115 may not navigate through or in proximity to the prohibited region or the immutable obstacle. The target tool path may be updated using the techniques and displays described above with reference to FIG. 13A.

Figure 13B:
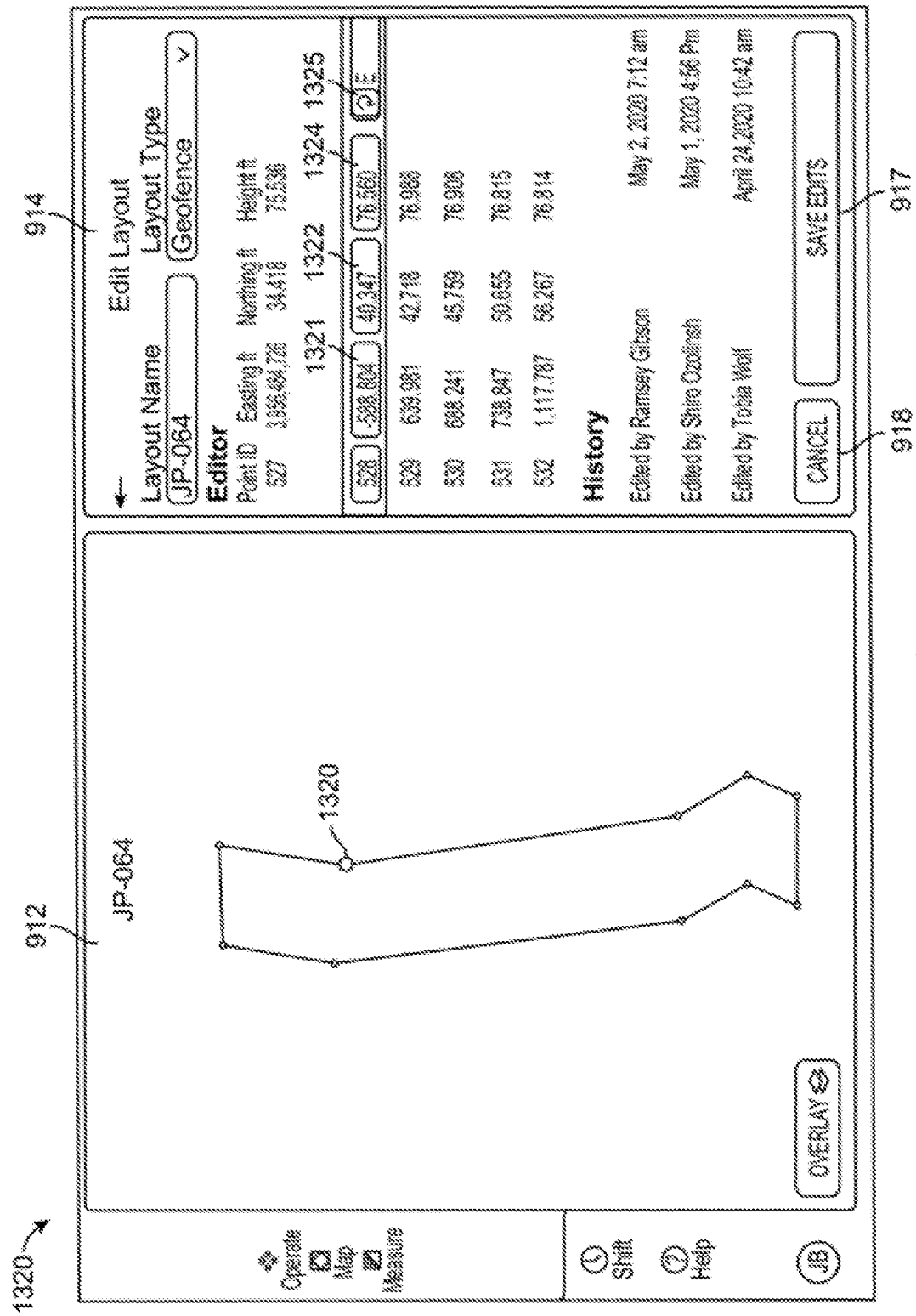
FIG. 13B is an illustration of a graphical user interface presented to an operator to update a geofence, according to an embodiment.

Turning now to FIG. 13B, the tool path update engine 830 generates a graphical user interface that enables an operator to modify a geofence in response to a detected obstacle. FIG. 13B is an illustration of a graphical user interface 1350 displayed to an operator to modify a geofence, according to an embodiment. Resembling the graphical user interface 911, the graphical user interface 1350 includes two display panels 1321 and 1322. The display panel 1321 displays a representation of the initial geofence 1302 in a coordinate system and display panel 3122 displays information associated with each modifiable point of the geofence. The illustrated initial geofence 1302 comprises ten modifiable points. In one embodiment, an operator may interact with the display panel 1321 to modify a location of a point in the coordinate system. For example, an operator may re-shape the initial geofence 1302 by dragging modifiable points to an alternate location in the coordinate system.

Alternatively, an operator may interact with the display panel 1322 to modify a position of the modifiable point in the geofence. In the illustrated display panel 1322, each modifiable point is assigned a set of coordinates in the coordinate system of the dig site (e.g., a combination of easting and northing coordinates). Each value is entered into an editable graphic element, for example graphic elements 1321, 1322, and 1323. An operator may edit the values in each of the graphic elements 1321, 1322, and 1323 to modify a location of a point in the coordinate system. The display panel 1322 additionally includes a graphic element 1324, which when selected causes the tool path update engine to undo any changes made to the location of a modifiable point. The graphic elements VII. Additional Considerations It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for managing a material moving routine in a site, the method comprising:
   generating, by a computing device, a graphical user interface displaying a three-dimensional representation of the site comprising a position of a vehicle capable of moving material within the site and a target location within the site for the vehicle to move material and a representation of a planned movement of a tool overlaying the representation of the site, the representation of the planned movement divided into a plurality of segments, wherein each segment of the plurality of segments represents a portion of the planned movement of the tool;
   transmitting, by the computing device, a set of instructions to cause the vehicle to move a volume of material from the target location;
   as the vehicle moves material from the target location based on the set of instructions:
      receiving, at the computing device, data recorded by one or more sensors mounted to the vehicle describing a current depth of the target location, a current volume of material moved from the target location, a position of the vehicle relative to the target location, a location of a pile of material, and a height of the pile of material;
      modifying, based on the data recorded by the one or more sensors, the graphical user interface to display the current depth of the target location, the position of the vehicle relative to the target location, the location of the pile of material, and the height of the pile of material; and
      modifying, by the computing device, the set of instructions based on the received data recorded by the one or more sensors and providing the modified set of instructions to the vehicle.

2. The method of claim 1, wherein the computing device continuously receives the data recorded by the one or more sensors as the vehicle moves material from the target location and modifies the graphical user interface continuously as the vehicle moves material from the target location.

3. The method of claim 1, wherein the graphical user interface further displays a side-profile view of the three-dimensional representation of the site, the method further comprising:
   receiving data recorded by one or more sensors mounted to the vehicle describing a current position of the vehicle and material moving tool coupled to the vehicle in the site; and
   as the vehicle moves material from the target location, modifying the graphical user interface to display the current position of the vehicle and the material moving tool based on the data describing the current position of the vehicle and material moving tool coupled to the vehicle in the site.

4. The method of claim 1, wherein the computing device transmits a second set of instructions for the vehicle to move material from a second target location, the method further comprising:
   receiving second data recorded by the one or more sensors indicating that the vehicle has navigated to the second target location;
   modifying the graphical user interface to display the position of the vehicle at the second target location; and
   as the vehicle moves material from the second target location, modifying, based on the second data recorded by the one or more sensors, the graphical user interface to display the second target location, a current depth of the second target location, a position of the vehicle relative to the second target location, and an updated height of the of the pile of material, wherein the height of the pile of material is updated based on the volume of material moved from the second target location.

5. The method of claim 1, wherein the graphical user interface further displays a representation of a ground surface of the site and one or more of the following features:
   a representation of a range of motion of a tool of the vehicle and the vehicle overlaying the representation of the ground surface;
   a three-dimensional representation of a previous target location overlaying the representation of the ground surface; and
   a representation illustrating continuous movement of a material moving tool as the vehicle executes the set of instructions to move material from the target location.

6. The method of claim 1, further comprising:
   responsive to receiving data recorded by one or more sensors mounted to the vehicle as the vehicle moves material, generating a notification comprising one or more of:
      a warning message;
      an error message;
      a fatal error alert;
      an informational message; and an interactive message, wherein the interactive message displays a prompt for an operator to provide additional information regarding the set of instructions.

7. The method of claim 1, further comprising:
computing one or more material moving metrics based on the volume of material moved from the target location and an amount of time that the vehicle to has spent moving material from the target location; and
generating graphic elements of the graphical user interface to display the computed material moving metrics using a first subset of graphical representations and a second set of numerical metrics.

8. The method of claim 1, further comprising:
accessing a set of instructions to be executed by the vehicle, wherein the set of instructions define operations for moving material at the target location; and
generating the representation of the planned movement of the tool by determining a visual representation of the accessed set of instructions.

9. A non-transitory computer readable medium storing instructions for managing a material moving routine in a site encoded thereon that, when executed by a processor, cause the processor to:
generate a graphical user interface displaying a three-dimensional representation of the site comprising a position of a vehicle capable of moving material within the site and a target location within the site for the vehicle to move material and a representation of a planned movement of a tool overlaying the representation of the site, the representation of the planned movement divided into a plurality of segments, wherein each segment of the plurality of segments represents a portion of the planned movement of the tool;
transmit, to a controller of the vehicle, a set of instructions to cause the vehicle to move a volume of material from the target location;
as the vehicle moves material from the target location based on the set of instructions:
receive data recorded by one or more sensors mounted to the vehicle describing a current depth of the target location, a current volume of material moved from the target location, a position of the vehicle relative to the target location, a location of a pile of material, and a height of the pile of material;
modify, based on the data recorded by the one or more sensors, the graphical user interface to display the current depth of the target location, the position of the vehicle relative to the target location, the location of the pile of material, and the height of the pile of material; and
modify the set of instructions based on the received data recorded by the one or more sensors and providing the modified set of instructions to the vehicle.

10. The non-transitory computer readable medium of claim 9, wherein the processor continuously receives the data recorded by the one or more sensors as the vehicle moves material from the target location and modifies the graphical user interface continuously as the vehicle moves material from the target location.

11. The non-transitory computer readable medium of claim 9, wherein the graphical user interface displays a side-profile view of the three-dimensional representation of the site, the instructions further causing the processor to:
receive data recorded by one or more sensors mounted to the vehicle describing a current position of the vehicle and material moving tool coupled to the vehicle in the site; and
as the vehicle moves material from the target location, modifying the graphical user interface to display the current position of the vehicle and the material moving tool based on the data describing the current position of the vehicle and material moving tool coupled to the vehicle in the site.

12. The non-transitory computer readable medium of claim 9, wherein the processor transmits a second set of instructions for the vehicle to move material from a second target location, the instructions further causing the processor to:
receive second data recorded by the one or more sensors indicating that the vehicle has navigated to the second target location;
modify the graphical user interface to display the position of the vehicle at the second target location; and
as the vehicle moves material from the second target location, modify, based on the second data recorded by the one or more sensors, the graphical user interface to display the second target location, a current depth of the second target location, a position of the vehicle relative to the second target location, and an updated height of the of the pile of material, wherein the height of the pile of material is updated based on the volume of material moved from the second target location.

13. The non-transitory computer readable medium of claim 9, further comprising instructions that cause the graphical user interface to display a representation of a ground surface of the site and one or more of the following features:
a representation of a range of motion of a tool of the vehicle and the vehicle overlaying the representation of the ground surface;
a three-dimensional representation of a previous target location overlaying the representation of the ground surface; and
a representation illustrating continuous movement of a material moving tool as the vehicle executes the set of instructions to move material from the target location.

14. The non-transitory computer readable medium of claim 9, further comprising instructions that cause the processor to:
responsive to receiving data recorded by one or more sensors mounted to the vehicle as the vehicle moves material, generate a notification comprising one or more of:
a warning message;
an error message;
a fatal error alert;
an informational message; and
an interactive message, wherein the interactive message displays a prompt for an operator to provide additional information regarding the set of instructions.

15. The non-transitory computer readable medium of claim 9, further comprising instructions that cause the processor to:
compute one or more material moving metrics based on the volume of material moved from the target location and an amount of time that the vehicle to has spent moving material from the target location; and generate graphic elements of the graphical user interface to display the computed material moving metrics using a first subset of graphical representations and a second set of numerical metrics.

16. A system for managing a material moving routine in a site, the system comprising:
a vehicle capable of moving material within the site positioned within the site and comprising one or more sensors mounted to the vehicle and a controller of the vehicle, wherein the one or more sensors record data describing the site; and
a computing device communicatively coupled to the vehicle, the computing device comprising a processor and a non-transitory computer readable medium storing instructions encoded thereon that, when executed by the processor, cause the processor to:
generate a graphical user interface displaying a three-dimensional representation of the site comprising a position of the vehicle capable of moving material within the site and a target location within the site for the vehicle to move material and a representation of a planned movement of a tool overlaying the representation of the site, the representation of the planned movement divided into a plurality of segments, wherein each segment of the plurality of segments represents a portion of the planned movement of the tool;
transmit, to a controller of the vehicle, a set of instructions to cause the vehicle to move a volume of material from the target location;
as the vehicle moves material from the target location based on the set of instructions:
receive data recorded by one or more sensors mounted to the vehicle describing a current depth of the target location, a current volume of material moved from the target location, a position of the vehicle relative to the target location, a location of a pile of material, and a height of the pile of material;
modify, based on the data recorded by the one or more sensors, the graphical user interface to display the current depth of the target location, the position of the vehicle relative to the target location, the location of the pile of material, and the height of the pile of material; and
modify the set of instructions based on the received data recorded by the one or more sensors and providing the modified set of instructions to the vehicle.

17. The system of claim 16, wherein the processor continuously receives the data recorded by the one or more sensors as the vehicle moves material from the target location and modifies the graphical user interface continuously as the vehicle moves material from the target location.

18. The system of claim 16, wherein the graphical user interface displays a side-profile view of the three-dimensional representation of the site, the instructions further causing the processor to:
receive data recorded by one or more sensors mounted to the vehicle describing a current position of the vehicle and material moving tool coupled to the vehicle in the site; and
as the vehicle moves material from the target location, modifying the graphical user interface to display the current position of the vehicle and the material moving tool based on the data describing the current position of the vehicle and material moving tool coupled to the vehicle in the site.

19. The system of claim 16, wherein the processor transmits a second target tool path with operations for the vehicle to perform to excavate a volume of earth from a second target location, the instructions further causing the processor:
receive second data recorded by the one or more sensors indicating that the vehicle has navigated to the second target location;
modify the graphical user interface to display the position of the vehicle at the second target location; and
as the vehicle moves material from the second target location, modify, based on the second data recorded by the one or more sensors, the graphical user interface to display the second target location, a current depth of the second target location, a position of the vehicle relative to the second target location, and an updated height of the of the pile of material, wherein the height of the pile of material is updated based on the volume of material moved from the second target location.

20. The system of claim 16, further comprising instructions that cause the graphical user interface to display a representation of a ground surface of the site and one or more of the following features:
a representation of a range of motion of a tool of the vehicle and the vehicle overlaying the representation of the ground surface;
a three-dimensional representation of a previous target location overlaying the representation of the ground surface; and
a representation illustrating continuous movement of a material moving tool as the vehicle executes the set of instructions to move material from the target location.

21. The system of claim 16, further comprising instructions that cause the processor to:
responsive to receiving data recorded by one or more sensors mounted to the vehicle as the vehicle moves material, generate a notification comprising one or more of:
a warning message;
an error message;
a fatal error alert;
an informational message; and
an interactive message, wherein the interactive message displays a prompt for an operator to provide additional information regarding the set of instructions.

22. The system of claim 16, further comprising instructions that cause the processor to:
compute one or more material moving metrics based on the volume of material moved from the target location and an amount of time that the vehicle to has spent moving material from the target location; and
generate graphic element on the graphical user interface to display the material moving metrics using a first subset of graphical representations and a second set of numerical metrics.

* * * * *